United States Patent
Epps et al.

(10) Patent No.: US 7,310,695 B2
(45) Date of Patent: Dec. 18, 2007

(54) PORT ADAPTER FOR HIGH-BANDWIDTH BUS

(75) Inventors: Garry P. Epps, Sunnyvale, CA (US);
Mark A. Gustlin, Campbell, CA (US);
Mohammed I. Tatar, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 32 days.

(21) Appl. No.: 11/502,965

(22) Filed: Aug. 11, 2006

(65) Prior Publication Data
US 2006/0277346 A1 Dec. 7, 2006

Related U.S. Application Data

(62) Division of application No. 10/680,842, filed on Oct. 6, 2003, now Pat. No. 7,111,102.

(51) Int. Cl.
G06F 13/14 (2006.01)
H04B 7/00 (2006.01)
H04L 12/66 (2006.01)

(52) U.S. Cl. .................. 710/305; 710/52; 710/250; 710/100; 710/104; 370/318; 370/353; 370/354; 370/356

(58) Field of Classification Search ............... 710/305, 710/52, 250, 104, 100; 370/218, 318, 353, 370/354, 356, 902
See application file for complete search history.

(56) References Cited

U.S. PATENT DOCUMENTS

| | | | | |
|---|---|---|---|---|
| 6,792,561 | B1 * | 9/2004 | Mamata .................. | 714/36 |
| 6,906,544 | B1 * | 6/2005 | Shanker et al. ........... | 324/762 |
| 6,912,602 | B2 * | 6/2005 | Sano et al. ............... | 710/22 |
| 6,981,074 | B2 * | 12/2005 | Oner et al. ............... | 710/32 |
| 7,111,102 | B2 * | 9/2006 | Doak et al. .............. | 710/305 |
| 2003/0126297 | A1 * | 7/2003 | Olarig et al. ............ | 709/250 |
| 2003/0139919 | A1 * | 7/2003 | Sher et al. .............. | 703/25 |
| 2004/0028063 | A1 * | 2/2004 | Roy et al. ............... | 370/402 |
| 2004/0109473 | A1 * | 6/2004 | Lebizay et al. ........... | 370/466 |

(Continued)

OTHER PUBLICATIONS

Modelware—"Virtual Component Data Sheet PluriBus SPI4.2 Foundation"—Jun. 2001—2 pages.*

(Continued)

*Primary Examiner*—Paul R. Myers
*Assistant Examiner*—Brian Misiura
(74) *Attorney, Agent, or Firm*—Hickman Palermo Truong & Becker LLP

(57) ABSTRACT

A port adapter for connecting zero or more network interfaces to a host system having a SPI-4 bus is disclosed. The port adapter comprises zero or more network interfaces; a SPI-4 bus coupled to a host system to provide a communication channel between the host and the network interfaces; a control bus coupled to the host system for controlling and monitoring the port adapter; and interface logic that interfaces the SPI-4 bus and the control bus to the network interfaces. Methods are provided for selecting and using one of a small plurality of different packet formats for various networking technologies, so that the port adapter can hide details of the technology that it handles from the host system, and for operating the host system's SPI-4 bus at one of several speeds based on bandwidth requirements of the port adapter.

36 Claims, 6 Drawing Sheets

U.S. PATENT DOCUMENTS

| | | | |
|---|---|---|---|
| 2004/0153891 A1* | 8/2004 | Slutz et al. | 714/699 |
| 2005/0025055 A1* | 2/2005 | Jain et al. | 370/235 |
| 2005/0078601 A1* | 4/2005 | Moll et al. | 370/218 |
| 2005/0108518 A1* | 5/2005 | Pandya | 713/151 |

OTHER PUBLICATIONS

Modelware—"Virtual Component Data Sheet PluriBus SPI4.2 Manager"—Oct. 2001—2 pages.*

* cited by examiner

PORT ADAPTER FOR HIGH-BANDWIDTH BUS

CROSS-REFERENCE TO RELATED APPLICATIONS

This application is a divisional of and claims the benefit of priority under 35 U.S.C. §120 from U.S. patent application Ser. No. 10/680,842, filed Oct. 6, 2003, now U.S. Pat. No. 7,111,102 which is incorporated by reference in its entirety for all purposes as if fully set forth herein.

This application is related to prior co-pending commonly assigned application Ser. No. 09/790,970, filed Feb. 22, 2001, entitled "Apparatus and technique for conveying per-channel flow control information to a forwarding engine of an intermediate network node," of Guy Fedorkow et al., the entire contents of which are hereby incorporated by reference as if fully set forth herein.

COPYRIGHT NOTICE

A portion of the disclosure of this patent document contains material which is subject to copyright protection. The copyright owner has no objection to the facsimile reproduction of the patent disclosure, as it appears in the Patent & Trademark Office patent file or records, but otherwise reserves all copyright rights whatsoever. Copyright© 2003 Cisco Systems, Inc.

FIELD OF THE INVENTION

This invention generally relates to digital computer systems, and relates more particularly to digital computers that include a SPI-4 bus.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Digital computers use input/output (I/O) buses for transferring information between peripheral devices and a computer central processing unit and computer memory. I/O functions are also required in systems with multiple distributed processors and multiple distributed memories.

A variety of I/O bus architectures are used in such computer systems, including Personal Computer Interface (PCI). The System Packet Interface-4 bus is a relatively new high-bandwidth bus that is generally used in data packet processing systems for computer networks, such as high-speed routers and switches. Characteristics of the SPI4.2 bus architecture are described in an Interface Specification that is available in the document www.oiforum.com/public/impagreements.html. In this document, the term "SPI-4" is equivalent to "SPI4.2," and includes variants and equivalents of the SPI4.2 bus architecture.

Although the SPI-4 bus provides a high-speed communication path for packet data within a computer system, the SPI-4 bus is not suitable for direct communication to external networks or devices. Interfacing a host with a SPI-4 bus to a network normally requires providing logical or physical ports or interfaces that are coupled to other devices or networks. Some port adapters are architected as service adapters that have no ports or interfaces, but provide a particular kind of packet processing service for a host, such as compression or decompression, encryption or decryption, etc.

Users and manufacturers particularly desire to have host systems that can accommodate ports and interfaces that use different technologies, such as Ethernet, Fast Ethernet, Gigabit Ethernet, optical, serial or other interfaces. In one approach, a host router or switch is hard-wired with a variety of different ports. However, a user cannot re-configure such a host if the user's port requirements change. Such users and manufacturers want to have a host system that is adaptable to changing port and interface requirements.

Hot swapping may also damage some devices connected to the SPI-4 bus such as devices using Complimentary Metal Oxide Semiconductor (CMOS) technology. CMOS devices are exposed to large currents when inputs to CMOS receivers are within the CMOS switching region. Some CMOS receivers have two field effect transistors (FETs) connected in series with a first FET connected to a positive power supply rail and a second FET connected to a negative power supply rail. When the input to the two FETS is in the switching region, both FETs can be continuously turned on at the same time creating a DC current path directly through the CMOS device. The continuous on state of the two FETs can dissipate enough power to damage the CMOS device.

CMOS devices also experience latch-up conditions when an input is driven beyond one of the CMOS power supply rails. In the latch-up condition, parasitic transistors in the CMOS structure dissipate large amounts of power that can destroy the CMOS device. Both power dissipation conditions described above can result from hot swapping on the host interface bus.

U.S. Pat. No. 5,793,987 and U.S. Pat. No. 6,163,824 of Quackenbush et al. disclose a port adapter with separate PCI local bus and local bus, and associated processing methods. A port adapter is an electronic device that provides one or more ports and that plugs into a host system to provide additional features or functions for the host. The technology of Quackenbush et al. has been used in PCI bus-based port adapters in the Cisco 7200 Series Routers and Cisco 7500 Series Routers, from Cisco Systems, Inc., San Jose, Calif. However, the technology of Quackenbush et al. is not suitable for hosts having SPI-4 bus architectures because of vast technical differences between the PCI bus and the SPI-4 bus. For example, the PCI bus cannot process data that is arriving from interfaces at high rates such as 10 gigabits per second (Gbps).

Still another drawback of existing port adapters is that they do not interoperate seamlessly with heterogeneous network environments. For example, a host with a plurality of port adapters may communicate with external networks or devices using any of a large number of network technologies. As a result, data packets that are received at the port adapters may have any of a large number of different formats. Requiring the host system to understand and process a large number of different packet formats would be complicated and lack scalability to new technologies. Further, it would be impractical to have one generic packet format used between each type of port adapter and the host system, because of differences in the type and quantity of data carried in packets of different technologies.

Thus, there is a need for a port adapter that can process a particular packet format for a particular technology, and provides data to the host in a single consistent packet format for internal processing.

Based on the foregoing, there is a clear need in the relevant technical field for a port adapter that can interface a host system having a SPI-4 bus architecture to different network technologies. More broadly, there is a need for an apparatus that can provide a hot-pluggable adaptive interface from the SPI-4 bus of a host to external peripheral equipment.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
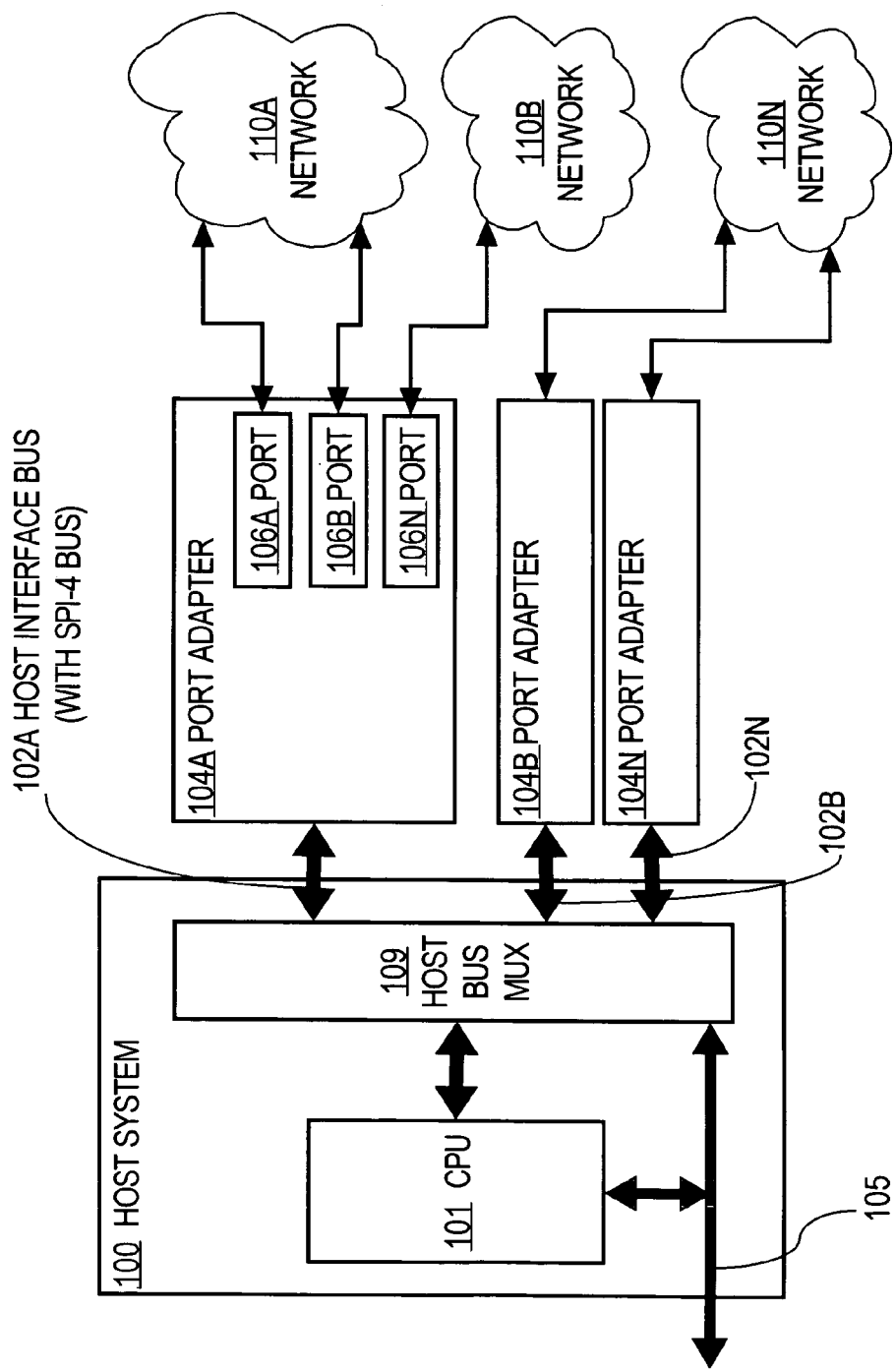
FIG. 1 is a block diagram that illustrates an overview of a host system with one or more port adapters.

A hot-pluggable port adapter for a high-speed bus is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
    2.1 Port Adapter Architecture
    2.2 Adaptation to Different SPI-4 Operating Speeds
    2.3 Extended Flow Control Bus
    2.4 Pre-Processing Packets with Port Adapter
3.0 Implementation Mechanisms—Hardware Overview
4.0 Extensions and Alternatives 1.0 General Overview The needs identified in the foregoing Background, and other needs and objects that will become apparent from the following description, are achieved in the present invention, which comprises, in one aspect, a hot-pluggable port adapter for connecting network interfaces to a host system through a SPI-4 bus. The port adapter communicates with the host system through a port adapter/host interface that includes the SPI-4 bus and a control bus; an extended flow control bus may be provided. Methods are provided for selecting and using one of a small plurality of different packet formats for various networking technologies, so that the port adapter can hide details of the technology that it handles from the host system, and for operating the host system's SPI-4 bus at one of several speeds based on bandwidth requirements of the port adapter.

According to one aspect, the invention provides a port adapter for coupling zero or more network interfaces to a host system having a SPI-4 bus, the port adapter comprising zero or more network interfaces; a SPI-4 bus coupled to a host system to provide a communication channel between the host and the network interfaces; a control bus coupled to the host system for controlling and monitoring the port adapter; and interface logic that interfaces the SPI-4 bus and the control bus to the network interfaces.

According to one feature, the interface logic comprises a field programmable gate array (FPGA), application-specific integrated circuit (ASIC), a combination of these and one or more other hardware elements, or a combination of one or more other hardware elements. According to another feature, an identity bus is coupled to the host system to allow identification of the port adapter by the host system. In yet another feature, an extended flow control bus is provided on which the port adapter may convey FIFO status to the host system on a plurality of separate logical channels. In still another feature, a clock bus communicates network timing information between a port and the host system, for providing synchronization of a port to another port, synchronization of a host system reference oscillator to a port, or synchronization of a port to a reference clock that is external to the host system.

The port adapter may further comprise a power control circuit that selectively generates power for the adapter during on line insertion and removal of the port adapter from the host system while the host system remains powered on. According to one feature, an identification repository stores a unique identifier of a type of the port adapter. In a related feature, the identification repository further stores one or more configuration parameter values associated with the port adapter. In yet another related feature, the identification repository comprises an electrically erasable programmable read only memory. The identification repository may store values that allow the host to determine whether the port adapter can be supported by the host system. The identification repository may store values that allow the host to determine one or more operating frequencies of the SPI-4 bus.

In another feature, an extended flow control bus is coupled to the host system that enables the adapter to communicate information on the SPI-4 bus using more than the 256 logical channels that are conventionally available using the SPI-4 bus. In a related feature, flow control interface logic for the flow control bus comprises a calendar-based mechanism that allows the port adapter to convey buffer fill status of thousands of logical channels to the host system. The extended flow control bus may comprise a TDM calendar frame sync signal, a flow control clock signal, a status signal, and a parity signal.

According to one feature, the adapter comprises zero interfaces, and wherein the interface logic is configured to receive one or more packets from the host system, transform the packets according to a specified function, and send the transformed packets to the host system. In a related feature, the specified function comprises encryption or decryption.

In another aspect, the invention provides a method of selectively determining an operating frequency for a SPI-4 bus of a host computer system that uses a port adapter, wherein the operating frequency may be different than a conventional SPI-4 bus operating frequency, comprising the steps of issuing a query from a host computer system having a SPI-4 bus to a port adapter, the port adapter comprising a SPI-4 bus that can be coupled to a host system for control and data between the host and the SPI-4 device, a control bus coupled in parallel with the SPI-4 bus between the host system and the port adapter for the port adapter independently from the SPI-4 bus, and interface logic that interfaces the SPI-4 bus and the control bus to one of a plurality of line interfaces, and an identification repository; receiving, from the identification repository, an identification of the port adapter; determining, based on the information received from the identification repository, whether the host system SPI-4 bus can operate at a frequency that is compatible with at least one of the SPI-4 bus operating frequencies that are supported by the port adapter; and setting an operating frequency of the host system SPI-4 bus equal to a selected one of the SPI-4 bus operating frequencies that are supported by the port adapter.

In one feature of this aspect, the setting step comprises setting the operating frequency of the host system SPI-4 bus equal to a fastest one of the SPI-4 bus operating frequencies that are supported by the port adapter. In another feature, the method includes powering-on the port adapter only when the host system SPI-4 bus can operate at a frequency that is compatible with at least one of the SPI-4 bus operating frequencies that are supported by the port adapter. In a related feature, the method comprises powering-on the port adapter only when one or more factors are satisfied, wherein the factors are selected from the set consisting of: the host system has software support for a packet format required by the port adapter; the port adapter dissipates less than a maximum amount of power dissipation allowed by the host system; the host system can match a bandwidth required by the port adapter; or a license authorization requirement associated with the port adapter allows the port adapter to run on the host system.

In another feature, the method further comprises receiving, from the identification repository, values that allow the host to determine whether the port adapter can be supported by the host system, and one or more operating frequencies of the SPI-4 bus. The method may further comprise receiving, from the identification repository, values that allow the host to determine a packet format of data that is sent across the SPI-4 bus by the port adapter. In a related feature, the method may further comprise receiving, from the identification repository, one or more values specifying a packet format of data that is sent across the SPI-4 bus by the port adapter.

In yet another aspect, the invention provides a port adapter for coupling zero or more network interfaces to a host system having a SPI-4 bus, the port adapter comprising: zero or more network interfaces; a SPI-4 bus coupled to a host system to provide a communication channel between the host and the network interfaces; a control bus coupled to the host system for controlling and monitoring the port adapter; interface logic that interfaces the SPI-4 bus and the control bus to the network interfaces; and packet processing logic for pre-processing packets received on the interfaces by performing the steps of: receiving a first packet on an ingress interface of the port adapter; creating a second packet that conforms to a selected one of the internal packet formats; transforming data from one or more fields of the first packet to one or more corresponding fields of the second packet; providing the second packet to a host system.

In one feature of this aspect, the packet processing logic further comprises the steps of moving a remainder of a packet header and packet body from the first packet into the second packet. The packet processing logic may be configured to perform the step of selecting one of a plurality of internal packet formats. The ingress interface may be, for example, an Ethernet interface, ATM interface, frame relay, serial interface, highly channelized interface, RPR interface, or POS interface, or any other interface now known or invented hereafter.

In other aspects, the invention encompasses a computer apparatus and a computer-readable medium configured to carry out the foregoing steps.

2.0 Structural and Functional Overview 2.1 Port Adapter Architecture

A pluggable port adapter is used to connect zero or more ports or interfaces to a host system through a SPI-4 bus to add functionality to the host system. Typically the ports or interfaces are high-bandwidth optical ports or interfaces. The port adapter communicates with the host system through a port adapter/host interface that includes the SPI-4 bus, a control bus, an extended flow control bus, and other signals and power lines. The ports or interfaces are configured and communicate in a normal manner over the SPI-4 bus while other functionality on the port adapter is controlled independently through the control bus.

In this document, the term "SPI-4" is equivalent to "SPI4.2" and includes variants of the SPI4.2 bus architecture. Thus, an embodiment may use a bus that strictly adheres to the SPI-4 specification, or may use variants, enhancements, modifications or improvements to the SPI-4 specification.

The host system uses a specialized identity bus to determine the identity of a port adapter, which the host system then uses to determine what programming and configuration is required. The control bus is used by the host system for configuring and controlling devices on the port adapter, and for updating programmable circuitry on the port adapter such as field programmable gate arrays (FPGAs). Alternatively, a JTAG bus can be used to update such programmable devices. FPGAs with volatile program memory must be programmed each time they are powered up and can be reprogrammed in the field by the host system to repair bugs and to enhance performance and/or functionality.

In one embodiment, the SPI-4 bus in the port adapter is coupled to SPI-4 termination logic, which is coupled to one or more network interfaces, such as a framer, ATM SAR, etc. In cooperation, the SPI-4 termination logic and network interfaces control zero or more ports, which are coupled to zero or more communication lines, devices, or networks such as local area networks (LAN) and wide area networks (WAN). The SPI-4 termination logic and network interfaces cooperate to receive data from the ports or interfaces and then retransmit the data on the SPI-4 bus in a reprocessed form, and to receive data from the host system and retransmit such data on a port.

The control bus can be used for programming logic on the port adapter such as interface logic, network interfaces and general-purpose registers or other programmable elements. The control bus also provides access to control interfaces of devices on the port adapter. The power bus is used, in conjunction with software that controls application of power, for conducting hot swap operations in which the port adapter is unplugged from or plugged into the host system while the host system either is powered and operating or is powered down. The port adapter may include a connector with one or more detect pins that are shorter than other power bus pins and other signal pins in the connector. In one embodiment, the shorter pins are at opposite ends of the connector. The shorter detect pins allow the port adapter and host system to anticipate and, in turn, respond to a hot swap condition by enabling power to the port adapter only after the port adapter is fully inserted. The shorter pins also enable the host system to determine that all pins are seated correctly. Upon removal of a port adapter, the short pins disconnect first and enable the port adapter to send signals to the host that are used to disable power to the port adapter.

When the port adapter is connected to the host system during a hot swap condition, control circuitry starts a controlled power-up sequence. When the port adapter is disconnected from the host system during a hot swap condition, the control circuitry starts a controlled power-down sequence.

A hot swap protocol between the port adapter and the host system discontinues data communications on the SPI-4 bus in the port adapter when the port adapter is not at an operational power level. When the port adapter is disconnected from the host system, signals coming from host circuitry are changed to known safe states to prevent potentially high currents from damaging devices during on-line insertion operations. The hot swap protocol also prevents corruption of data on the SPI-4 bus and corrupting logic states in the host.

A port adapter as disclosed herein can process data that is arriving from interfaces up to 10 gigabits per second (Gbps). In other embodiments, improvements to the SPI-4 bus architecture that allow faster data rates may be accommodated.

FIG. 1 is a block diagram that illustrates an overview of a host system with a port adapter. Generally, a host system 100 comprises a central processing unit (CPU) 101 that communicates with one or more port adapters 104A, 104B, 104N using host interface bus 102A, 102B, 102N which are multiplexed through host interface bus hub or multiplexer 109. Each host interface bus 102A, 102B, 102N includes a SPI-4 bus as well as other signals. CPU 101 may communicate with other circuits and devices using one or more other buses 105, such as an address bus, data bus, etc. For clarity, the depiction of system 100 is greatly simplified, and a practical system may include memory devices, I/O devices, route processors, network processors, a switch fabric, etc. System 100 may be implemented as a general-purpose packet-switching router or switch. In certain embodiments, system 100 comprises the Cisco 7300, 7600, 10000, or 12000 series products from Cisco Systems, Inc., San Jose, Calif.

Host system 100 may have one or more hot-pluggable port adapters 104A, 104B, 104N. There may be any number of port adapters in a practical system. A port adapter is also referenced herein by the equivalent term "shared port adapter" or SPA, or "versatile port adapter" or VPA. Each of the port adapters 104A, 104B, 104N comprises zero or more ports 106A, 106B, 106N. Each port is communicatively coupled to one of the networks 110A, 110B, 10N or devices within such networks using any suitable network communication technology, such as Ethernet, Fast Ethernet, Gigabit Ethernet, optical, serial or other interfaces. There may be any number of ports on a port adapter in a practical system. Each port 106A, 106B, 106N may be coupled to a different network 110A, 110B, 110N.

An embodiment with zero ports may comprise a service adapter in which the port adapter provides a computational or packet processing service rather than an interface function. A port adapter as described herein may have zero ports but may provide, for example, an encryption or compression function for the host. Further, in another embodiment a combination service adapter and port adapter may be provided that has one or more ports and also provides a packet processing service.

In the configuration of FIG. 1, each of the port adapters provides a mechanism for interfacing its ports to host interface bus 102A, 102B, 102N, respectively. Each of the port adapters 104A, 104B, 104N is hot pluggable, meaning that the port adapters can be removed from or installed into host system 100 while the host system is running. As a result, the host system 100 can be re-configured with different numbers of ports, or with ports that use different network technologies, while retaining the benefits of the SPI-4 bus architecture.

Figure 2:
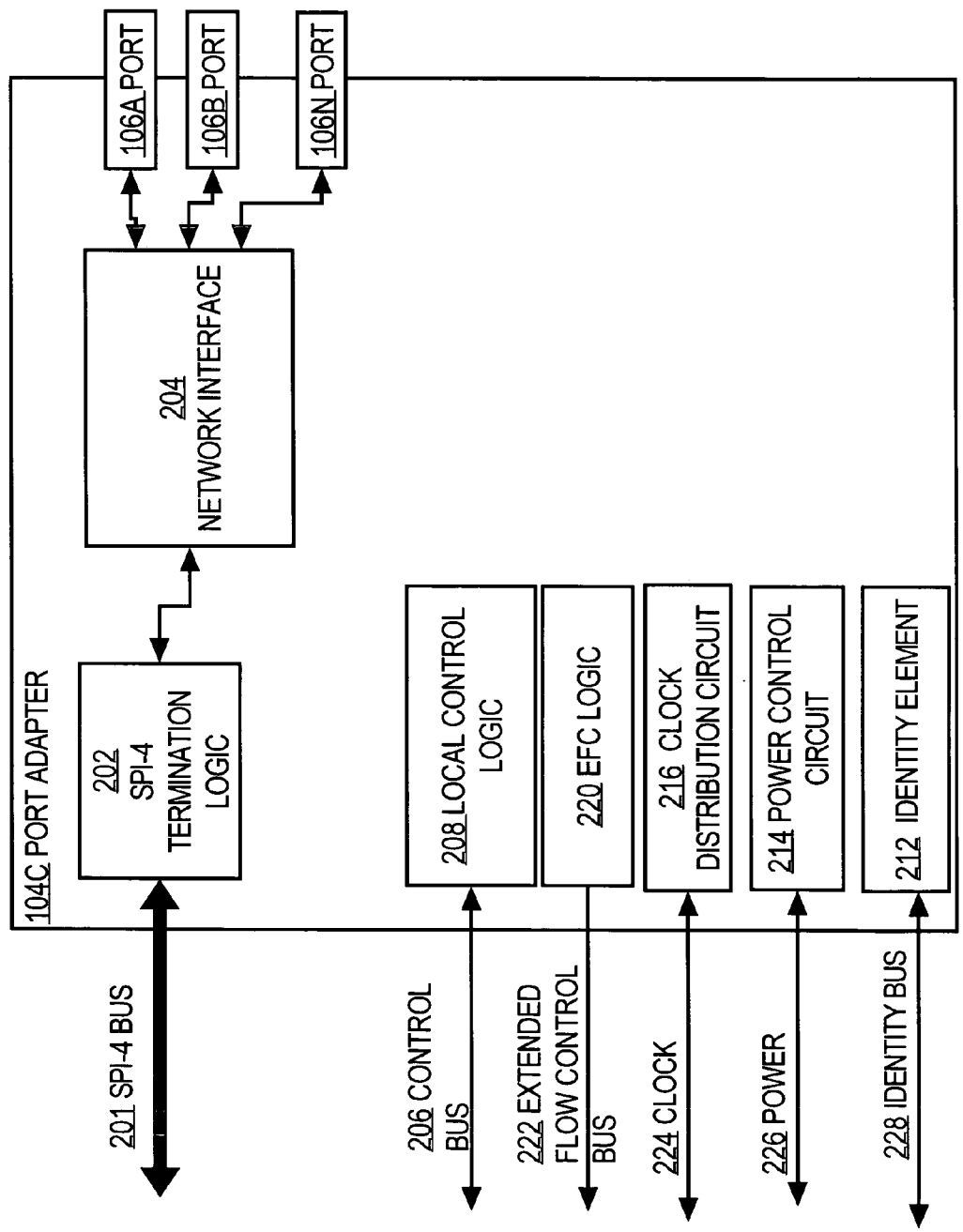
FIG. 2 is a block diagram that illustrates an overview of a port adapter for the SPI-4 bus.

FIG. 2 is a block diagram that illustrates an overview of one embodiment of a port adapter for the SPI-4 bus. Host system 100, which is omitted in FIG. 2 for clarity, is coupled to port adapter 104C through SPI-4 bus 201, control bus 206, extended flow control bus 222, clock bus 224, power control bus 226, and identity bus 228. Port adapter 104C comprises SPI-4 termination logic 202, which is communicatively coupled to SPI-4 bus 201 and to a network interface 204. In an embodiment in which ports 106A, 106B, 106N are Ethernet ports, network interface 204 may be a MAC (media access controller) that is responsible for rapidly forming and processing data frames, and can temporarily store data in memory. Alternatively, network interface 204 may comprise an ATM SAR, etc. Network interface 204 is communicatively coupled to ports 106A, 106B, 106N.

In the example of FIG. 2, one network interface 204 is shown. In other embodiments, a plurality of network interfaces may be provided, and each such network interface is coupled to SPI-4 termination logic 202. For example, there may be a different network interface 204 for each of the ports 106A, 106B, 106N.

In embodiments with zero ports, network interface 204 is omitted and other logic for performing packet processing services may be provided in its place. For example, an encryption engine or compression engine may occupy the same logical location as network interface 204.

Control bus 206 is connected to local control logic 208 in port adapter 104C. Identity bus 228 is connected to identity element 212, which can be queried by the host system 100 to determine the hardware arrangement and logical configuration of the port adapter 104C. The port adapter 104C further may include a power control element 214 and clock distribution circuit 216 that are respectively coupled to power control bus 226 and clock bus 224.

Extended flow control bus 222 is coupled to extended flow control logic 220. Details of the extended flow control bus are described further in a separate section below.

The port adapter 104C may be implemented as a plurality of integrated circuits that are mounted on one or more printed circuit cards that are enclosed in a protective housing. In one embodiment, each port adapter is mounted in a slot of a processing circuit card in the host system ("host card"). The port adapter housing may have any of several form factors, thereby providing a modular arrangement so that multiple different port adapters are interchangeable in the same host chassis. In one embodiment, a port adapter housing may have a half-height, full-height, double-wide, or high-power form factor based on the number and type of ports or interfaces provided in the port adapter, the amount of power dissipated by the port adapter, or the area required for the circuitry in the port adapter.

Local control logic 208, extended flow control logic 220, clock distribution circuit 216, power control circuit 214, and identity element 212 are represented in simplified, block form for clarity. In particular, connections to each such element are simplified, and each such element may have other connections in specific embodiments. Further, port adapter 104C may include circuit elements other than the specific elements that are shown in FIG. 2.

Figure 3:
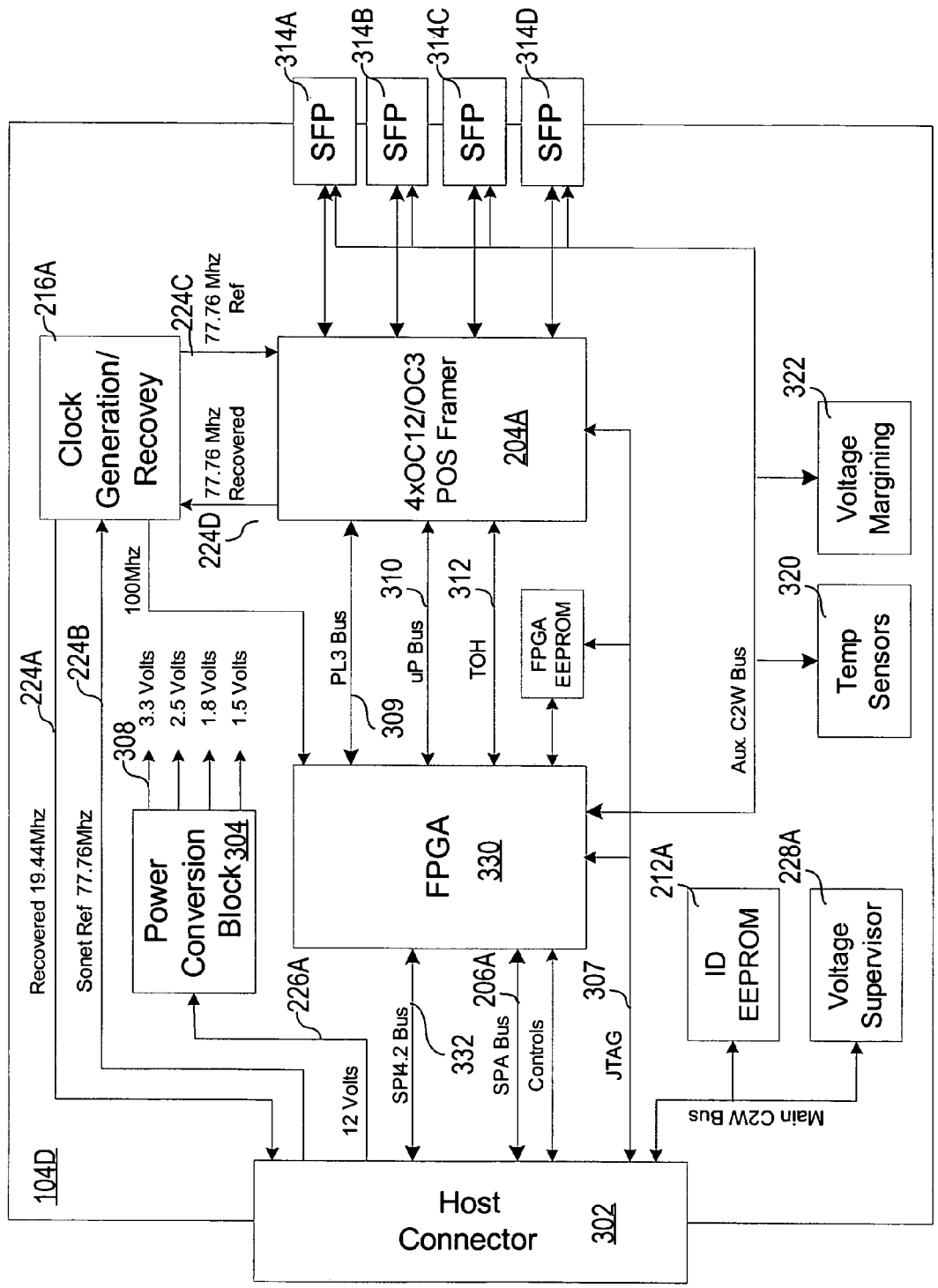
FIG. 3 is a more detailed block diagram of the port adapter of FIG. 2, according to one embodiment.

FIG. 3 is a more detailed block diagram of a port adapter of FIG. 2, according to one embodiment.

A host connector 302 provides a physical connection to the host system 100 (not shown in FIG. 3 for clarity) and carries clock, data, control, and power signals. A 12-volt power supply line 226A is coupled to a power conversion block 304 that provides a plurality of output power lines 308 at various voltage levels required by other elements of the port adapter 104D. In one embodiment, power conversion block provides outputs of 3.3V, 2.5V, 1.8V, and 1.5V; other output voltage levels may be provided in other embodiments. Further, power conversion block 304 may provide power sequencing, a power up/down function, power monitoring, power margining, etc.

SPI-4 bus 332 is coupled to FPGA 330. The SPI-4 bus 332 typically is an 86-pin packet data transfer bus that carries data bus signals, flow control signals, clock signals, etc. In certain embodiments, the operating speed of all such signals may be changed for compatibility among different hosts and port adapters, as further described herein. A SPA bus 206A is coupled from the host system 100 to the FPGA 330. SPA control bus 206A enables the host system to control and communicate with internal elements of the port adapter 104D. A JTAG bus 307 may carry test signals that are used for testing or PLD programming through communication among the host system 100 and programmable components, such as an FPGA 330 that implements the functions of SPI-4 termination logic 202 and local control logic 208 of FIG. 2. Host connector 302 may also carry miscellaneous signals for supporting online insertion and removal (OIR) operations, port adapter reset functions, etc.

FPGA 330 is coupled to framer 204A by a PL3 bus 309, microprocessor bus 310, and Transport Overhead (TOH) path 312. In one embodiment, framer 204A is the PM5360 S/UNI Multi-48 SONET/SDH framer, from PMC-Sierra, Inc., Santa Clara, Calif., which provides four (4) ports that are selectable between OC-12/STM-4 and OC-3/STM-1 bandwidth.

Framer 204A is coupled to one or more small form-factor pluggable (SFP) optics modules 314A, 314B, 314C, 314D that provide network ports and interfaces. The FPGA 330 detects insertion or extraction of the modules 314A, 314B, 314C, 314D to or from port adapter 104D.

Generally, FPGA 330 functions to decode and interface signals of the SPA bus 206A to signals from microprocessor bus 310. The FPGA 330 also provides control and status information relating to SFPs 314A, 314B, 314C, 314D. Further, the FPGA 330 provides bridging, queuing, and scheduling for communications among the PL3 bus 309 and SPI-4 bus 332, including management of ingress and egress FIFO queues, and the FPGA 330 may be involved in online insertion and removal and power control functions. The FPGA 330 is also configured for inserting and extracting SONET overhead information from packets that are communicated to or from the framer 204A. In one embodiment, FPGA 330 is implemented using the Xilinx 2V1500 and the SPI4, PL3, and HDLC IP cores.

Port adapter 104D also may include various other functional elements including clock generation/recovery module 216A, identity electrically erasable programmable read-only memory ("ID EEPROM") 212A, voltage supervisor 228A, temperature sensors 320, and voltage margining unit 322. The clock generation/recovery module 216A receives a 77.76 MHz SONET reference clock 224B from the host through host connector 302, provides a recovered 19.44 MHz clock 224A to the host via host connector 302, provides a 77.76 MHz reference clock 224C to the framer 204A, and receives a recovered 77.76 MHz clock signal 224D from the framer. The use of a recovered clock enables the clock generation/recovery module 216A to derive a system clock from any attached SONET port. The clock generation/recovery module 216A also generates a 100 MHz clock for operating FPGA 330.

The temperature sensors 320 may have a programmable temperature range for detecting and signaling over-temperature problems.

Optionally, an extended flow control bus coupled from host system 100 to the port adapter 104D functions to provide back pressure for port adapters with very high counts of physical or virtual ports. For example, in ATM, numerous virtual circuits may be present on one physical link. Thus, the extended flow control bus may be used for highly channelized port adapters, ATM port adapters, etc.

A detailed specification for an embodiment of a port adapter is provided in the Appendix to this document, the entire contents of which are hereby incorporated by reference as if fully set forth herein.

2.2 Adaptation to Different SPI-4 Operating Speed Rates

The host system 100 can query the ID EEPROM 212A using an identity bus 228A to determine the configuration of the port adapter 104D and to perform power control functions. In one embodiment, bus 228A conforms to the I2C signal format. The ID EEPROM 212A is an example of an identification repository. Based on the identifying information, software executed by the host system determines values specifying an operating frequency of the port adapter, and the format of data that is sent across the SPI-4 bus. For example, the host system software may include a lookup table that maps bus speed values, data packet formats, etc., to various port adapter identifiers. In an alternate embodiment, the identification repository stores bus speed values, data packet formats, and other configuration parameters in association with one or more port adapter identifiers for that port adapter or several different port adapters.

The information in the identification repository enables the host system to adapt its operational behavior to particular characteristics of the port adapter or its ports. For example, the standard operating frequency of the SPI-4 bus is 350 MHz ("full rate SPI-4"). However, not all port adapters require this frequency. For example, a port adapter that supports an aggregate data communication bandwidth of greater than 2.4 Gbps on its interfaces may require a full rate SPI-4 bus, but other port adapters that support only aggregate data communication bandwidth of less than or equal to 2.4 Gbps may operate adequately using SPI-4 bus signaling at less than 350 MHz.

Therefore, in one embodiment, the SPI-4 bus of port adapter 104D may be configured to operate at a quarter-rate speed of 87.5 MHz. In other embodiments, the SPI-4 bus of port adapter 104D may be configured to operate at any other speed, e.g., 700 MHz providing double-rate speed, etc. The identification repository of a port adapter contains a port adapter type identifier. Based on the port adapter type identifier, software executed by the host system can determine whether the port adapter supports a full rate SPI-4 bus speed, quarter rate, or both, or some other speed. Generally, in one embodiment, 1. A port adapter 104D that supports a total bandwidth less than or equal to 2.4 Gbps on its interfaces must support quarter rate on its SPI-4 bus, and may also optionally support full rate;

2. A port adapter that supports a total bandwidth of greater than 2.4 Gbps on its interfaces must support full rate on its SPI-4 bus, and may optionally also support quarter rate.

Host systems should conform to similar rules to ensure bandwidth compatibility across the SPI-4 connection to a port adapter. Thus, 3. A host system that supports a bandwidth of less than or equal to 2.4 Gbps in any of shared port adapter slot must support quarter rate on the SPI-4 bus for that slot, and may also optionally support full rate;

4. A host system that supports bandwidth of greater than 2.4 Gbps in any slot must support full rate on the SPI-4 bus for that slot, and may optionally also support quarter rate.

Using this arrangement, the host system may query the identification repository and adapt its operational behavior based on information in the identification repository.

Figure 4A:
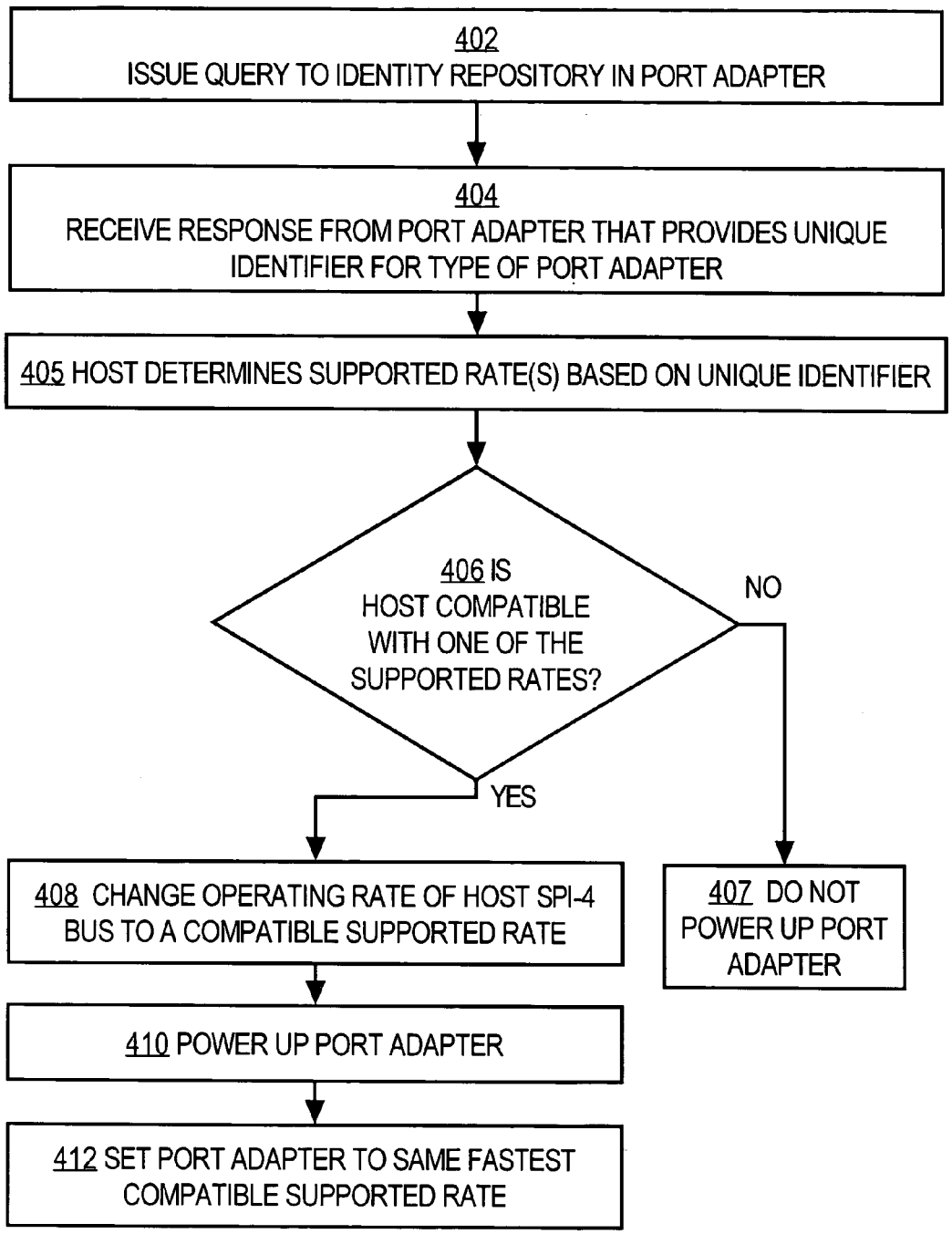
FIG. 4A is a flow diagram of a process of adapting the operational behavior of SPI-4 bus of a host system based on a capability of a port adapter.

FIG. 4A is a flow diagram of a process of adapting the operational behavior of the SPI-4 bus of a host system based on a capability of a port adapter. In block 402, a query is issued to an identification repository in a port adapter. For example, with reference to FIG. 3, host system 100 may issue signals on bus 228A to read the contents of ID EEPROM 212A. Block 402 may be performed before the host system provides power to a port adapter such as port adapter 104D. An identification repository such as ID EEPROM 212A may receive power from a separate power pin in the connector 302, which enables host system 100 to read port configuration information from the port adapter even when the port adapter is powered off.

In block 404, a response is received from the port adapter that includes a unique identifier for the port adapter. For example, reading ID EEPROM 212A results in port adapter 104D providing its unique identifier value. In block 405, the host determines one or more SPI-4 bus operating rates that are supported by the port adapter. For example, the host uses a stored lookup table to associate the received unique identifier value with one or more operating frequency values for the port adapter. Additionally, the host system may determine whether the port adapter can be supported by the host system, and the format of data that is sent by the port adapter on the SPI-4 bus. Alternatively, such values and configuration parameters are provided from the identification repository of the port adapter.

In block 406, the host system determines whether it is compatible with one of the supported rates that the host determined based on the identifier received from the identification repository of the port adapter. Block 406 may involve applying rules 1-4 as denoted above to determine whether a port adapter and host are compatible. For example, if the port adapter supports only quarter rate SPI-4, and the host requires full rate, then the host is not compatible with the port adapter. If the host is not compatible, then in block 407, the host does not power-up the port adapter, which cannot be used by the host system. The rules 1-4 above may be implemented in software executed by the host system.

Optionally, the process involves powering-on the port adapter only when one or more factors are satisfied. For example, block 406 can involve evaluating factors such as: whether the host system has software support for a packet format required by the port adapter; whether the host system has software support for the port adapter; whether the port adapter dissipates less than a maximum amount of power dissipation allowed by the host system; whether the host system can match a bandwidth required by the port adapter; whether a license authorization requirement associated with the port adapter allows the port adapter to run on the host system; etc.

If the host is compatible with the port adapter, then in block 408 the host changes the operating rate of its own SPI-4 bus to the fastest compatible supported rate. For example, if the port adapter identification repository indicates that the port adapter supports both quarter rate and full rate SPI-4, then the host changes its SPI-4 operating rate to full rate. In an alternative embodiment, the host changes the operating rate of its own SPI-4 bus to any one of the compatible supported rates.

In block 410, the host powers-up the port adapter by sending appropriate control signals; in the example of FIG. 2, such signals may be sent on the power control bus 226. In block 412, the host sets the port adapter to the same compatible rate that the host is using. For the example of FIG. 3, host system 100 sends control signals on SPA bus 206A to instruct the port adapter to use a particular rate. The rate that is set may be the fastest compatible rate, or any selected compatible rate.

Optionally, in other embodiments, the order of performing steps 408, 410, 412 may be changed, and the order of performing such steps is not critical.

Thus, using the approach of FIG. 4A, a host can query a port adapter for information about operational characteristics of the port adapter, and based on the received information, the host system determines whether it is compatible, whether to power-on the port adapter, and what operating rate to use.

Further, based on the received information, the host system may determine an operating frequency at which to run the SPI-4 bus. For example, full rate SPI-4 may be used, quarter rate may be used, etc.

The host system may also determine a particular format for data communication on the SPI-4 bus, as described further in section 2.4 below, for example.

2.3 Extended Flow Control Bus

A conventional SPI-4 bus addresses a maximum of 256 channels, and provides support for FIFO queue status indications for 256 channels in a normal addressing mode. However, port adapters that have a large number of channels ("highly channelized" or ATM SPAs, for example) may need 1,000 or more channels. Therefore, it is desirable to have a port adapter flow control bus that can support more than 256 channels per port adapter.

Accordingly, an extended flow control bus and associated method is provided to extend a port adapter to enable use with more than 256 channels. In this arrangement, a port adapter requiring less than or equal to 256 channels may use a conventional SPI-4 control bus for flow control, and optionally may use an extended flow control bus as defined herein. If a port adapter uses the extended flow control bus as defined herein, the port adapter also still uses the conventional SPI-4 flow control bus for gross (rather than subchannel or virtual channel) flow control of traffic aggregates such as port adapter-level or physical port-level flow control.

In one embodiment, Extended Flow Control Bus 222 carries a time domain multiplexed (TDM) calendar frame sync signal, a flow control clock signal, a status signal, and a parity signal. The flow control clock signal provides a source clock that is used by the host to clock in the data value on the status signal, and is sourced by the sender of flow control data, which is normally the port adapter. An example clock frequency is 50 MHz, but any other suitable clock frequency may be used.

In one embodiment, the status signal is a one-bit signal, but other forms of status signaling may be used. The status signal provides an indication whether channel FIFO status is above or below a threshold value, corresponding to the channel programmed for the TDM timeslot. The parity value provides even or odd parity, in various embodiments, across the status signal and frame sync signal for a particular clock cycle. Use of a separate parity signal allows flexibility in changing the frame size to any length, in various embodiments. Optionally, a port adapter may not support the extended flow control bus, in which case the foregoing signals are not connected.

Thus, in an embodiment, the extended flow control bus uses a TDM calendar-based mechanism that carries per-channel FIFO status information over a single data bit. The calendar is programmed by the host system 100 when channels are configured and set up at the port adapter and host. In one embodiment, time slots are allocated in proportion to the bandwidth of the channel. Embodiments may approximate channel bandwidths to the closest power of 2 and may allocate time slots in a way that reduces the total number of flow control time slots. In one embodiment, the calendar comprises a table in which rows correspond to timeslots and columns carry channel numbers and FIFO status information. In one particular embodiment, there are 16584 rows each comprising a channel number in 12 bits and one status bit.

The port adapter uses the calendar to determine which channel is polled for FIFO status and which channel is sent in a particular timeslot or clock period. The host uses a similarly configured calendar to determine which channel's FIFO status flow control information is carried in a particular timeslot.

In one embodiment, the number of supported channels is configurable so that it can adjust to the capabilities of a particular host. For example, a host card may support only 1K flow-controllable entities, and therefore certain port adapters may need to support fewer than the maximum number of channels.

A detailed description of the extended flow control bus is provided in section 2.3 of the Appendix.

2.4 Pre-Processing Packets With Port Adapter

In one embodiment, each port adapter 104A, 104B, 104N may communicate with external networks or devices using any of a large number of network technologies. As a result, data packets that are received at the port adapters may have any of a large number of different formats. In an embodiment, each port adapter provides data to the host in one of a small number of basic packet formats, all of which are understood by the host. For example, in one specific embodiment, four (4) packet formats are used, and a port adapter supports one or more of the four formats to communicate with a host. In this approach, since port adapters are targeted at many different host systems, the formats hide the detail and processing burden associated with a specific media type as much as possible within the port adapter to assist the host to operate at high speed or with less complex packet processing. In addition, the packet formats provide header fields that are as small as possible, to reduce the bandwidth utilized on the SPI-4 bus.

Figure 4B:
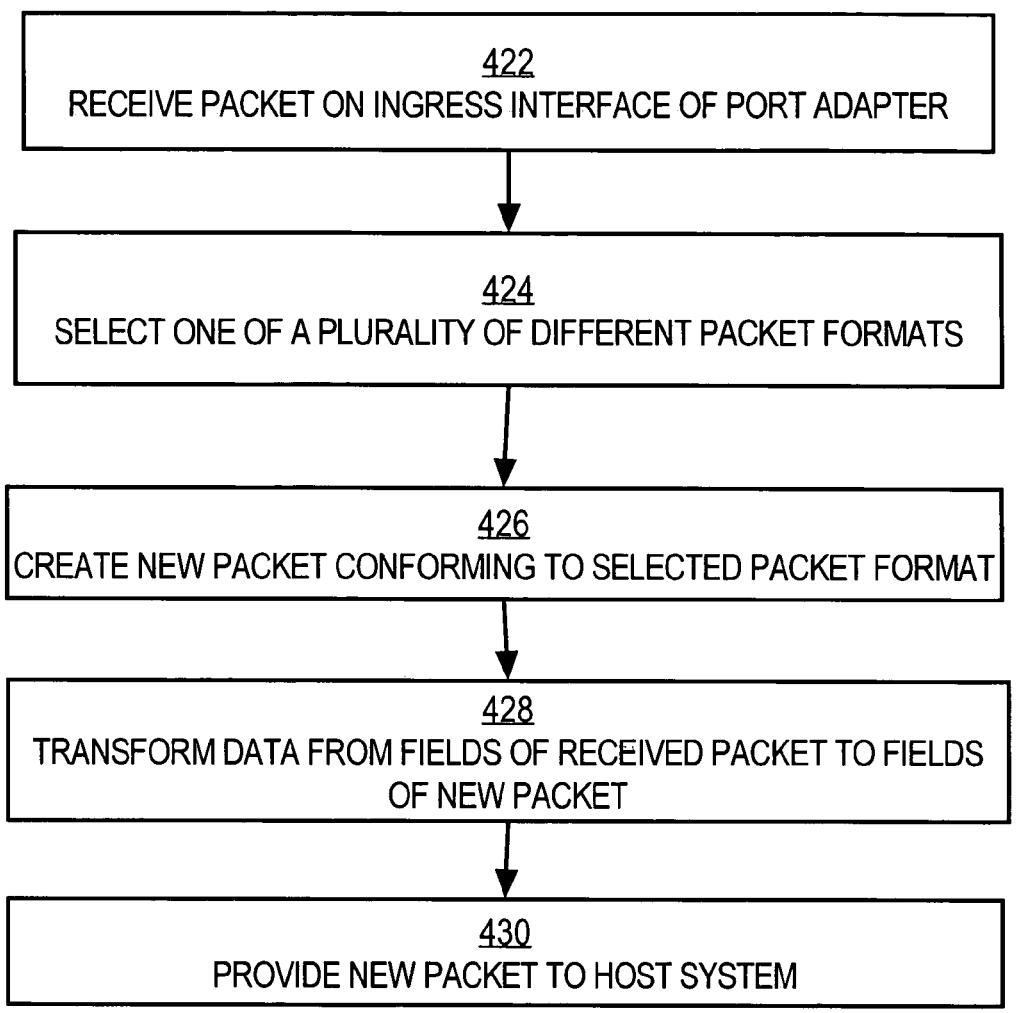
FIG. 4B is a flow diagram that illustrates an overview of a process of transforming received data packets.

FIG. 4B is a flow diagram that illustrates an overview of a process of transforming received data packets.

In block 422, a packet is received on an ingress interface of a port adapter. In one embodiment, the process of FIG. 4B is performed by a port adapter as shown in FIG. 2. Thus, the steps of FIG. 4B may be performed by the SPI-4 termination logic 202, for example. The packet received at block 422 is formatted according to a native packet format of a particular networking technology that is supported by the port adapter. Example technologies include Ethernet, ATM, Frame Relay, etc.

In block 424, one of a plurality of different packet formats is selected. Block 424 typically involves selecting one of several packet formats, e.g., a format other than the native format in which the packet was received. In one specific embodiment described further below, a packet format is selected from among Ethernet SPA 8-byte shim format, ATM SPA 4-byte shim format, Highly Channelized SPA 4-byte shim format, and a no shim format. The selected format may include more or fewer data fields than the fields that are in the received packet. Performing block 424 may comprise simply selecting one specified packet format associated with the then-current port adapter. Further, in the case of a port adapter that supports Ethernet packets, a particular packet format may be selected based on a VLAN identifier carried in a packet.

In block 426, a new packet conforming to the selected format is created.

In block 428, data from the fields of the received packet is transformed into one or more corresponding fields of the new packet. The data transformation may be performed according to a data-driven mapping or programmatic rules that specify which fields of a particular ingress packet format are transformed to which other fields of the target packet format. Further, the mapping or rules may specify transformations of data or values obtained from sources other than the packet, such as interface identifier, packet length, congestion status, packet validity checks, etc.

In block 430, the new packet is provided to the host system. For example, in FIG. 2, the new packet is communicated from SPI-4 termination logic 202 on the host system bus 201 to the host system 100.

The four packet formats used in an embodiment may be designated, for example, as:

Format A: Ethernet SPA 8 byte shim format.

Format B: ATM SPA 4 byte shim format.

Format C: Highly Channelized SPA 4 byte shim format.

Format D: No shim format

Each such format is described in detail in the Appendix.

Figure 5:
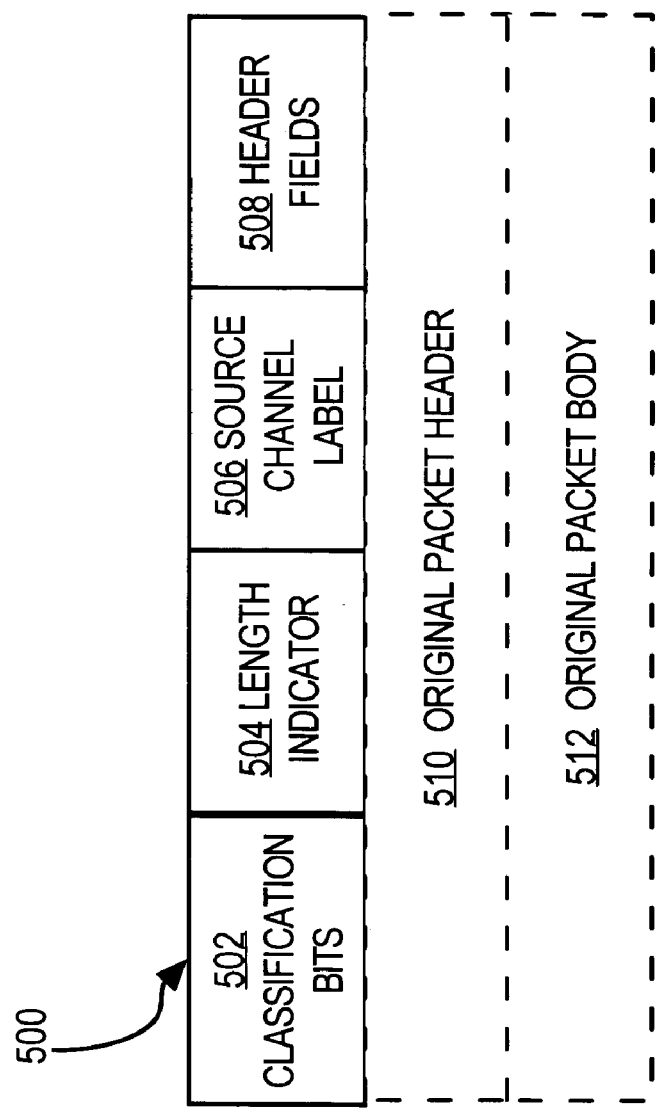
FIG. 5 is a block diagram of a transformed packet format.

FIG. 5 is a block diagram of a generalized transformed packet format. In the embodiment of FIG. 5, a packet 500 comprises classification bits 502, length indicator 504, source channel label 506, and header fields 508. The classification bits 502 carry information conveying a class value associated with the received packet. The classification information may originally derive from any of several different packet fields, including but not limited to the Type of Service (ToS) field of an IP packet, 802.1q priority information, MAC address filtering information, etc. Length indicator 504 may specify a length adjustment that has been made to the original packet, or may specify an absolute length of the transformed packet. Source channel label 506 specifies a logical or physical channel on which the original packet arrived. Header fields 508 carry information derived from header fields of the original packet.

The generalized format of FIG. 5 may be adapted in various ways to different formats of inbound packets. For example, in an Ethernet SPA 8 byte Shim Format, the port adapter strips Layer 2 encapsulation from a packet entirely and replaces it with an 8-byte shim header that includes all relevant information from the original packet for a forwarding engine of the host to make an efficient forwarding decision. The lower 4 bytes are approximately formatted in the same way as a Frame Relay header, allowing possible simplification of design of the host's forwarding engine.

Stripping the Layer 2 header is optional on a per-packet basis, allowing support for Layer 2 tunnels such as Ethernet over MPLS. If the Layer 2 header is left on the packet, then it can also optionally be padded with two or three bytes to bring the Layer 3 header to 4-byte alignment, as an optional optimization for some hosts. The first byte of the padding indicates the number of padding bytes present, for example.

In this case, because the format of the packet leaving the port adapter can include optional stripping of the variable-length Layer 2 encapsulation, and the addition of a shim header, the Length Indicator value 504 indicates the number of bytes by which the packet is shorter as compared to when the packet was first received. The Layer 3 engine of host system 100 can determine the original Layer 2 length by adding the value of Length Indicator value 504 to the total number of bytes received from the port adapter.

Header fields 508 may include the Protocol ID ("PID") of the Layer 2 header of the packet, and the port adapter may have translated the value. Certain special values of the PID field indicate that the host must apply special treatment to the particular packet; the special values are software configurable. For example, special PIDs may be used to indicate a tunneled packet, exception packet, or other special characteristics. For a tunneled packet, when the VLANID and port number of the arriving packet are configured to enter an Layer 2 tunnel, then the entire packet with its original Layer 2 encapsulation is brought into the host system. An exception packet indicates that the port adapter has detected something about the packet that requires the host to perform special treatment on the packet. More than one exception packet special PID may be defined. This may allow classification of the packets into different priority CPU queues, for example.

Optionally, as part of transforming a first packet into a particular selected packet format, the header 510 and/or body 512 of the original packet may be placed in the transformed packet 500. Thus, the packet format used within the host and port adapter may include the original packet header 510 and/or original packet body 512. The original header and body may be omitted depending on the nature of the traffic that is processed or the context in which it is processed.

Similar transformation techniques may be applied to other different packet formats of inbound packets.

Additionally or alternatively, rather than transforming packets, packets may be dropped. For example, if a port adapter receives a packet from a Layer 2 address or VLAN that is of no interest to the port adapter or host, then that packet may be dropped.

3.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, a port adapter may classify packets as high priority or low priority and provide priority information in the transformed packet format to enable the host to determine which packets to process first. As an alternative to carrying packet priority information in the transformed packet format, two or more logical SPI-4 channels may be associated with one physical port, in which a first logical channel carries port traffic associated with a first priority level and the second or additional channel(s) carry traffic associated with a second or other priority level. In this approach, the host adapter may be configured through software to process all packets arriving on the higher priority channel first without having to consult priority information within the packets.

In another variation of the architecture described above, one of the logical SPI-4 channels may be used as a control path as an alternative to providing some or all control signals on control bus 206 (FIG. 2) or SPA bus 206A (FIG. 3). In this alternative, a specified logical channel carries control packets separate from an associated logical channel that carries port data traffic. The control channel may be considered as having the highest priority for the host. Further, an advantage of this approach is that the control packets may be synchronized or aligned in time with the transmission of associated data packets. Further, the bandwidth of the SPI-4 bus used for the logical channel used for control in this approach is typically higher than the bandwidth of the SPA bus 206A or control bus 206, which may be useful for sending large volumes of control data, statistics, etc.

In still another variation, a specified SPI-4 logical channel can be used to carry flow control information, e.g., in the form of events.

APPENDIX
SPA Generic Hardware Specification EDCS-172353 Rev: 1.0

CISCO SYSTEMS

Document Number    EDCS-172353
Revision    1.0

Shared Port Adapter (SPA)

Generic Hardware Functional Specification

This specification is the result of a working group called the SPA Merge. Numerous people across business units contributed directly to this document either through writing specific chapters or through their ideas and their participation and involvement in the numerous meetings and discussions that formulated the contents of this specification. The following is a list some of the key contributors, please note that this list does not attempt to capture all of the participants in this process: Alvar Dean, Garry Epps, Guy Fedorkow, Mike Freeston, Luc Filiou, Mark Gustlin, Mike Healy, Roger Li, John Merullo, Promode Nedungadi, John Prokopik, Rick Santarpio, Mo Tatar, Greg Twiss

Approvals

| Name | Name | Name |
| --- | --- | --- |
| Dinesh Khurana<br>Engineering Director | Bill Swift<br>Engineering Director | Rajiv Deshmukh<br>Engineering Director |
| Nader Vasseghi<br>Engineering Director | Robert Haragan<br>Engineering Director | Ashwath Nagaraj<br>Engineering Manager |

A printed version of this document is an uncontrolled copy.

© 2001 Cisco Systems, Inc.      Company Confidential

SPA Generic Hardware Specification EDCS-172353 Rev: 1.0

Modification History

| Rev | Date | Originator | Comment |
|---|---|---|---|
| 0.1 | | Mark Gustlin | Preliminary Draft. This document is based in part on the SPA Generic Hardware Specification authored by Randall Johnson for the Stonehenge program. |
| 0.2 | | Mark Gustlin | Many changes and additions were made in all sections. Many were the result of an internal review of the document. This is the first version generally available. |
| 0.3 | | Mark Gustlin | Incorporated comments from the full team review. The Molex connector including the pinout is now part of the specification. Change bars are enabled and show the delta between rev 0.2 and 0.3. |
| 0.4 | | Mark Gustlin | The significant changes/updates are:<br>- Added quarter rate SPI4 details<br>- C2W pullup values changed<br>- eeprom changed to a 512x8 device<br>- connector pinout was corrected<br>- connector propagation times were added<br>- SPA generic register set is added<br>- LED requirements are updated<br>- OIR requirement are revised<br>- A JTAG appendix was added<br>- SPA compliance checkoff list is added<br>In addition change bars are enabled to show the deltas between rev 0.3 and 0.4. |
| 0.5 | | Mark Gustlin | The significant changes/updates are:<br>- The concept and details of a Half Height SPA has been added<br>- The concept of a High Power SPA has been added<br>- The rules for quarter rate operation have been added<br>- The SPIREF clock is 350MHz for full rate and 87.5MHz for quarter rate<br>- The fifo status bus timing for quarter rate has been relaxed<br>- The SPA bus has been designated as Big Endian, and registers must be naturally aligned<br>- The VALID_L pullup moves to the SPA<br>- SONET reference is now located on the host, pins were added to carry the signal, and a new section describes it.<br>- Added the signal ISPSEL, allows isolation of the JTAG chain to just ISP devices<br>- The 12V spec has been loosened to +10% -15%.<br>- The primary doublewide connector has been designated<br>- Format A shim header has been revised<br>- A requirement that ethernet spas be store and forward has been added<br>- Basic counter requirements have been added<br>- The bit perr_int has been added to the SPA_BRD_INT_STAT_REG<br>- Appendix A has been updated with information on SPI4 calendar requirements<br>- Appendix C has been added which is a Host compliance checklist<br>- Appendix E has been added which gives the I/O standards for SPAs<br>- Appendix F has been added which gives some background on the design of the EFC bus<br>In addition change bars are enabled to show the deltas between rev 0.4 and 0.5. |

A printed version of this document is an uncontrolled copy.

© 2002 Cisco Systems, Inc.                                                                    Company Confidential SPA Generic Hardware Specification EDCS-172353 Rev: 1.0

| Rev | Date | Originator | Comment |
|---|---|---|---|
| 0.6 | | Mark Gustlin | The significant changes/updates are:<br>- The SPA bus protocol has been significantly changed, valid_l assertion and srdy_l assertion has changed<br>- SPA Bus 64 bit transactions have been removed<br>- err_l signal has been changed to transaction based<br>- The SPA bus data codes have been changed<br>- SPA bus special accesses have been added for the 7300 host<br>- SONREF must be terminated if not used<br>- Jitter specification has been added for SONREF<br>- Jitter specification has been added for bclk<br>- +12V specification is +/- 8% now<br>- Clarified the +12V protection requirements<br>- The midplane SPA option has been removed<br>- The SPA_ERROR_REG has been added<br>- SPA_BRD_INT_STAT_REG has been made clear on write<br>- SPA board interrupts are visible even if masked off to allow for polling<br>- Clarifications have been added to the OIR Table 54<br>- Appendix B has been updated<br>- Vod min is changed to 250mV for the LVDS DC I/O specification<br>In addition change bars are enabled to show the deltas between rev 0.5 and 0.6. |
| 1.0 | | Mark Gustlin | Revision 0.6 was reviewed in a SPA wide review on 10/04/2002. The following significant changes have been made to this version as an outcome of the review meeting.<br>- alpha increment is specified as 1<br>- the spi4ref clock duty cycle is relaxed to 40/60%<br>- the spi4ref clock jitter for 1/4 rate is relaxed to 100psec<br>- a requirement is added that the host must park the spa bus during idle cycles.<br>- added p/n's for all the currently defined connectors<br>-DS1621 is added as an option for the temperature sensor<br>- SFP interrupts are now visible in the status register even if masked<br>- C2W data registers are corrected to shift out the MSB first<br>- IEEE 1596.3 is replaced with TIA/EIA-644-A-2001<br>- the LVDS DC I/O specifications have been update<br>In addition change bars are enabled to show the deltas between rev 0.6 and 1.0. |

A printed version of this document is an uncontrolled copy.

© 2002 Cisco Systems, Inc.                                    Company Confidential

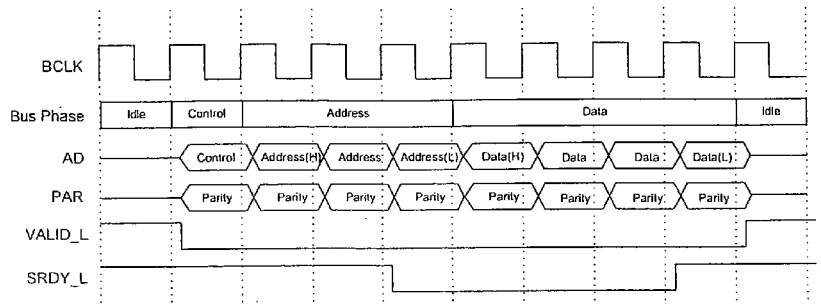

Figure 10: SPA Bus Write Transaction

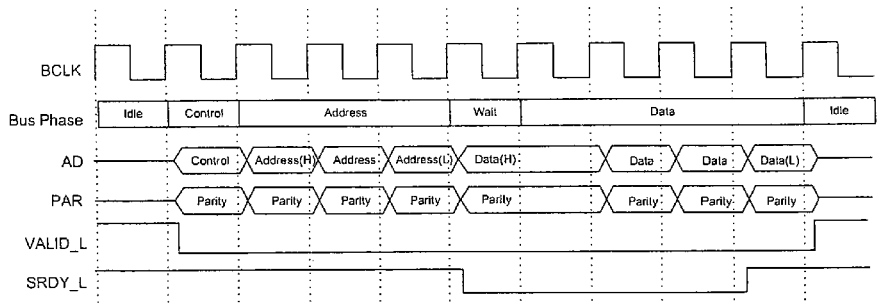

Figure 11: SPA Bus Write Transaction With 1 Wait State

The following diagrams show read transactions with a data size of 32 bits. The bus requires a turn around cycle between the address and the data as bus control is transferred from the initiator to the target. VALID_L only frames the control and address portion of the transaction. SRDY_L frames the data portion of the transaction. The target can only insert wait states before the data phase of the transaction begins (once SRDY_L is asserted is must remain asserted until the transaction is completed). There must be at least one idle cycle between transactions.

SPA Generic Hardware Specification EDCS-172353 Rev: 1.0

Table of Contents

| | | |
|---|---|---|
| 1.0 | Introduction | 8 |
| 2.0 | SPA Electrical Interface | 12 |
| | 2.1 SPA Data Interface | 12 |
| | 2.2 SPA Bus | 25 |
| | 2.3 Extended Flow Control Bus | 40 |
| | 2.4 SONET Reference Interface | 45 |
| | 2.5 Serial Interface | 47 |
| | 2.6 JTAG Interface | 49 |
| | 2.7 Power Interface | 51 |
| | 2.8 Misc Control Interface | 51 |
| 3.0 | SPA Mechanical Interface | 53 |
| | 3.1 Connector Description | 54 |
| | 3.2 Pin Definitions | 56 |
| | 3.3 Connector Use on Double-wide SPAs | 57 |
| 4.0 | SPA Packet Formats | 58 |
| | 4.1 Format A: Ethernet SPA 8 byte Shim Format | 58 |
| | 4.2 Format B: ATM SPA 4 Byte Shim Format | 60 |
| | 4.3 Format C: Highly Channelized SPA 4 byte shim format | 61 |
| | 4.4 Format D: POS/RPR SPA/Ethernet/etc. - no shim format | 62 |
| 5.0 | Miscellaneous SPA requirements | 63 |
| | 5.1 Ethernet SPAs | 63 |
| | 5.2 Optical SPAs | 63 |
| | 5.3 Counter Requirements | 63 |
| | 5.4 Margining Capabilities | 63 |
| | 5.5 Programmable Logic | 64 |
| | 5.6 High Availability Requirements | 64 |
| | 5.7 Auxiliary C2W Interface | 64 |
| 6.0 | SPA Mechanical Assembly | 66 |
| | 6.1 Mechanical Design Requirements | 66 |
| | 6.2 Full Height Major Dimensions | 67 |
| 7.0 | SPA Register Set | 69 |
| | 7.1 Register Nomenclature | 69 |
| | 7.2 SPA Register Definitions | 69 |
| | 7.3 SPA FPGA CSR Region: SPA General Registers | 72 |
| | 7.4 SPA FPGA CSR Region: SPA Interrupt Registers | 77 |
| | 7.5 FPGA CSR REGION: SPA Cisco 2 Wire (C2W) Registers | 89 |
| 8.0 | SPA LEDs | 98 |
| | 8.1 SPA Status LED | 98 |

A printed version of this document is an uncontrolled copy.

© 2002 Cisco Systems, Inc.  Company Confidential

| | | |
|---|---|---|
| | 8.2 SPA Port Status LEDs | 98 |
| 9.0 | Card Detect Logic and Online Insertion/Removal (OIR) | 102 |
| | 9.1 Overview | 102 |
| | 9.2 OIR Level of Isolation | 102 |
| | 9.3 Connector Contact Sequence | 103 |
| | 9.4 OIR Logical Block Diagrams and Signal Description | 104 |
| | 9.5 OIR Insertion Sequence of Events | 107 |
| | 9.6 OIR Extraction Sequence of Events | 109 |
| 10.0 | SPA Regulatory Compliance | 111 |
| 11.0 | References | 112 |
| A.0 | SPI4.2 FIFO Requirements and Notes | 113 |
| B.0 | SPA Compliance Checklist | 121 |
| C.0 | Host Compliance Check List | 123 |
| D.0 | JTAG Details | 124 |
| E.0 | I/O Standards | 130 |
| F.0 | Extended Flow Control Notes | 132 |

SPA Generic Hardware Specification EDCS-172353 Rev: 1.0

Definitions

| | |
|---|---|
| ATM | Asynchronous Transfer Mode |
| BITS | Building Integrated Timing Supply |
| C2W | Cisco 2 Wire bus |
| CDR | Clock and Data Recovery |
| ChOC | Channelized OC-x |
| DCC | Data Communications Channel |
| DDR | Double Data Rate |
| EDVT | Electronic Design Validation and Test |
| EEPROM | Electrically Erasable Programmable Read Only Memory |
| FCTS | Flow Control Time Slot |
| FIFO | First In First Out memory |
| FIT | Failure In Time |
| FPGA | Field Programmable Gate Array |
| FR | Frame Relay |
| GE | Gigabit Ethernet |
| HDLC | High Level Data Link Control |
| IPC | Inter-Processor Communication |
| JTAG | Joint Test Action Group |
| LED | Light Emitting Diode |
| LVCMOS | Low Voltage Complimentary-symmetry MOS logic |
| LVDS | Low Voltage Differential Signaling |
| LVTTL | Low Voltage Transistor-Transistor Logic |
| OC-12 | Optical Carrier level 12 |
| OIR | On-line Insertion and Removal |
| PECL | Positive Emitter-Coupled Logic |
| PL4 | POS-PHY Level 4 |
| PLD | Programmable Logic Device |
| PLL | Phase Locked Loop |
| POS | Packet Over SONET |
| PPP | Point-to-Point Protocol |
| RPR | Resilient Packet Ring |
| SDH | Synchronous Digital Hierarchy |
| SDR | Single Data Rate |
| SONET | Synchronous Optical NETwork |
| SPA | Shared Port Adapter |
| SPI | Serial Protocol Interface |
| SPI4.2 | System Packet Interface-4/Phase II |

A printed version of this document is an uncontrolled copy.

© 2002 Cisco Systems, Inc.     Company Confidential

| | |
|---|---|
| SRAM | Synchronous Random Access Memory |
| STS | Synchronous Transport System |
| SFP | Small Form-factor Pluggable |
| WCCP | Web Cached Control Protocol |

1.0 Introduction

This document provides requirements for a generic Shared Port Adapter (SPA). SPAs are small plug in modules containing circuitry to provide optical or electrical network interfaces. The packet data is transferred to/from the SPA via a SPI4.2[1] interface capable of supporting up to 10Gbps full-duplex bandwidth. Control information is passed to/from the SPA via a proprietary I/O bus called the SPA Bus.

SPAs provide a convenient means of providing multiple network interface types while maintaining a common processing and routing engine. For example, an 8 port OC-12 POS SPA could be used on any platform supporting the SPA architecture. This is preferable over having separate 8 port OC-12 POS linecard designs for different platform types. SPAs can be used across platforms to reduce the amount of platform specific designs and allow much more design reuse.

The SPA concept includes several variations on mechanical sizes and power dissipation capabilities. The following are the four possible SPA form factors.

| SPA Type | Faceplate dimension | Maximum Power Dissipation | Comments |
|---|---|---|---|
| Half Height (HH-SPA) | 6.75" x 0.67" | 20W | Preferred SPA type. Allows for maximum port density and modularity. |
| Full Height (FH-SPA) | 6.75" x 1.4" | 25W | 2nd best choice. Allows for good port density and higher power dissipation than the HH-SPA. |
| High Power (HP-SPA) | 6.75" x 1.4" | 40W | 3rd best choice. Allows for good port density and higher power dissipation than the FH-SPA, but will require restrictions in some platforms. |
| Double Wide (DW-SPA) | 13.53" x 1.4" | 50W | Least preferred choice. Does not provide for any modularity at the linecard level. |

Please note that the first two choices (HH-SPA and FH-SPA) are by far the preferred form factors. Choosing either the HP-SPA or DW-SPA should only be done as a last resort and with the agreement of the SPA community since they have serious impacts on modularity and will limit their ability to be used in all hosts.

SPAs can be used in any platform if the platform meets the requirements to support SPAs as described in this document. All SPAs must meet the requirements as described in this document to be deemed "SPA compliant". This will ensure inter-operability between SPAs and the hosts that utilize SPAs. In addition Appendix B presents a SPA compliance check list that must be filled out included in each SPA HW specification.

Generic FH and HH SPA cards are shown in Figure 1 and Figure 2.

---

1. See the SPI4.2 (PL4) Interface Specification, available at www.oiforum.com/public/technical.html, for more details.

SPA Generic Hardware Specification EDCS-172353 Rev: 1.0
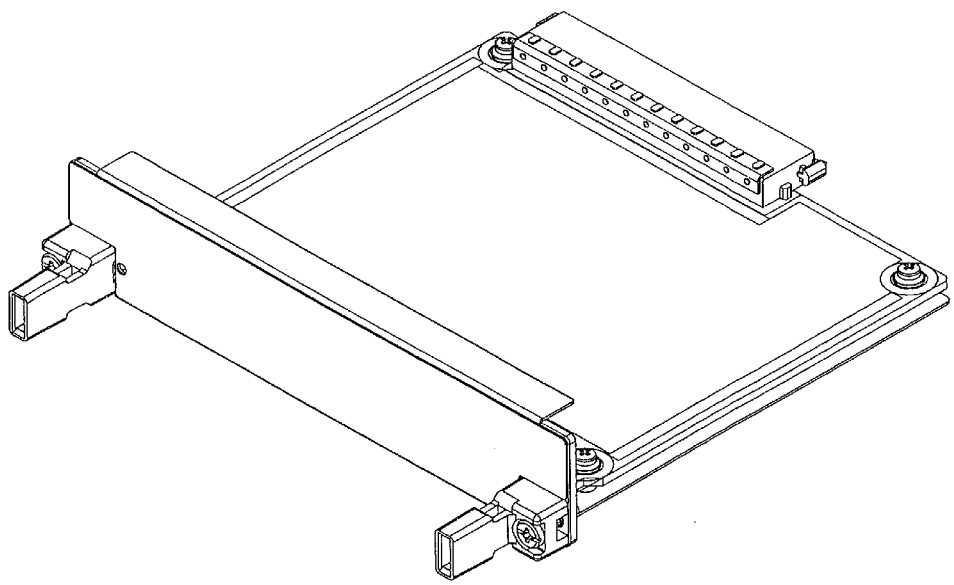
Figure 1: Generic Full Height SPA SPA Generic Hardware Specification EDCS-172353 Rev: 1.0
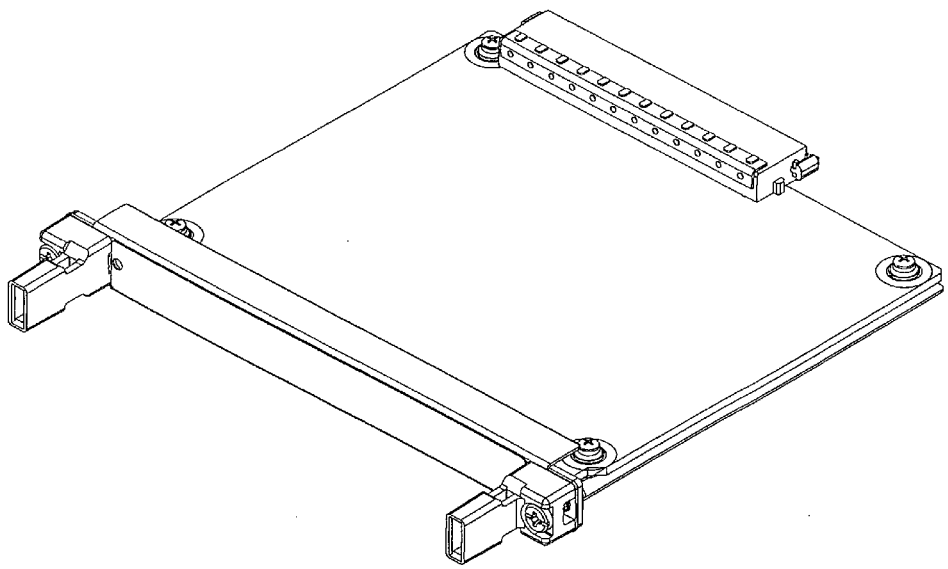
Figure 2: Generic Half Height SPA
An overview of the SPA to Host interfaces is shown in Figure 3.

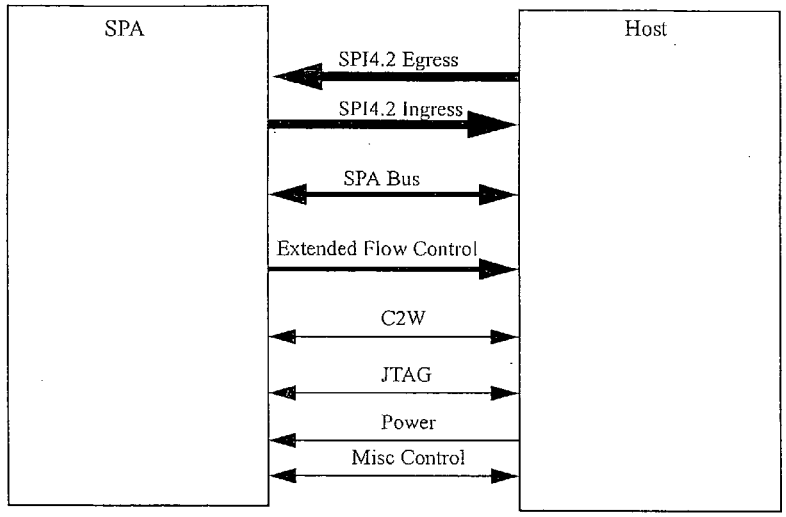

Figure 3: SPA To Host Interface

The following table contains a summary of the SPA's main attributes.

| Attribute | Value |
| --- | --- |
| Power Dissipation | 20, 25, 40 or 50 Watts Maximum depending on the SPA form factor. |
| Packet Data Interface | SPI4.2 (2x16 bits LVDS, 350MHz or 87.5MHz DDR)[a] |
| Control Bus | 8 bit Mux A/D @ 50MHz |
| Flow control <= 256 channels | SPI4.2 @ 87.5MHz or 21.875MHz |
| Flow control > 256 channels | Extended Flow Control Bus, 1 bit @ 50MHz |
| Power Supply Rail | +12V |

Table 1: SPA Attributes a. Only the 350MHz version is compliant with the SPI4.2 standard, the 87.5MHz is a Cisco created variant.

2.0 SPA Electrical Interface

SPAs interface to the host system via separate data, control, and power interfaces. The following sections specify the signals and protocols that are required in a SPA and a host that supports SPAs. The following table summarizes the interfaces, their pin counts and their functions.

| Interface | Function | # of Pins |
|---|---|---|
| SPI4.2 | Packet Data Transfer | 86 pins |
| SPA Bus | SPA control/communication | 14 pins |
| Extended Flow Control | Back pressure for highly channelized SPAs | 4 pins |
| SONET Reference | SONET reference | 3 pins |
| C2W | ID eeprom and power control | 2 pins |
| JTAG | PLD Programming, test bus | 6 pins |
| Power | Provides 12V power | 6 pins |
| Misc | OIR control, reset etc. | 7 pins |

Table 2: SPA Electrical Interface Summary

In general for signals that cross the SPA connector (for both host and SPA), the single ended trace impedance must be 50 ohm +/- 10%. Differential signals must be 100 ohms +/- 10%. This will promote uniformity and inter working between SPAs and Hosts.

2.1 SPA Data Interface

The SPA's data interface is provided via a SPI4.2 interface. The SPI4.2 interface is an industry standard (also known as PL4) interface providing 10Gbps full duplex bandwidth.

The SPA or host passes packet traffic per the normal mode of operation as defined by the SPI4.2 specification. This means that packet data from multiple channels can be interleaved on the interface. This requires the host to provide packet segmentation and reassembly. Hosts should support 256 channels on the SPI4.2 interface, if a host supports less than 256 channels, that would limit which SPAs could be used in that host.

If a SPA supports N channels, that SPA must at least support SPI4.2 channel addresses from 0 to N-1.

The Normal standards based operating frequency of the SPI4.2 bus for our application is 350MHz DDR, this is referred to as full rate SPI4.2 in this document. In addition to that, we have created a proprietary rate of 87.5MHz DDR which is referred to as quarter rate.

The rules for supporting normal vs. quarter rate speeds are indicated in the following bullets.
- A SPA that supports <= 2.4Gb/s BW on its interfaces MUST support quarter rate on its SPI-4.2 interface. It may also support full rate SPI-4.2 but is not required to.
- A SPA that supports > 2.4Gb/s on its interface MUST support full rate on its SPI-4.2 interface. It may also support quarter rate SPI-4.2 but is not required to.
- A host card that is only required to support <= 2.4Gb/s in each of its SPA slots MUST support quarter rate SPI-4.2. It may, but is not required to, support full rate SPI-4.2.
- A host card that is required to support > 2.4Gb/s in any of its slots MUST support full rate, and SPA Generic Hardware Specification EDCS-172353 Rev: 1.0 should support quarter rate SPI-4.2 so that it can accept any SPA type.

All hosts and SPA's must comply to the minimum start-of-packet interval of 8 cycles as specified in the SPI4.2 standard. Very small packets (for example a 5 or 7 byte frame relay packet) can still be carried over the SPI4.2 interface. In this case the transmitter must fill the gap with idle control words to comply with the 8 cycle interval.

The LVDS electrical standards details can be found in Appendix E.1. This must be followed by all SPAs and Hosts.

2.1.1 SPI4.2 Bus Signals

The SPI4.2 bus interface consists of the signals in the following table.

| Name | # of bits | SPA Direction | Type | Description |
|---|---|---|---|---|
| TDCLK_P/N | 1 | Input | LVDS | Transmit Data Clock, 350MHz or 87.5MHz nominal |
| TDAT[15:0]_P/N | 16 | Input | LVDS | Transmit Data Bus |
| TCTL_P/N | 1 | Input | LVDS | Transmit Control |
| TSCLK_P/N | 1 | Output | LVDS | Transmit Clock Status, 87.5MHz or 21.875MHz nominal |
| TSTAT[1:0]_P/N | 2 | Output | LVDS | Transmit FIFO Status |
| RDCLK_P/N | 1 | Output | LVDS | Receive Data Clock, 350MHz or 87.5MHz nominal |
| RDAT[15:0]_P/N | 16 | Output | LVDS | Receive Data Bus |
| RCTL_P/N | 1 | Output | LVDS | Receive Control |
| RSCLK_P/N | 1 | Input | LVDS | Receive Clock Status, 87.5MHz or 21.875MHz nominal |
| RSTAT[1:0]_P/N | 2 | Input | LVDS | Receive FIFO Status |
| SPI4REF_P/N | 1 | Input | PECL[a] | Receive Reference Clock, 350MHz or 87.5MHz. Must be ac coupled on the host. Must be biased and terminated on the SPA. |

Table 3: SPI4.2 Bus Signals a. Since this is AC coupled on the host, it can be driven by a PECL, LVPECL or any other driver that meets the requirements of Table 14.

All of the SPI4.2 signals are differential and require 100 ohm differential termination. Typically this termination is provided internal in the receiver. In cases where this is not true, external termination would be required.

2.1.2 SPI4.2 FIFO Status Signals

The SPI4.2 interface standard allows either 1/8 data rate LVTTL or full data rate LVDS signaling for the transmit status and receive status control signals. Although LVTTL is used by most devices today, SPAs will implement LVDS signaling for these signals to accommodate potential future data rates, improved signal quality, and to avoid dependence on 3.3V LVTTL signaling. The status bus is still run at 1/8 the data rate (either 87.5MHz or 21.875MHz SDR).

It is the responsibility of the SPA designer to provide circuitry to convert any LVTTL SPI4.2 status signals to/from LVDS for transport across the host interface. This conversion can be done with devices such as the National Semiconductor DS90LV047A quad LVDS driver and DS90LV048A quad LVDS receiver.

Ethernet SPAs may use the SPI4.2 FIFO status channels to determine when to generate 802.3x Pause/Resume frames. In this mode an Ethernet MAC may start generating Pause frames when the ingress SPI4.2 FIFO status changes from Starving to Hungry. It will generate Resume frames when the status changes from Hungry to Starving. Additional details of this application can be found in Appendix A. In addition Ethernet SPAs can be configured to split out ingress traffic on each physical interface into 2 priorities associated with 2 SPI-4 channels.

RPR SPAs will use SPI4.2 FIFO status to control back pressure for the different possible traffic priorities. This means it uses multiple SPI4.2 channels for one logical pipe. For example, an RPR SPA may support four priorities levels of traffic. Each priority would be mapped to a different SPI4.2 channel, and each channel reports its FIFO status separately. This allows the SPA to back pressure the host on a per priority level which in turn allows the host to queue traffic on a per priority level.

2.1.3 FIFO Status and Buffer Sizes

The following table gives the possible SPI4.2 FIFO status states.

| Event | Status Bits | Result |
|---|---|---|
| Starving | 00 | MAXBURST1 total credits granted to the transmitter. |
| Hungry | 01 | MAXBURST2 total credits granted to the transmitter or the current unused credits, whichever is greater. |
| Satisfied | 10 | No impact on credits. |
| Framing/Disabled | 11 | All outstanding credits are cancelled and set to zero. |

Table 4: SPI4.2 FIFO Status

The following is a diagram of a FIFO on the sink side of a SPI4.2 interface and a way to relate the Maxburst parameters and the FIFO thresholds. MaxBurst1 and MaxBurst2 must be programmable on the source side of a SPI4.2 interface. The value $\varepsilon$ is a quantization error and corresponds to the difference between the granted credit and the actual transfer length. In general this is at most equal to Burstsize - 1 in bytes. The value of Lmax is undefined in the standard and it corresponds to the worst case delay in receiving a status update, until observing the reaction to that update on the corresponding data path. Additional details of Lmax calculation is in Appendix A. The question is what size of FIFO do you need on the sink side of the SPI4.2 bus.

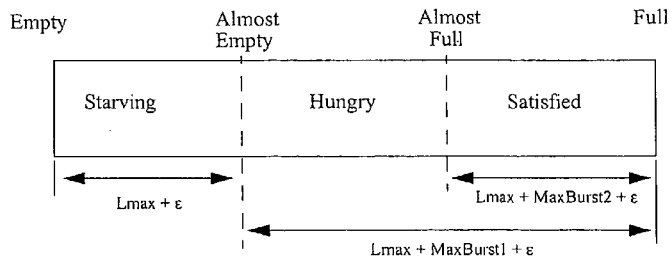

Figure 4: SPI4.2 FIFO Thresholds

For the egress case (host to spa) we want to minimize the required FIFO size on the SPA so we have a large selection of devices to choose from. This means the host should minimize its response latency (its Lmax contribution). There are a variety of devices on SPAs that support a large variety of FIFO sizes on their SPI4.2 interface. Some devices are store and forward and support multiple MTUs of buffer space per port. Others are cut-through and only support a fraction of an MTU per channel. So far the most restrictive device is the Barracuda, it is a cut-through device that supports 512 bytes per channel (when channelized to DS3s). Appendix A has details of possible configurations for such a device, along with the required Lmax. FIFO thresholds (almost empty and almost full) must be programmable on the sink device.

For the ingress case (spa to host) we want to maximize the FIFO size on the host system so we can work with a large selection of devices on SPAs. This will correspond to devices that have a large latency (Lmax). For a typical SPA with multiple channels, a FIFO size of 4kBytes would allow for a reasonable Lmax. The most demanding application though, is Ethernet (GE in particular). A 10x1GE SPA may require up to 244kBytes per port. This is to support long links and pause frame generation, please see Appendix A for details of the this requirement. Regardless of the size of the ingress FIFOs on the host, the thresholds of the FIFOs should be programmable (almost empty and almost full). This will allow the host to interwork with a variety of SPAs with a variety of MaxBurst1 and MaxBurst2 settings.

2.1.4 Ingress Maxburst Settings

The main reason to specify a Maxburst1 and Maxburst2 range is to limit how large the per channel fifos are on the host and SPA and to ensure a window of inter-operability between hosts and SPAs.

Most SPAs support a wide range of programmable values for Maxburst1 and Maxburst2. In order to bound the required per channel FIFO size on the host's ingress buffer and to ensure a inter-operability range for SPAs and hosts, a requirement is placed on the SPA that it must support a setting of Maxburst1 and Maxburst2 of 512 bytes or less. Support for the possibility of setting Maxburst1 and Maxburst2 to values > 512 bytes is allowed and encouraged. An example will illustrate this requirement; below is a list of hypothetical SPAs and their capabilities for the programming of Maxburst1 and Maxburst2:

| Possible Maxburst1&2 Settings | Compliance Statement |
| --- | --- |
| 512 | Compliant |
| 64 | Compliant |
| 16-64k | Compliant |
| 1024 | Non-compliant |
| 64-256 | Compliant |

A host on the ingress side must support receiving bursts from 16 bytes up to the 512 byte bursts (in steps of 16 bytes) since a SPI4.2 source may burst up to the Maxburst setting.

2.1.5 Egress Maxburst Settings

A host can support a wide range of programmable values for Maxburst1 and Maxburst2. In order to bound the required per channel FIFO size on the spa's egress buffer and to ensure a inter operability range for SPAs and hosts, a requirement is placed on the host that it must support a range of settings of Maxburst1 and Maxburst2 from 64-256 bytes in 64 byte increments. Support for the setting of Maxburst1 and Maxburst2 to a wider range than this is allowed and encouraged. An example will illustrate this requirement; below is a list of hypothetical hosts and their capabilities for the programming of Maxburst1 and Maxburst2

| Possible Maxburst1 &2 Settings | Compliance Statement |
|---|---|
| 512 | Non-compliant |
| 16-64k | Compliant |
| 1024 | Non-compliant |
| 64-256 | Compliant |

A SPA on the egress side must support receiving bursts from 16 bytes up to its preferred Maxburst settings since a SPI4.2 source may burst up to the Maxburst setting.

2.1.6 SPI4.2 Clocks

A 350MHz PECL reference clock for full rate or 87.5MHz PECL reference clock for quarter rate will be provided by the host system for synchronizing SPI4.2 transfers to the host system (this is provided on the pins called SPI4REF_P/N). This clock may be used for the device driving the ingress side of the SPI4.2 interface on the SPA, but it is not required. The host must not require that the egress and ingress SPI4.2 interfaces be synchronous to each other. This will allow a SPA that generates its own ingress SPI4.2 clock to work in any host. On the other hand, the SPI4.2 reference clock that is driven to the SPA (and used on some SPAs for the ingress reference clock) must be synchronous (frequency locked) to the egress SPI4.2 interface. This will allow a SPA that uses a SPI4.2 device which requires the ingress and egress to be frequency locked to work in any host (current PMC-Sierra devices have this requirement). This clock will be AC coupled on the host system and will require a 100 ohm differential termination on the SPA side of the net plus DC biasing. If this clock is not utilized then a 100 ohm termination is still required on this signal on the SPA.

2.1.7 SPI4.2 Training Patterns

SPI4.2 supports dynamic data alignment (deskew) on a per bit basis, by using training patterns transmitted periodically across the interface. These training patterns are used by the receiving end of the SPI4.2 interface for deskewing bit arrival times on the data and control lines.

It is required that all SPAs and all hosts support dynamic data alignment when they support full rate operation, this is not required for quarter rate operation. All SPAs and all hosts must support the capability to transmit and receive training patterns (for full and quarter rate operation). For quarter rate operation training patterns at a minimum are used at startup and can also be transmitted at other times. The training pattern consists of 1 idle control word followed by 10 training control words, followed by 10 training data words. This should be repeated once every DATA_MAX_T cycles. In addition, the parameter $\alpha$ defines the number of repetitions of the training pattern that must be scheduled every DATA_MAX_T cycles. DATA_MAX_T and $\alpha$ are configured on the tx side of the SPI4.2 interface, see Table 6 for requirements for these parameters.

SPI4.2 dynamic alignment can be implemented in at least two ways, either through a CDR functionality or by using a multi-tap PLL. Hosts and SPAs, independent of how the dynamic alignment is implemented, must work well with the standards defined training pattern. Table 5 shows the format for the SPI4.2 standard training pattern.

| Cycle | CTL | DATA[a] |
|---|---|---|
| 1 | 1 | 0xx000000000abcd |
| 2 to 11 | 1 | 0000111111111111 |
| 12 to 21 | 0 | 1111000000000000 |
| $20\alpha - 18$ to $20\alpha - 9$ | 1 | 0000111111111111 |
| $20\alpha - 8$ to $20\alpha + 1$ | 0 | 1111000000000000 |

Table 5: Standard Training Pattern a. xx and abcd depend on the contents of the previous data (EOPS and DIP4).

2.1.8 SPI4.2 Initialization Sequence

Before Reset is deasserted, SPIREF, TSCLK and TDCLK driven from the host must be active and stable. RDCLK and RSCLK driven by the SPA must also be stable before reset is deasserted. The requirements for how long reset must be deasserted may vary from SPA to SPA and is something that SW would account for when bringing a SPA out of reset.

After a reset, but before traffic is sent, the transmitter must send continuous training patterns. This continues until valid information is received on the FIFO status channel. After reset but before traffic is sent, the FIFO status channel transmitter shall send a continuous "11" framing pattern (the status channel physical layer is LVDS but running the LVTTL protocol). Once the FIFO status calendar has been programmed, and the corresponding data channel has achieved synchronization, then the FIFO status channel may begin transmission of valid FIFO status. Once the data channel sees this, it may begin data transmission.

2.1.9 SPI4.2 Programmable Values

The following tables summarizes the different values that are programmable or optional for a SPI4.2 interface and the minimum required support for both hosts and SPAs.

| Parameter | Definition | Required Value[a] |
|---|---|---|
| Input bit alignment mode for full rate operation | The receiver has the capability of centering the data and control bits relative to the clock on a per bit basis. Uses training patterns to center the clock. | Dynamic alignment |
| Output bit alignment mode for full rate operation | Transmits training patterns periodically in order to train the receiver. | Dynamic alignment |
| Input bit alignment mode for quarter rate operation | Normally the receiver samples the data at a fixed offset of 90 degrees from the rising or falling clock edge. | Static alignment |
| Output bit alignment mode for quarter rate operation | Still has the capability to transmit training patterns but not normally used except for at startup. | Static alignment |
| FIFO status mode | I/O mode. | LVDS but at 1/8 the data rate (LVTTL rate) |
| Nominal data rate | Each bit toggles at this rate | 700Mbps (350Mb DDR) for full rate, 175Mbps (87.5Mb DDR) for quarter rate. |
| Burst_Size | Maximum data burst size. | Sources may burst from 16 bytes up to the programmed Maxburst1 or Maxburst2, in increments of 16 bytes. |
| Maxburst1 for the Host | Maximum number of 16 byte blocks that the FIFO can accept when the FIFO status channel indicates Starving | Programmable from 64 to 256 bytes, increments of 64 bytes. |
| Maxburst2 for the Host | Maximum number of 16 byte blocks that the FIFO can accept when the FIFO status channel indicates Hungry. Maxburst2 <= Maxburst1 | Programmable from 64 to 256 bytes, increments of 64 bytes. |
| Maxburst1 for the SPA | Maximum number of 16 byte blocks that the FIFO can accept when the FIFO status channel indicates Starving | Support a setting to at least one value in the range from 16 - 512 bytes. |
| Maxburst2 for the SPA | Maximum number of 16 byte blocks that the FIFO can accept when the FIFO status channel indicates Hungry. Maxburst2 <= Maxburst1 | Support a setting to at least one value in the range from 16 - 512 bytes. |
| $\alpha$ | Number of the repetitions of the data training sequence that must be scheduled every DATA_MAX_T cycles. | Programmable from 1 to 16 repetitions, in increments of 1. |
| DATA_MAX_T | Interval between scheduling of training sequences on the tx data path interface (in cycles). | Programmable from 1000 to 10000 cycles[b] |
| Training pattern | Used by the receiver to train/select the optimum location to sample the rx data. | Standards based. |
| CALANDER_LEN | Length of the Calendar sequence | Must support at least one entry per channel that is supported.[c] |
| CALANDER_M | Number of repetitions of the Calender sequence between framing patterns. | Must support a value of 1 at a minimum. |

Table 6: SPI4.2 Programmable Values a. This is a minimum requirement, support for greater flexibility is encouraged.
b. Imposes overhead of 2-0.2% with $\alpha$ of 1.
c. See Appendix A.1 for more discussion on the Calendar requirements.

2.1.10 PCB Routing Requirements for Full Rate SPI4.2

The following are the SPI4.2 data path SPA and Host routing requirements:
- maximum intra-pair skew (between each P and N) of <= 4 ps (0.020 inch skew[1]) for all data, control and clocks per side (4ps for the SPA side, 4ps for the host side).
- The lengths in the following table must be observed.

| Signal | Length on Host | Length on SPA |
|---|---|---|
| TDCLK_P/N | 1"-12" | 1"-12" |
| TDAT[15:0]_P/N | Within 0.1" of TDCLK_P | Within 0.1" of TDCLK_P |
| TCTL_P/N | Within 0.1" of TDCLK_P | Within 0.1" of TDCLK_P |
| RDCLK_P/N | 1"-12" | 1"-12" |
| RDAT[15:0]_P/N | Within 0.1" of RDCLK_P | Within 0.1" of RDCLK_P |
| RCTL_P/N | Within 0.1" of RDCLK_P | Within 0.1" of RDCLK_P |

Table 7: SPI4.2 Full Rate Routing Requirements

The following are the SPI4.2 status routing requirements:
- maximum intra-pair skew (between each P and N) 4 ps (0.020 inch skew) for all data and clocks (4ps for the SPA side, 4ps for the host side).

The following are the SPI4.2 SPI4REF_P routing requirements:
- maximum intra-pair skew (between each P and N) 4 ps (0.020 inch skew), (4ps for the SPA side, 4ps for the host side).

2.1.11 SPI4.2 Data Path Timing Requirements for Full Rate SPI4.2

The SPI4.2 specification defines two timing points for the control and data bus, Point A at the output of the source and point B and the input to the sink.

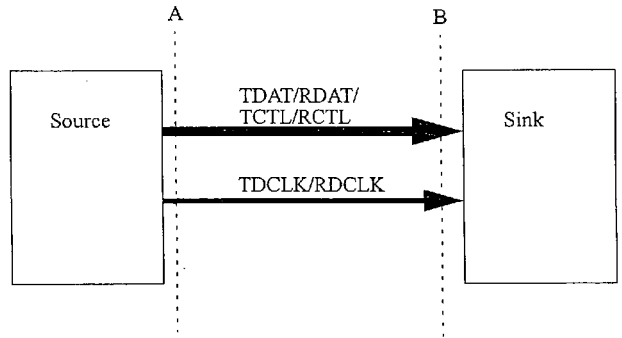

Figure 5: SPI4.2 Data Timing Reference Points

---

1. Assumes 200psec/inch, a very conservative assumption.

SPAs and Hosts only support dynamic alignment for full rate SPI4.2, and the timing budget that must be observed is given in the following table.

| Description | Value (peak-to-peak) | Value (psec)[a] |
|---|---|---|
| Clock Jitter at reference point A | 0.10UI[b] | 143 |
| Data Jitter at reference point A | 0.24UI | 343 |
| Data jitter between point A and B | 0.23UI | 328 |
| Budget for after reference B | 0.375UI | 535 |
| EDVT budget (+5%) | 0.05UI | 71 |
| Total | 0.995UI | 1421 |

Table 8: SPI4.2 Full Rate Timing Budget a. Assuming 700MHz Data Rate
b. Normally not all of this counts against the timing budget, it depends of the frequency response of the receiver's PLL, high frequency jitter is normally filtered out.

The sink timing budget for a typical SPI4.2 device can be broken out in more detail as shown in Table 9. In this example, the sink uses a multi-tap PLL with 8 phases per data period for sampling (this is the minimum granularity that is recommended).

| Description | Value (peak-to-peak) | Value (psec)[a] |
|---|---|---|
| Synthesis Jitter at reference point B | 0.20UI | 286 |
| Sampling granularity at point B | 0.125UI | 178 |
| Variation in sampling point at point B | 0.05UI | 71 |
| Total | 0.375UI | 535 |

Table 9: SPI4.2 Full Rate Sample Rx Timing Budget a. Assuming 700MHz Data Rate

An eye mask will be developed and will be applicable at the SPA connector.

The nominal SPI4.2 frequency is 350MHz, both egress and ingress will be run at this speed. Also SPAs and Hosts must function at +/- 5% from this frequency to support EDVT frequency margining.

In addition the SPI4REFP/N clock must have at the following properties at reference Point B.

| Description | Min | Max | Units |
|---|---|---|---|
| Frequency[a] | 332.5 | 367.5 | MHz |
| Duty Cycle[b] | 40 | 60 | % |
| Total Jitter | | +/- 50 | psec[c] |
| Differential Voltage Swing | 600 | 1000 | mV |

Table 10: SPI4REFP/N Requirements a. Must be frequency locked to the egress SPI4.2 clock, nominal frequency is 350MHz.

b. The duty cycle requirements for TDCLK_P/N and RDCLK_P/N is defined by the SPI-4 specification and is 45/55.
c. Peak to Peak

2.1.12 PCB Routing Requirements for Quarter Rate SPI4.2

The following are the SPI4.2 data path SPA and Host routing requirements:
- maximum intra-pair skew (between each P and N) of <= 4 ps (0.020 inch skew[1]) for all data, control and clocks per side (4ps for the SPA side, 4ps for the host side).
- The lengths in the following table must be observed. Note that the budget for the host side is not defined. Instead the timing budget will be specified at the SPA connector, this will allow a host design to trade of length/skew/setup/hold etc.

| Signal | Length on SPA |
|---|---|
| TDCLK_P/N | 1"-12" |
| TDAT[15:0]_P/N | Within 0.5" of TDCLK_P |
| TCTL_P/N | Within 0.5" of TDCLK_P |
| RDCLK_P/N | 1"-12" |
| RDAT[15:0]_P/N | Within 0.5" of RDCLK_P |
| RCTL_P/N | Within 0.5" of RDCLK_P |

Table 11: SPI4.2 Quarter Rate Routing Requirements

The following are the SPI4.2 status routing requirements:
- maximum intra-pair skew (between each P and N) 4 ps (0.020 inch skew) for all data and clocks (4ps for the SPA side, 4ps for the host side).

The following are the SPI4.2 SPI4REF_P routing requirements:
- maximum intra-pair skew (between each P and N) 4 ps (0.020 inch skew), (4ps for the SPA side, 4ps for the host side).

---

[1]. Assumes 200psec/inch, a very conservative assumption.

2.1.13 SPI4.2 Data Path Timing Requirements for Quarter Rate SPI4.2

The SPA and Hosts will normally use static alignment for quarter rate SPI4.2 implementations. The timing budget is broken out into two sections, the first addresses the ingress direction which is from the SPA to the host. This budget ends up with a valid window that gives the host the flexibility to have a large setup and hold time and low skew traces, or a small setup and hold time with lots of relative skew.

| Description | Value (psec) |
| --- | --- |
| Source invalid window at point A | 1000 |
| Data skew on the SPA | 200 |
| Total data jitter | 500 |
| EDVT budget (+5%) | 286 |
| Clock Duty cycle distortion | 571 |
| Total invalid window at the connector | 2557 |
| Safety margin | 500 |
| Total valid window for the Host sink | 2657 |

Table 12: SPI4.2 Ingress Quarter Rate Timing Budget

As seen in Figure 6, the valid window is centered around a 90 degrees phase shifted clock. The invalid window is centered around the rising or falling edge of the RDCLK_P[1].

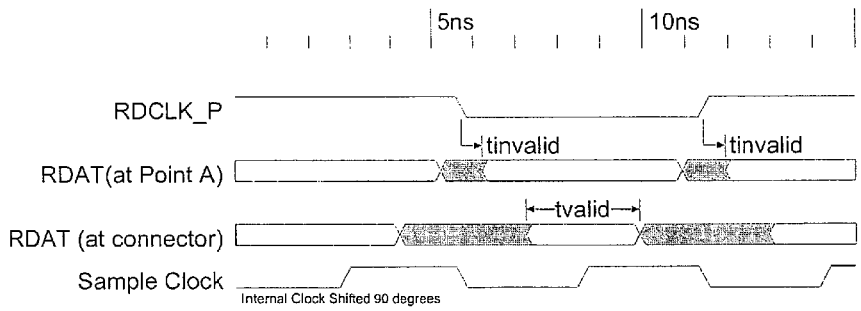

Figure 6: Ingress Quarter Rate Timing Diagram

---

1. Note that this is different than the SPI4.2 specification. The SPI4.2 specification specifies that data is sampled at the clock edges. Because the data is also clocked out on the clock edges, this would require a large clock rate dependent skew between the clock and data on the board. We choose instead to sample data 90 degrees from the clock edges.

The second table gives the timing budget for the egress direction (host to spa). This budget ends up with an invalid window that gives the host the flexibility to have a large clock to out time and low skew traces, or a small clock to out time with lots of relative skew.

| Description | Value (psec) |
| --- | --- |
| Data skew on the SPA | 200 |
| Total data jitter | 500 |
| EDVT budget (+5%) | 286 |
| Clock Duty cycle distortion | 571 |
| Total valid window guaranteed at point B | 1500 |
| Safety margin | 500 |
| Total invalid window for the host | 2157 |

Table 13: SPI4.2 Egress Quarter Rate Timing Budget

As seen in Figure 7, the valid window is centered around a 90 degrees phase shifted clock. The invalid window is centered around the rising or falling edge of the TDCLK_P[1].

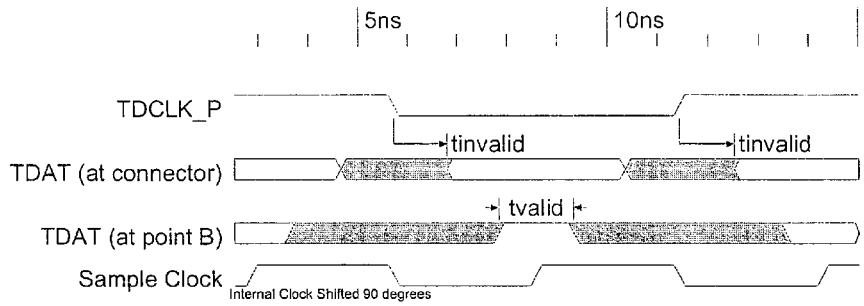

Figure 7: Egress Quarter Rate Timing Diagram

An eye mask will be developed and will be applicable at the SPA connector.

The nominal SPI4.2 frequency is 87.5MHz, both egress and ingress will be run at this speed. Also SPAs and Hosts must function at +/- 5% from this frequency to support EDVT frequency margining.

---

1. Note that this is different than the SPI4.2 specification. The SPI4.2 specification specifies that data is sampled at the clock edges. Because the data is also clocked out on the clock edges, this would require a large clock rate dependent skew between the clock and data on the board. We choose instead to sample data 90 degrees from the clock edges.

In addition the SPI4REFP/N clock must have at the following properties at reference Point B.

| Description | Min | Max | Units |
|---|---|---|---|
| Frequency[a] | 83.125 | 91.875 | MHz |
| Duty Cycle | 40 | 60 | % |
| Total Jitter | | +/- 100 | psec[b] |
| Differential Voltage Swing | 600 | 1000 | mV |

Table 14: SPI4REFP/N Requirements a. Must be frequency locked to the egress SPI4.2 clock, nominal frequency is 87.5MHz.
b. Peak to Peak

2.1.14 SPI4.2 FIFO Status Timing Requirements for Full Rate SPI4.2

In the SPA implementation we chose to make the FIFO status path LVDS but still run it at 1/8 of the datapath rate (87.5MHz or 21.875MHz). Therefore the base for our ac timing is still the LVTTL timing as specified in the SPI4.2 specification. A quick look at the timing in the SPI4.2 specification leads you to wonder why it is specified the way it is. The data invalid window is centered around the rising clock edge, and the setup and hold times are also centered around the rising clock edge. This causes you to either significantly skew the clock and data lines (>10") or invert the clock. However it is done, for SPAs we will specify the timing for this interface in relationship to the SPA connector, and we will only specify a guaranteed setup and hold time (same as a data valid window). It is up to the side transmitting the FIFO status information to align the clock and data correctly. Since we are driving LVDS signals for the clock, one option would be to reverse the clock +/- lines to achieve this timing.

The following timing must be observed on this bus. The timing specified below gives 1ns margin on hold and setup when compared to the SPI4.2 hold and setup requirements. This timing applies to full rate implementations.

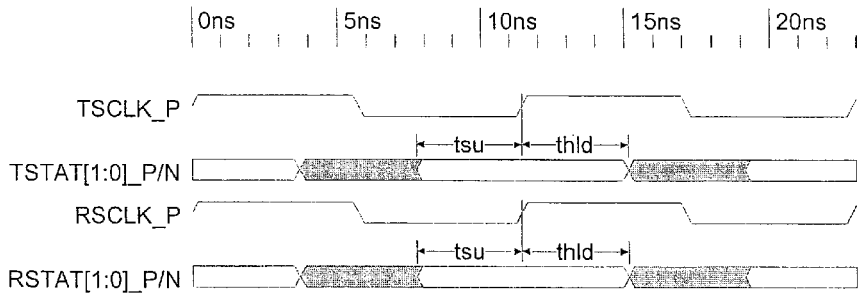

Figure 8: SPI4.2 FIFO Status Timing at the SPA Connector

| Symbol | Description | Min | Max |
|---|---|---|---|
| $t_{su}$ | Guaranteed setup time | 3.0 ns | |
| $t_h$ | Guaranteed hold time | 1.5 ns | |

Table 15: SPI4.2 FIFO Status Timing

2.1.15 SPI4.2 FIFO Status Timing Requirements for Quarter Rate SPI4.2

The following timing must be observed on this bus for quarter rate operation.

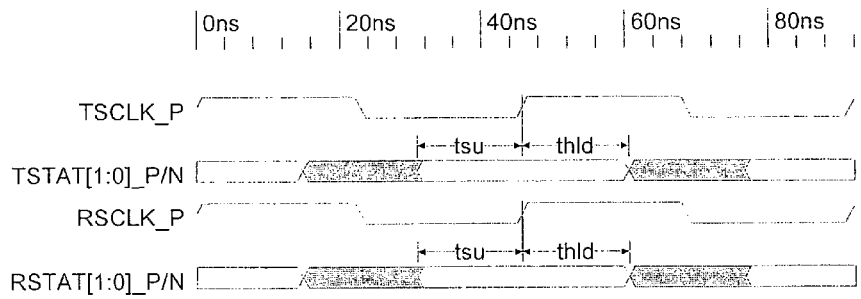

Figure 9: SPI4.2 FIFO Status Timing at the SPA Connector

| Symbol | Description | Min | Max |
|---|---|---|---|
| $t_{su}$ | Guaranteed setup time | 15.0 ns | |
| $t_h$ | Guaranteed hold time | 5.0 ns | |

Table 16: SPI4.2 FIFO Status Timing

2.1.16 IPC Requirements

There is a need for hardware support for transfer of IPC packets between an intelligent SPA and HOST. The mechanism will use a channel on the SPI4.2 bus for IPC packets between a SPA and a processor on the host. Depending on the host architecture, this might be a line card processor or a central route processor.

- SPAs that need an IPC channel must be able to send and receive IPC packets on a SPI4.2 channel dedicated for IPC. The particular channel for this communication must be programmable.
- Host must support a means for IPC communications via a SPI4.2 channel.

2.2 SPA Bus

The SPA control interface is provided via the Cisco proprietary SPA bus. This bus is an 8-bit parallel bus operating at 50MHz and supports 8, 16, and 32-bit data transfers. All SPA bus signals are single-ended 2.5V LVCMOS. The SPA I/O space is memory mapped and supports a 24-bit[1] (byte addressable) address space. All hosts must support the full 24 bit address space. SPAs will use whatever portion of that address space is required for its particular application. There will be some common/required SPA address space and register sets, see Section 7 for details.

---

[1]. SPAs should populate their address range starting at 0 and make it as compact as possible (this will allow for the most efficient SPA bus accesses by some hosts).

The SPA bus is a point to point bus between the host system and the SPA. The host is the master and the SPA is the slave on this bus. The only device allowed on the host side of the SPA bus is the single host master device. On the SPA there must only be a single slave device.

The SPA Bus is defined as Big Endian. This means that the most significant byte of any multi-byte data field is stored at the lowest memory address. In addition SPA registers and memories must be populated on their natural boundaries:
- 8 bit: 0x0, 0x1, 0x2, 0x3....0xF
- 16 bit: 0x0, 0x2, 0x4, 0x6, 0x8, 0xA, 0xC, 0xE
- 32 bit: 0x0, 0x4, 0x8, 0xC

2.2.1 SPA Bus Signals

The SPA bus is a multiplexed bus that is used to send a control byte, fixed length address and variable length data. The address sent is a byte address. The basic interface will consist of the signals in the following table.

| Name | # of bits | Host Direction | SPA Direction | Type[a] | Description |
|---|---|---|---|---|---|
| BCLK | 1 | Output | Input | 2.5V LVCMOS | Bus Clock, 50MHz |
| AD[7:0] | 8 | Bidir | Bidir | 2.5V LVCMOS | Multiplexed control, address, and data bus |
| PAR | 1 | Bidir | Bidir | 2.5V LVCMOS | Even parity for information on AD[7:0] |
| VALID_L | 1 | Output | Input | 2.5V LVCMOS | Indicates valid information on bus, active low |
| SRDY_L | 1 | Input | Output | 2.5V LVCMOS | Data Target Acknowledge, active low |
| INT_L | 1 | Input | Output | 2.5V LVCMOS | Interrupt from target, active low |
| ERR_L | 1 | Input | Output | 2.5V LVCMOS | Error signal from target, active low |

Table 17: SPA Bus Signals a. This bus is not 3.3V tolerant. The SPA's 2.5V LVCMOS standard is given in Appendix E.2.

The error signal (ERR_L) is used to indicate that a serious error has occurred related to the SPA bus. Details of the error signal operation are given in Section 2.2.7.

The interrupt signal (INT_L) is a generic interrupt used to facilitate host communication. It is active low and level sensitive.

The valid signal (VALID_L) will become active at the beginning of a transaction and stay active for the entire transaction for writes and for the control and address phases for reads.

The spa ready signal (SRDY_L) indicates the acceptance of a byte of data for a write to the SPA or the availability of data for the host for a read from the SPA. SRDY_L is used by the host to determine when a bus cycle is completed. The host terminates the SPA bus cycle based on using SRDY_L with the following criteria:
- 32-bit device_size, SRDY_L active for 4-clocks, cycle is terminated.
- 16-bit device_size, SRDY_L active for 2-clocks, cycle is terminated.
- 8-bit device_size, SRDY_L active for 1-clock, cycle is terminated.

The parity signal (PAR) will contain even parity calculated for every item put on the SPA bus by the host or SPA. It covers the AD bus only. If a slave discovers a parity error, it will notify the master with the error signal and the master will end the current transaction.

The SPA bus clock (BCLK), must be active and stable before SW removes the SPA reset.

2.2.2 Signal Conditioning

The SPA bus signals are conditioned as follows:

| Name | Conditioning[a] | Location |
| --- | --- | --- |
| AD[7:0] | 33 ohm series dampening resistor | Host, near the master device. SPA near the target device. |
| BCLK | 33 ohm series dampening resistor | Host, near the driver. |
| VALID_L | 2.2Kohm pull-up to 2.5V | SPA |
| VALID_L | 33 ohm series dampening resistor | Host, near the driver. |
| SRDY_L | 2.2Kohm pull-up to 2.5V | Host |
| SRDY_L | 33 ohm series dampening resistor | SPA, near the driver. |
| INT_L | 2.2Kohm pull-up to 2.5V | Host |
| ERR_L | 2.2Kohm pull-up to 2.5V | Host |
| PAR | 33 ohm series dampening resistor | Host, near the master device. SPA near the target device. |

Table 18: SPA Control Bus Signal Conditioning a. 33 ohms is a typical series resistor value, the actual value should be chosen to match the drivers output impedance to the PCB trace impedance.

AD[7:0] and PAR must be driven by the host during idle periods on the SPA Bus to keep the bus from floating.

2.2.3 Control Byte Information

A control byte will be sent on the SPA bus before the address byte(s) and data byte(s). It will contain whether it is a read or a write request and the size of the data being sent. The format of the control byte appears below. Bits 6:2 are reserved and set to 0.

| 7 | 6 | 5 | 4 | 3 | 2 | 1 | 0 |
| --- | --- | --- | --- | --- | --- | --- | --- |
| rw_l | Reserved | | | | | data_size | |

Table 19: Control Byte Decode

If rw_l equals 0 then the transaction is a write and if it equals 1 then it is a read. The data size is specified in the following table.

| data_size | Size in bits |
|---|---|
| 00 | 8 |
| 01 | 16 |
| 11 | 32 |
| 10 | Reserved |

Table 20: Data Size Decode

All Hosts should support all data sizes (8-32 bit transfers). SPAs support the data sizes that make sense for their application and needs. In addition SPAs must support the 'Special' bus cycles as defined in Section 2.2.5 and Section 2.2.6. This allows hosts that can only support fixed transfer sizes to work with SPAs. SPAs may support multiple data sizes, for example they could have an address range for a framer that requires 8 bit transfers, and an address range for FPGA based registers that support 32 bit transfers.

2.2.4 SPA bus phase

The different phases of a SPA bus transactions are as follows:

Idle - Occurs between transactions, when neither VALID_L or SRDY_L is asserted and the bus is not in the middle of a read transaction (Turn Around or Wait State). The master must idle the bus for a minimum of 1-BCLK between SPA bus transactions.

Control - Occurs during the first BCLK cycle of the SPA bus transaction, and consists of the control byte. The control phase of the transaction is always driven by the host.

Address - Occurs during the second - fourth BCLK cycle of the SPA bus transaction, and consists of the three address bytes. The address phase of the transaction is always driven by the host.

Turn Around - For reads only, occurs immediately after the Address Phase and has a duration of 1 BCLK cycle. During this phase, bus control is transferred from the host (initiator) to the SPA (target).

Wait State - For reads: Wait state(s) may occur immediately after the turn around cycle (by delaying assertion of SRDY_L) to allow for slower responding SPA devices. Wait states are not allowed once SRDY_L is asserted. For writes: A wait state may occur before the data phase and before the SPA asserts SRDY_L. Wait states are not allowed once SRDY_L is asserted.

Data - The data phase is driven by the SPA on reads and host on writes, has a duration equal to the data_size field of the control byte and is qualified with the assertion of SRDY_L.

2.2.5 SPA Bus Reads

The SPA must drive the appropriate data phase of the SPA bus as indicated in the following tables. The SPA reads data from the appropriate byte lanes of the targeted SPA device based on SPA bus transfer size (data_size of SPA bus control byte), SPA target address and SPA target data size.

Table 21 and Table 22 describe the details of each type of SPA bus read access.

The following table describes "Standard" read accesses where the host data_size matches the SPA target device size. A SPA may contain only one target device size or it may contain a mixture of sizes. It must support the corresponding host data_size for its target device sizes.

| Host Initiated data_size | SPA Target Addr[1:0] | SPA Target Device Size | SPA Read Response Data Phase | | | |
|---|---|---|---|---|---|---|
| | | | n | n+1 | n+2 | n+3 |
| 32-bit | 00 | 32-bit | Valid Data(H) | Valid Data | Valid Data | Valid Data(L) |
| 16-bit | 00/10 | 16-bit | Valid Data(H) | Valid Data(L) | No Data Phase | |
| 8-bit | 00/01/10/11 | 8-bit | Valid Data | No Data Phase | | |

Table 21: "Standard" 32/16/8 - bit SPA bus read cycles

In addition a SPA might support read accesses where the host data_size is smaller than the SPA target device size. As an example, a SPA may have 32 bit wide memory that is byte addressable. This would allow for more compact data structures and faster accesses to 8 and 16 bit data. The support for these types of accesses is optional.

The following table describes "Special" read accesses where the host data_size is fixed at 32 bits. These accesses are used by hosts that must use a fixed data_size = 32 bits. The support for these types of accesses is mandatory in all SPAs.

| Host Initiated data_size | SPA Target Addr[1:0] | SPA Target Device Size | SPA Read Response Data Phase | | | |
|---|---|---|---|---|---|---|
| | | | n | n+1 | n+2 | n+3 |
| 32-bit | 00 | 16-bit | Valid Data(H) | Valid Data(L) | Driven | Driven |
| 32-bit | 10 | 16-bit | Driven | Driven | Valid Data(H) | Valid Data(L) |
| 32-bit | 00 | 8-bit | Valid Data | Driven | Driven | Driven |
| 32-bit | 01 | 8-bit | Driven | Valid Data | Driven | Driven |
| 32-bit | 10 | 8-bit | Driven | Driven | Valid Data | Driven |
| 32-bit | 11 | 8-bit | Driven | Driven | Driven | Valid Data |

Table 22: "Special" SPA bus read cycles

Note that from the tables above, the SPA responds with valid data for reads during the appropriate data phase n, n+1, n+2 or n+3 based on the size of the device being targeted, the lower two address bits and the host initiated data_size. For example, a 32-bit host initiated transfer, to a 16 bit SPA device at addr[1:0] == 00 will result with the SPA driving 4-data phases. Valid data / parity must be output during Data Phase n and Data Phase n+1 respectively. The bus must also be driven during data phases n+2 and n+3, and may be driven with the same data as n and n+1 (valid parity must always be driven).

2.2.6 SPA Bus Writes

The host will drive the appropriate data phase of the SPA bus as indicated in the following tables. The SPA drives data to the appropriate byte lanes of the targeted SPA device based on SPA bus transfer size (data_size of SPA bus control byte), SPA target address and SPA target data size.

Table 23 and Table 24 describe the details of each type of access.

The following table describes "Standard" write accesses where the host data_size matches the SPA target device size. A SPA may contain only one target device size or it may contain a mixture sizes. It must support the corresponding host data_size for its target device sizes.

| Host Initiated data_size | SPA Target Addr[1:0] | SPA Target Data Size | SPA Bus Write Cycle Data Phase | | | |
|---|---|---|---|---|---|---|
| | | | n | n+1 | n+2 | n+3 |
| 32-bit | 00 | 32-bit | Valid Data(H) | Valid Data | Valid Data | Valid Data(L) |
| 16-bit | 00/10 | 16-bit | Valid Data(H) | Valid Data(L) | No Data Phase | |
| 8-bit | 00/01/10/11 | 8-bit | Valid Data | No Data Phase | | |

Table 23: "Standard" 32/16/8 - bit SPA bus write Cycles

A SPA might also support write accesses where the host data_size is smaller than the SPA target device size. As an example a SPA may have 32 bit wide memory that is byte addressable. This would allow for more compact data structures and faster accesses to 8 and 16 bit data. The support for these types of accesses is optional.

The following table describes "Special" write accesses where the host data_size is fixed at 32 bits. These accesses are used by hosts that must use a fixed data_size = 32 bits. The support for these types of accesses is mandatory in all SPAs.

| Host Initiated data_size | SPA Target Addr[1:0] | SPA Target Data Size | SPA Bus Write Cycle Data Phase | | | |
|---|---|---|---|---|---|---|
| | | | n | n+1 | n+2 | n+3 |
| 32-bit | 00 | 16-bit | Valid Data(H) | Valid Data(L) | Driven | Driven |
| 32-bit | 10 | 16-bit | Driven | Driven | Valid Data(H) | Valid Data(L) |
| 32-bit | 00 | 8-bit | Valid Data | Driven | Driven | Driven |
| 32-bit | 01 | 8-bit | Driven | Valid Data | Driven | Driven |
| 32-bit | 10 | 8-bit | Driven | Driven | Valid Data | Driven |
| 32-bit | 11 | 8-bit | Driven | Driven | Driven | Valid Data |

Table 24: "Special" SPA Bus Write Cycles

2.2.7 SPA Bus Error conditions

Errors such as SPA Bus protocol or SPA Bus parity errors are indicated by the ERR_L signal. If the SPA detects a protocol error or parity error, ERR_L is asserted. The current bus cycle (if one is still active) may or may not be completed depending on when the error occurs. Once asserted, ERR_L should continue to be asserted until 2 cycles after VALID_L is removed. Details of what caused an error assertion can be found by reading the SPA Error Register (Section 7.3.12).

SPAs must assert ERR_L for the following errors (unless otherwise specified):
- Parity errors during the control word phase of a SPA bus cycle. The SPA completes the current bus cycle by asserting ERR_L one clock after the error is detected; SRDY_L is never asserted. ERR_L is deasserted 2 cycles after VALID_L is removed.
- Parity errors during the address phase of a SPA bus read cycle. The SPA completes the current bus cycle by asserting ERR_L one clock after the error is detected; SRDY_L is never asserted. ERR_L is deasserted 2 cycles after VALID_L is removed.
- Parity errors during the address phase of a SPA bus write cycle. The SPA asserts ERR_L one clock after the error is detected; SRDY_L is asserted as normal, but the data is discarded. ERR_L is deasserted 2 cycles after VALID_L is removed.
- Parity errors during the write data phase of SPA write bus cycle. A SPA completes cycles with parity errors by asserting SRDY_L for data_size clocks. Write data is discarded. The SPA asserts ERR_L in the clock cycle after detecting this error. ERR_L is deasserted 2 cycles after VALID_L is removed.
- VALID_L not returning high as expected. The SPA asserts ERR_L in the clock cycle after detecting this error. ERR_L is deasserted 2 cycles after VALID_L is removed.

- Non existing register or memory access, non-supported access[1] or address misalignment[2] for SPA read bus cycles. The SPA completes the current bus cycle by asserting ERR_L, it is deasserted 2 cycles after VALID_L is removed; SRDY_L is never asserted. Since fully decoding all address spaces might be very logic intensive, support for this is an optional. It is suggested to at least decode major address regions.
- Non existing register or memory access, non-supported access[3] or address misalignment[4] for SPA write bus cycles. The SPA asserts ERR_L one clock after the error is detected; SRDY_L is asserted as normal, but the data is discarded. ERR_L is deasserted 2 cycles after VALID_L is removed. Since fully decoding all address spaces might be very logic intensive, support for this is an optional. It is suggested to at least decode major address regions.
- Host removes VALID_L pre-maturely. In this case ERR_L is asserted one cycle after VALID_L is removed and is asserted for a single cycle.
- During the read data phase, if a host detects a parity error, it completes the current bus cycle and discards the bad data.
- During a read data phase, if the SPA asserts SRDY_L incorrectly, the host should raise an error to the host processor.
- Errors not directly associated with a SPA bus cycle, such as a posted write failures, should be indicated through the SPA interrupt.

| Host Initiated SPA bus data_size | SPA Target Addr[1:0] | SPA Target Data Size |
|---|---|---|
| 32-bit | 01/10/11 | 32-bit |
| 16-bit | 01/11 | 32-bit |
| 32-bit | 01/11 | 16-bit |
| 16-bit | 01/11 | 16-bit |

Table 25: Address Misalignments

2.2.8 SPA Bus I/O Diagrams

The following diagrams show write transactions with a data size of 32. VALID_L frames the complete cycle. Notice that SRDY_L for write transactions is in advance of the actual data (this allows the master to clock in SRDY_L before using it). Wait states can be inserted by the target only before the data portion of the transaction begins, wait states can not be inserted in between bytes (once SRDY_L is asserted is must remain asserted until the transaction is completed). To handle the possibility that SRDY_L is never asserted, the master should have a bus timer and a bus timeout register to indicate that the target did not respond. This timeout must at a minimum be programmable to 1024 bus cycles.

---

1. For example a host initiated 8-bit access to a 32-bit target device that does not support byte accesses
2. Defined in Table 25
3. For example a host initiated 8-bit access to a 32-bit target device that does not support byte accesses
4. Defined in Table 25

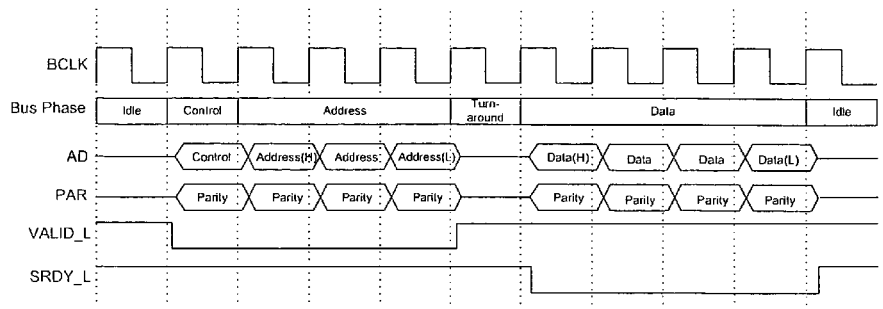
Figure 12: SPA Bus Read Transaction
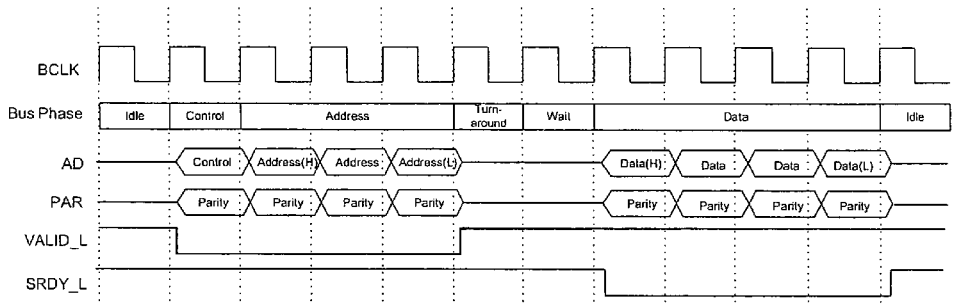
Figure 13: SPA Bus Read Transaction With 1 Wait State
The following diagram depicts a parity error occurring during the address phase of a read transaction and the proper ERR_L assertion.

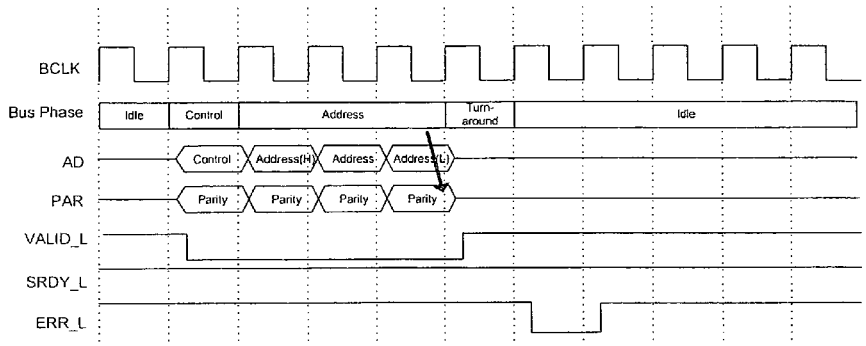

Figure 14: Address Parity Error During a Read

The following diagram depicts a parity error occurring during the control phase of a read or write transaction (if there is a parity error in the control word you don't know if it is a read or write) and the proper ERR_L assertion.

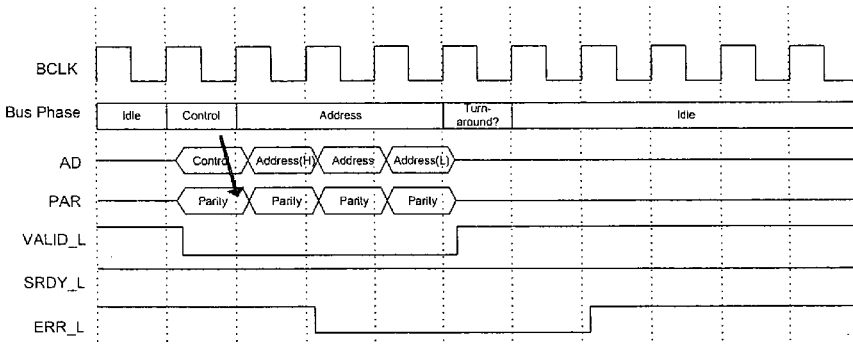

Figure 15: Control Parity Error

The following diagram depicts a parity error occurring during the address phase of a write transaction and the proper ERR_L assertion.

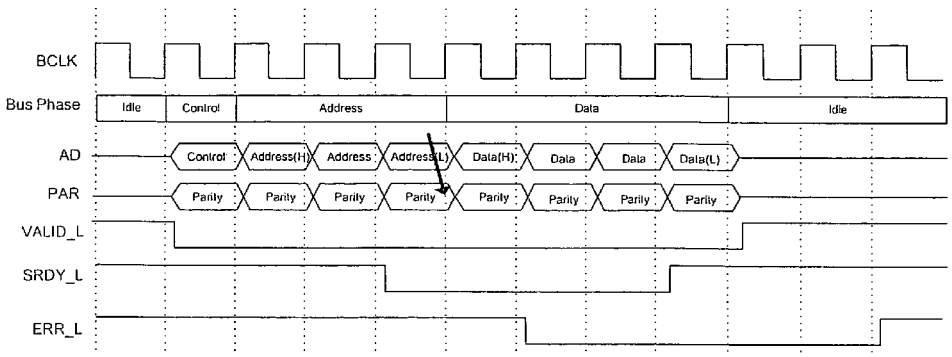
Figure 16: Address Parity Error During a Write
The following diagram depicts an invalid address occurring during a write transaction and the proper ERR_L assertion.
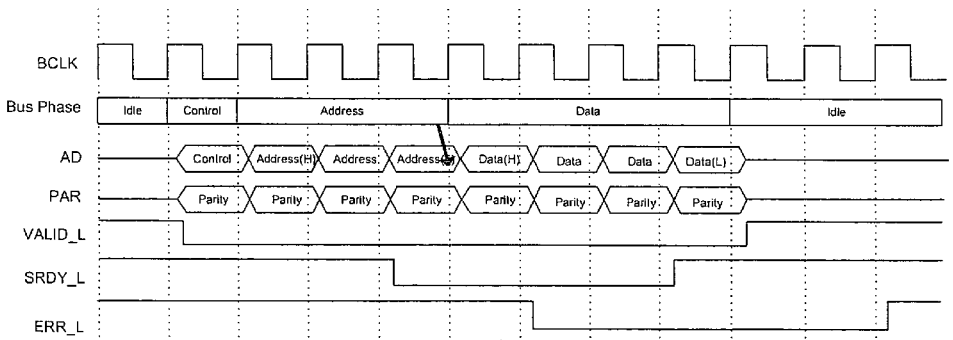
Figure 17: Invalid Address During a Write

2.2.9 SPA Bus Signal Timing

The SPA bus is a bidirectional point to point bus. It is required that the host matches the clock lengths as shown in the following diagram. A = B+C, and C is a fixed length on all SPAs.

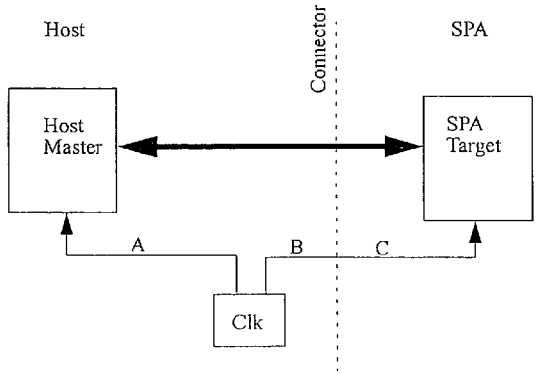

Figure 18: SPA Bus Clocking

The length requirements for the SPA bus are summarized in the following table.

| Signal | Host Length | SPA Length |
|---|---|---|
| bclk | Matched | 8"[a] |
| ad | 2"-30" | 2"-15" |
| par | 2"-30" | 2"-15" |
| valid_l | 2"-30" | 2"-15" |
| srdy_l | 2"-30" | 2"-15" |

Table 26: SPA Bus Length Requirements a. This is the length of segment C in Figure 18.

The following diagram shows the timing specifications for all SPA bus signals for both the host (master) and the SPA (slave). These timing parameters are applied at each device (the master and the target), not the connector. Timing parameter values are given in Table 27.

SPA Generic Hardware Specification EDCS-172353 Rev: 1.0

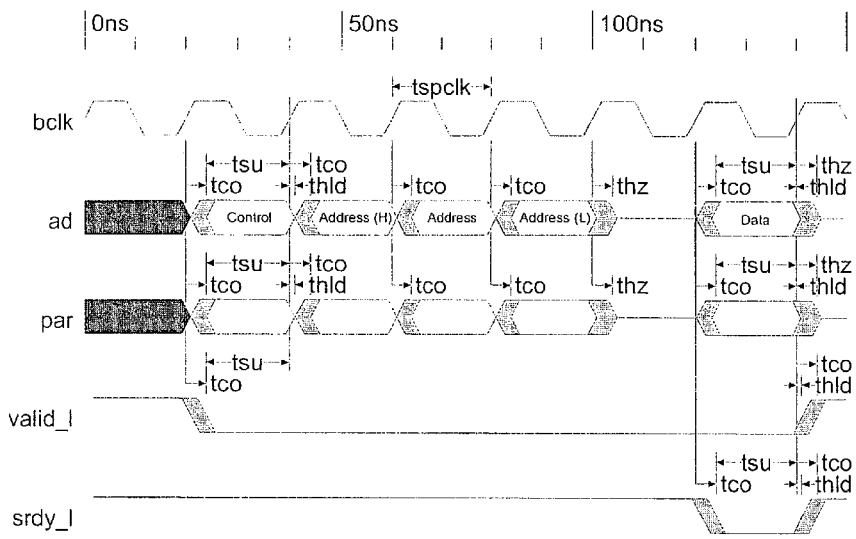

Figure 19: SPA Bus Timing

| Symbol | Description | Min | Max |
|---|---|---|---|
|  | SPA Bus clock duty cycle | 40% | 60% |
| tspclk | SPA Bus clock period | 19ns | 21ns |
| $t_{co}$ | Clock-to-output delay | 1.0 ns | 4.0 ns |
| $t_{su}$ | Setup time | 4.0 ns |  |
| $t_h$ | Hold time | 0.0 ns |  |
| $t_{hz}$ | Time to high impedance |  | 4.0 ns |
| tjitter | Total cycle to cycle jitter on bclk |  | +/-250psec[a] |
| tjitter | Total period jitter on bclk (peak to peak) |  | +/-350psec |

Table 27: SPA Bus Timing a. Any cycle can be 250psec longer or 250psec shorter than the previous cycle.

With the above timing and trace lengths, the guaranteed minimum margin on setup is approximately 3ns[1]; the margin for hold is 1.8ns. If a host or a spa can not meet the above timing requirements, then the actual lengths of the SPA bus on that host or SPA can be taken into

---

1. Assumes 200 psec per inch account to provide additional margin. For example, if a SPA can not meet the 1ns minimum for the $t_{co}$ and the minimum SPA bus length on this SPA is 8", this can be taken into account to provide additional $t_{co}$ margin.

2.2.10 SPA Bus Bandwidth

The SPA bus bandwidth varies depending on the data size being transferred. Since the address/data interface is only 8-bits wide, it will take multiple cycles to transfer address and data information. Worst case bandwidth will be read transactions, since they require a one clock cycle bus turnaround. These calculations do not include any host level overhead and/or delays that might be introduced by the SPA in delaying a transaction with srdy_l.

For 32 bit data transactions:

10 clock cycles => 1 control + 3 address + 4 data + 1 turnaround + 1 between transactions Therefore (32 bits / 10 clocks) * (50 million clocks / sec) ~ 160 Mbps For 16 bit data transactions:

8 clock cycles => 1 control + 3 address + 2 data + 1 turnaround + 1 between transactions Therefore (16 bits / 8 clocks) * (50 million clocks / sec) ~ 100 Mbps For 8 bit data transactions:

7 clock cycles => 1 control + 3 address + 1 data + 1 turnaround + 1 between transactions Therefore (8 bits / 7 clocks) * (50 million clocks / sec) ~ 57 Mbps A more realistic bandwidth calculation might assume approximately 1usec per transaction due to host overhead and SPA overhead. So for 32 bit transfers that would be 32Mbps of bandwidth. For a highly channelized card there may be too many statistics to read. For example, an OC-48 channelized (to DS1s) SPA may require 100's of thousands of statistics to be read every second. A local processor would likely be required to off load processing requirements to the SPA. The local SPA processor would collect and aggregate the statistics (as well as respond to time critical alarm conditions). Communication between the host CPU and the SPA CPU could be through a mailbox mechanism on the SPA control bus or through an in-band SPI4.2 mechanism. In the latter case, the CPU would have to be able to insert and remove packets from the SPI4.2 stream. In addition the host CPU must be able to do likewise (either directly or indirectly through the normal host CPU packet punt path).

2.3 Extended Flow Control Bus

The SPI4.2 interface addresses only 256 channels and provides support for fifo status indications for 256 channels in its normal addressing mode. For highly channelized SPAs, like the ChOC12 --> DS1/DS0, there arises the need to support per channel flow control for at least 1K channels as per current linecards. To enable future growth, the SPA interface shall provide support for up to 8K channels per SPA, which will be capable of supporting a ChOC48 --> DS1/DS0 or even a OC192 fully channelized to DS1s and some DS0s and hierarchies in between.

The method specified here is to extend the SPA interface capabilities over 256 channels. SPAs requiring less than 256 channels will normally use the standard SPI4.2 mechanism for egress flow control, although SPAs with less than 256 channels can also use the EFC bus. If a SPA uses the Extended Flow Control Bus, they also still use the SPI4.2 flow control for either SPA level or physical port level flow control in conjunction with the Extended Flow Control Bus. The background on the system considerations that drove the definition of EFC bus is covered in Appendix F.

2.3.1 Extended Flow Control Interface Signals

The Extended Flow Control bus consists of the following signals.

| Name | # of bits | SPA Direction | Type[a] | Description |
|---|---|---|---|---|
| FCFRM_L | 1 | Output | 2.5V LVCMOS | TDM Calendar Frame Sync. Active Low. |
| FCCLK | 1 | Output | 2.5V LVCMOS | Source clock for FCSTAT used by the host to clock in the data value on FCSTAT. Nominal Frequency is 50MHz. |
| FCSTAT | 1 | Output | 2.5V LVCMOS | Channel Fifo Status Above/Below threshold, corresponding to the channel programmed for the TDM time slot FCSTAT = 1'b1: Above Threshold FCSTAT = 1'b0: Below Threshold. |
| FCPAR | 1 | Output | 2.5V LVCMOS | Even parity across FCSTAT and FCFRM_L for the clock period. |

Table 28: Extended Flow Control Bus Signals a. The SPA 2.5V LVCMOS standard is given in Appendix E.2

FCCLK is sourced by the sender of flow control data i.e. the SPA which is used by the host to clock in the data value present on FCSTAT. The nominal frequency is 50MHz.

The separate parity signal allows flexibility in changing the frame size to any power of 2, if it is chosen to do so in future. If a SPA doesn't support the Extended Flow Control bus then it leaves the signals unconnected.

2.3.2 Extended Flow Control Signal Conditioning

Extended Flow Control signals must be conditioned as shown in the following table.

| Name | Conditioning[a] | Location |
|---|---|---|
| FCFRM_L | 33 ohm series dampening resistor | SPA near the driving device. |
| FCFRM_L | 2.2Kohm pull-up to 2.5V | Host |
| FCCLK | 33 ohm series dampening resistor | SPA near the driving device. |
| FCCLK | 2.2Kohm pull-up to 2.5V | Host |
| FCSTAT | 33 ohm series dampening resistor | SPA near the driving device. |
| FCSTAT | 2.2Kohm pull-up to 2.5V | Host |
| FCPAR | 33 ohm series dampening resistor | SPA near the driving device. |
| FCPAR | 2.2Kohm pull-up to 2.5V | Host |

Table 29: Extended Flow Control Bus Signal Conditioning a. 33 ohms is a typical series resistor value, the actual value should be chosen to match the drivers output impedance to the PCB trace impedance.

2.3.3 Extended Flow Control Bus Detailed Description

The extended flow control bus uses a TDM calendar based mechanism, which carries per channel fifo status (Above/Below threshold) information over a single data bit. The calendar is programmed by software when channels are configured and setup at both the transmitter (SPA) and receiver (host). In its simplest form, the algorithm for allocating time slots is proportional to the channel's bandwidth. It is recommended that software use methods like approximating bandwidths to closest power of 2 and allocating time slots appropriately, that shall be conducive to reduction in the size of the Flow Control Time Slot (FCTS) table. The calendar consists of 16K time slots with channel numbers whose fifo status flow control information is carried in that particular time slot. So in its simplest form, the calendar is a 16K deep by 13 bits (supports 8K channels well) wide table. The SPA shall use the FCTS table to determine which channel shall be polled for fifo status and shall be sent on that particular time slot or FCCLK clock period. The host shall use the FCTS table to determine which channel's fifo status flow control information is carried in that particular time slot.

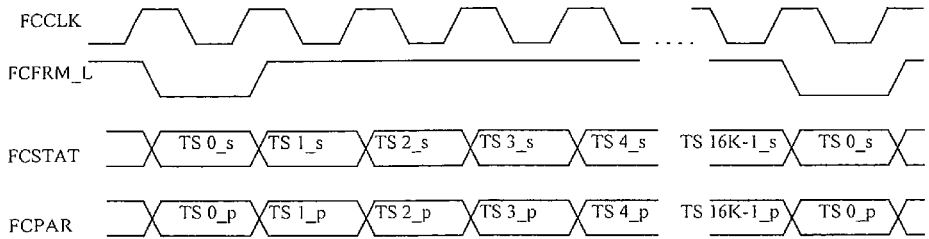

Figure 20: Extended Flow Control Bus

The host shall ignore information on FCSTAT before it receives the first FCFRM_L from the SPA after power up.

Note that the Extended Flow Control Frame length is set to 16K. This could support up to 8K ATM VCs with a mix of VBR and UBR traffic. In the case of ATM, half of the time slots might be allocated to UBR and the other half to VBR VCs in ratio of their bandwidths. The fifo status for UBR VCs is generated as one by ORing the fifo status of all UBR VCs i.e. all of the UBR VCs are flow-controlled as one by generating a 'flow-off' condition if any one of the UBR VCs does flow-off, and generating flow-on only if all the VCs are flowed-on. As an alternative, an ATM SPA might support queuing on the SPA itself which would then not require the use of the EFC bus. This might allow the support of a greater number of queues than might be possible on the host card. In this case, only the SPI-4.2 flow control would be used, possibly on a per physical port basis.

For a normal channelized card, up to 8K channels can be supported with a FCTS table of 16K entries. The 2x number of entries in the FCTS table vs. the number of physical or virtual channels allows a mix of channel speeds to be supported effectively.

SPAs supporting less than 16K entries in its FCTS table, shall use a subframe size which is the next highest power of 2 by padding and then repeating information to fill up the 16K frame. As an example, if a channelized SPA supports just 336 virtual channels, and taking into account the 2x factor to allow support for a mix of channel speeds, a FCTS table of at least 672 entries is required for this example. This example would use a subframe of 1024 time slots by padding from the 673rd time slot till 1024 and then repeat this 16 times to fill up the 16K frame. The overall frame is 327.68usec long.

In order to support host cards that support a limited number of channels (for example a host card may only support 1k flow controllable entities), a SPA must have the capability to support a subset of its maximum channels. This would be enabled by having a configurable number of $2^n$ channels (from 0 to $2^{n-1}$) in a SPA's EFC table.

SPA Generic Hardware Specification EDCS-172353 Rev: 1.0

Simple Format of FCTS Table

| Channel_#-TS0 |
|---|
| Channel_#-TS1 |
| ooo |
| ooo |
| ooo |
| Channel_#-TSn |

Note: n = 2^N - 1; N = 2..., 10, 11, 12, 13, 14.

The highly channelized SPA using the extended flow control bus shall use 1 or more SPI4.2 channels and its associated flow control through the standard SPI4.2 FIFO status channel as an overall rate limiting mechanism. This can be on a per physical port or per link layer device basis which allows for some isolation in traffic flow between the SPI4.2 channels.

2.3.4 Channelized Flow Control Example

A single port OC-12 channelized to DS0s will be used to illustrate how the FCTS can be used. For this case it is assumed that a single SPI4.2 channel is used for link level flow control. In this example the SPA can support channelization from OC-12 POS on down to DS0s, with a total support of 1024 channels. The SPA will send 2048 bits of flow control status repeated 8 times within one frame period. The following table summarizes the status bit configuration for each type of channelization assuming uniform channelization.

| Channelization | # of Channels | Status Interval | # bits per 2048[a] |
|---|---|---|---|
| OC-12 | 1 | 1 | 1024[b] |
| OC-3 | 4 | 8 | 256 |
| DS3 | 12 | 32 | 64 |
| DS1 | 336 | 1024 | 2 |
| DS0 | 1024 | 2048 | 1 |

Table 30: Uniform Flow Control Example a. To get this take 1024 divided by the number of channels and round down to the nearest power of 2.
b. This could be set to 2048 since there is only one channel.

SPA Generic Hardware Specification EDCS-172353 Rev: 1.0

The number of bits is set to 2048 to flexibly support mixed configurations. For example you could have the majority of the DS0's in one DS3's worth of bandwidth. The following example illustrates this case.

| Channelization | # of Channels | Total # of bits |
|---|---|---|
| OC-3 | 3 | 768 |
| DS3 | 2 | 128 |
| DS0 | 1019 | 1019 |

Table 31: Mixed Flow Control Example

2.3.5 Extended Flow Control Bus Signal Timing

The following diagram shows the timing specifications for the Extended Flow Control bus. Timing parameter values are given in Table 32. The reference point for the timing numbers is the SPA connector.

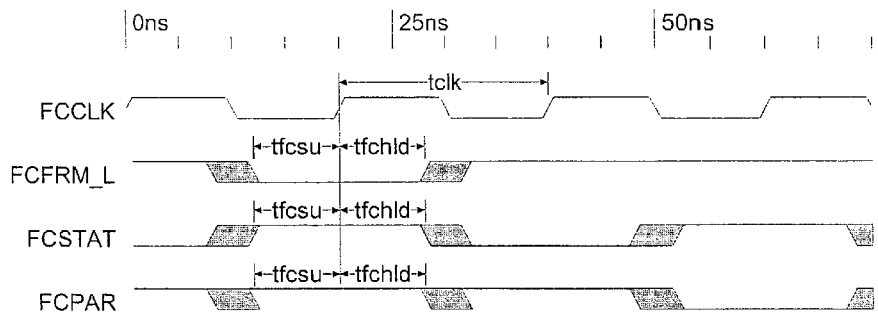

Figure 21: Extended Flow Control Bus Timing

| Symbol | Description | Min | Max |
|---|---|---|---|
| $t_{fcsu}$ | Guaranteed Extended Flow Control setup time at the SPA connector | 7 ns | |
| $t_{fclhd}$ | Guaranteed Extended Flow Control hold time at the SPA connector | 7 ns | |
| $t_{clk}$ | Clock Period[a] | 19ns | 21ns |

Table 32: Extended Flow Control Bus Timing a. This clock may be asynchronous to any other system clock It is possible that the above timing could be generated by an FPGA using an internal 100MHz clock to generate the FCCLK and other signals. Therefore the falling edge of FCCLK would be closely aligned with the changing data.

2.4 SONET Reference Interface

SONET SPAs will enable a central clock controller architecture. This entails support for using a SONET reference from the host for providing the tx clock for all SONET interfaces on a given SPA. It also means providing one recovered clock from one of the SONET interfaces on the SPA to the host (which interface provides the clock must be SW selectable). The recovered clock will allow a clock controller to derive the system clock from any SONET interface. The system clock might also come from a BITS timing reference depending on the system and the system configuration. In addition a SONET SPA will also normally support line timing on each individual interface.

Figure 22 depicts a SPA/Host combination that does support a central clock controller. Notice that there is no SONET reference on the SPA. In this configuration, a particular interface on the SPA can be clocked from its own recovered clock (line timing), free-run (the accuracy depends on the crystal accuracy on the host card), or from the system clock (can be a BITS reference or from some other interface in the system).

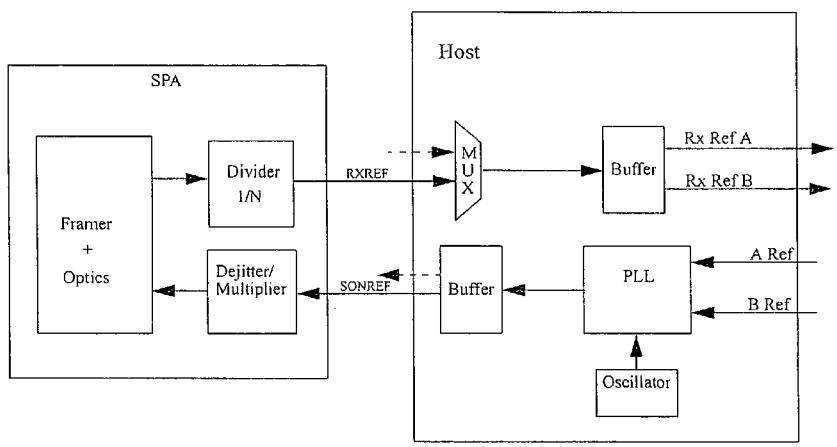

Figure 22: Host with a Central Clock Controller Architecture

Figure 23 depicts a SPA/Host combination that does not support a central clock controller. Notice that there is no SONET reference on the SPA. In this configuration a particular interface on the SPA can be clocked from its own recovered clock (line timing) or in free-run mode. The accuracy of the free-run mode depends on the crystal accuracy on the host card. Each Host card can decide on the accuracy of the free-run crystal that they provide, but a Stratum 3 accurate crystal is reccomended.

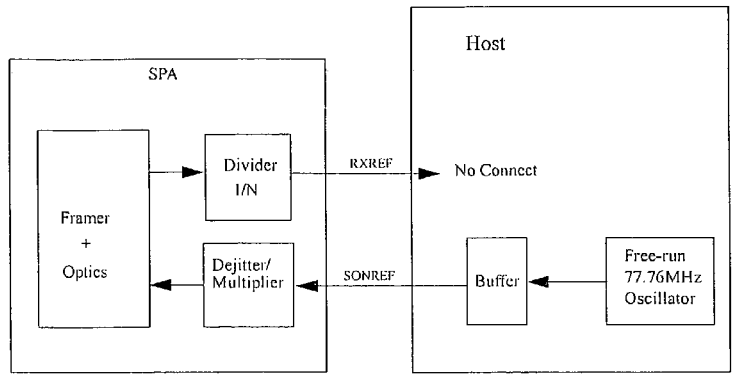

Figure 23: Host without a Central Clock Controller Architecture

2.4.1 SONET Reference Signals

The interface consists of the signals in the following table.

| Name | # of bits | Host Direction | SPA Direction | Type | Description |
|---|---|---|---|---|---|
| SONREF_P/N | 1 | Output | Input | PECL[a] | SONET Reference. 77.76MHz. This is to be used on all SONET SPAs. This is AC coupled on the host. |
| RXREF | 1 | Input | Output | LVTTL | Receive reference. 19.44MHz. The is a SW selectable recovered clock from one of the SONET interfaces on a SONET SPA. |

Table 33: SONET Reference Bus Signals a. Since this is AC coupled on the host, it can be driven by a PECL, LVPECL or any other driver that meets the requirements of Table 35.

2.4.2 SONET Reference Signal Conditioning

The SONET Reference signals are conditioned as follows:

| Name | Conditioning | Location |
|---|---|---|
| SONREF_P/N | AC coupled | Host |
| SONREF_P/N | Termination | SPA, must be DC biased and terminated on the SPA. If this signal is not utilized on a particular SPA, it must still be terminated with a 100 ohm load. |
| RXREF | 33 ohm series dampening resistor | SPA, near the driver. |
| RXREF | 2.2Kohm pullup to 3.3V | Host |

Table 34: SPA Control Bus Signal Conditioning

2.4.3 SONREF requirements

Normally the SONREF clock will be used by a clean-up pll/multiplier on the SPA to reduce jitter and to generate the desired frequency on the SPA. But for a low cost low speed SPA, it might be possible to use the SONREF clock directly. For this kind of case the jitter on the SONREF signal must meet the following requirements.

| Description | Min | Max | Units |
|---|---|---|---|
| Accuracy | 20[a] | | ppm |
| Duty Cycle | 45 | 55 | % |
| Total Jitter (rms), 12kHz to 20MHz[b] | | 4 | psec |
| Total Jitter (rms), 12kHz to 80MHz[c] | | 4 | psec |
| Differential Voltage Swing | 600 | 1000 | mV |

Table 35: SONREF Requirements a. This is controlled by the host and in many cases will be 4.6ppm in order to provide Stratum 3 accuracy.
b. For hosts that support up to OC48 rate SPAs
c. For hosts that support up to OC192 rate SPAs In addition this clock must be clean with no phase hits.

2.5 Serial Interface

The SPA serial interface is a 2-wire "I$^2$C like" interface (called Cisco 2 Wire or C2W) that can be used to access serial interface devices on the SPA such as power control logic and a serial EEPROM. All other C2W devices must be placed on a separate C2W bus off of a PLD/FPGA sitting on the SPA Bus. Devices using the serial interface must be able to work up to 100kHz serial clock rate. There must be a dedicated C2W bus provided per SPA in any host system, for example there should be no devices on bus on the host except the master.

The serial interface is provided via the SCLK and SDATA signals in the SPA signal connector. The host will provide 1.8Kohm pullups on these signals to 3.3V. This will require a driver that can sink at least 1.8mA. In order to meet the 1000ns rise time requirement of the C2W bus with the 1.8k ohm pullup resistor, we are limited to a total capacitance of 250pF on the C2W bus. 70pF of this budget is allocated for the SPA, this includes the two devices and the trace capacitance on the C2W signals.

SPA Generic Hardware Specification EDCS-172353 Rev: 1.0

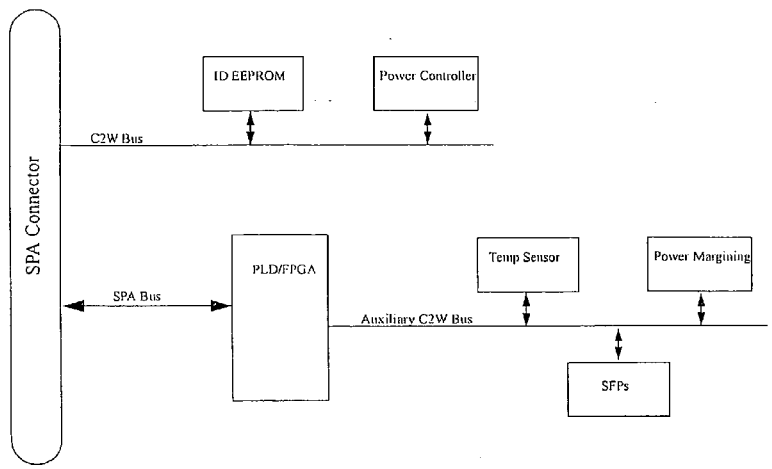

Figure 24: C2W Configuration

2.5.1 Serial Interface Signals

The following are the signals that make up the serial interface.

| Name | # of bits | SPA Direction | Type[a] | Description |
|------|-----------|---------------|---------|-------------|
| SDATA | 1 | Bidir | 3.3V LVTTL | Serial Data |
| SCLK | 1 | Input | 3.3V LVTTL | Serial Clock |

Table 36: Serial Interface Signals a. The LVTTL standard is presented in Appendix E.3

The serial interface signals must be conditioned as shown in the following table.

| Name | Conditioning | Location |
|------|--------------|----------|
| SDATA | 1.8Kohm pullup to 3.3V (AUX_PWR) | Host |
| SCLK | 1.8Kohm pullup to 3.3V (AUX_PWR) | Host |

Table 37: Serial Interface Bus Signal Conditioning

2.5.2 EEPROM

The SPA's serial interface allows the host system to read the SPA's configuration information stored in the SPA serial EEPROM. The SPA serial EEPROM is powered by a separate power pin (AUX_PWR) in the SPA signal connector. This allows the host system to read the SPA configuration information even when the SPA is powered off.

A printed version of this document is an uncontrolled copy.

© 2002 Cisco Systems, Inc.                    Company Confidential

The Serial EEPROM has a write protect pin. When this signal is high, writes are not allowed to the serial EEPROM device. The default value of this signal should be high and it should be connected to the FPGA or programmable logic on the SPA which will allow SW to deassert write protect to enable writes to the EEPROM.

The SPA serial EEPROM is a 4Kbit electrically erasable EEPROM such as the Atmel AT24C04N (Cisco P/N 16-2390-01) or equivalent. The format for the SPA Serial EEPROM is provided in EDCS-177029. Note that the first 256 bytes are reserved for manufacturing's use, the second 256 bytes are for SW use to store MIB information and SPA specific personality information.

2.5.3 Power Supply Monitoring Controller

Some SPAs may choose to use a C2W bus compatible power supply monitor. This will allow for flexible/programmable monitoring of the SPA's local power supplies. One such component is the Analog Devices ADM1060.

2.5.4 C2W Addressing

Most C2W devices have some flexibility in the address that they respond to through HW straps. In order to promote SW and HW compatibility between SPAs the following C2W address map should be followed where possible.

| Device | Address |
|---|---|
| ID EEPROM | 1010000b |
| Power Supply Monitor | 1010100b |

Table 38: C2W Bus Addressing

2.6 JTAG Interface

The majority of JTAG compliant devices today have LVTTL I/Os. For this reason, the JTAG interface between the SPA card and the HOST card was chosen to be 3.3V LVTTL. Since other I/O technologies are also available on JTAG device I/Os, the SPA designer is not limited to using only LVTTL devices on the JTAG chain. This implies that level shifting of the JTAG signals may be required between JTAG devices. In any case, the JTAG interface to the HOST must always be presented LVTTL compliant signals.

It is required that all JTAG capable devices be put into the SPA JTAG chain with the ability to bypass devices if desired. Devices programmed via the JTAG interface such as CPLDs, FPGAs and configuration PROMs must be placed first in the chain. All remaining devices must be placed after a mux that is controlled by the signal ISPSEL. The Host must be able to control the JTAG bus in order to enable updates to devices such as EPLDs that may be on the JTAG chain. It is highly recommended that hosts have a HW based JTAG controller which will allow quick download times for programmable devices. Additional details of the JTAG implementation can be found in Appendix D.

2.6.1 JTAG Interface Signals

The following are the signals that make up the JTAG interface.

| Name | # of bits | SPA Direction | Type[a] | Description |
|---|---|---|---|---|
| TCLK | 1 | Input | 3.3V LVTTL | JTAG Clock |
| TMS | 1 | Input | 3.3V LVTTL | JTAG Test Mode Select |
| TDI | 1 | Input | 3.3V LVTTL | JTAG Test Data Input |
| TDO | 1 | Output | 3.3V LVTTL | JTAG Test Data Output |
| TRST_L | 1 | Input | 3.3V LVTTL | JTAG Reset |
| ISPSEL | 1 | Input | 3.3V LVTTL | JTAG ISP mux select.<br>ISPSEL = 0: All devices are in the JTAG chain<br>ISPSEL = 1: Only ISP devices are in the JTAG chain |

Table 39: JTAG Interface Signals a. The LVTTL standard is presented in Appendix E.3

The JTAG signals must be conditioned as shown in the following table.

| Name | Conditioning[a] | Location |
|---|---|---|
| TCLK | 22 ohm series dampening resistor | Host near the driving device. |
| TCLK | 2.2K pullup to 3.3V | SPA |
| TMS | 22 ohm series dampening resistor | Host near the driving device. |
| TMS | 2.2K pullup to 3.3V | SPA |
| TDI | 22 ohm series dampening resistor | Host near the driving device. |
| TDI | 2.2K pullup to 3.3V | SPA |
| TDO | 22 ohm series dampening resistor | SPA near the driving device. |
| TDO | 2.2K pullup to 3.3V | Host |
| TRST_L | 22 ohm series dampening resistor | Host near the driving device. |
| TRST_L | 2.2K pulldown to GND | SPA |
| ISPSEL | 2.2K pullup to 3.3V | SPA |

Table 40: JTAG Signal Conditioning a. 22 ohms is a typical series resistor value, the actual value should be chosen to match the drivers output impedance to the PCB trace impedance.

2.6.2 JTAG Bus Signal Timing

The JTAG bus on the SPA must be fully functional from DC to 1MHz. The host can run the JTAG bus from DC to 1MHz for any SPA, and if a SPA's JTAG bus can run above 1MHz then the host may run the JTAG bus faster for that SPA. In addition it is advantageous to be able to run the JTAG bus as fast as possible for JTAG testing in a manufacturing environment. To that end, each SPA should design their JTAG bus to run as fast as the devices on the bus will allow. JTAG signals are clocked in on the rising edge of the TCLK, and therefore the JTAG signals must be clocked out on the falling edge of TCLK. At the connector there must be a minimum of +/- 50nsec valid window centered around TCLK.

2.7 Power Interface

SPAs receive power from the host interface via the SPA connector. A fixed voltage of +12V +/- 8% (11.04V - 12.96V) is provided via pins on the SPA connector. This voltage is measured on the Host side of the connector at the junction of pc-board and the connector and must be maintained over all static and transient conditions. Power to the SPA logic is first passed through a soft start circuit that eliminates current surges. This same circuit acts as an active fuse that limits the input current in the event of a short circuit on the SPA. If a preset threshold of 4.7 Amps +/- 20% for a single wide SPA, or 6.25Amps for a double wide SPA, is exceeded, 12V power to the SPA is latched off. If the short circuit is removed, the active fuse will reset itself when power is cycled. The host's +12V protection, if used, should be designed to trip at a current level higher than that of the maximum SPA current.

Power converters used on the SPAs to generate lower voltages, need to take into consideration the voltage losses caused by the following factors:
- Connector impedance.
- OIR and Active fuse circuits (present on the SPA).
- Trace resistance (IR losses).

These losses reduce the actual input voltage that the power converters will see.

All voltage rails that the SPA requires must be generated locally on the SPA. A single wide SPA depending on the type it is (see the introduction in Section 1 for the different classes of SPAs that are available) can use anywhere from 20W to 40W of power. The pins that are allocated for the +12V for a single wide SPA can support 4.5 amps of current. A double-wide SPA can use power from both connectors for a total of 50W. For a double wide SPA that requires 50W, the SPA designer will directly connect the +12V from each connector together in order to draw current from both connectors, therefore the host must support this capability.

It is important that accurate power calculations are made for SPAs that are in development to ensure that they will meet the given limit for their form factor and that we don't make a decision not to develop a particular SPA because is doesn't meet the limit. The best approach is to de-rate components for actual usage (such as actual frequency vs. data sheet maximum frequency), actual loading vs. data sheet loading, and vendor's initial pessimistic numbers vs. more realistic numbers. In the end the goal is to design SPAs that when tested in a lab under worst case conditions (traffic, temp etc.) are comfortably under the maximum power dissipation allowed for SPAs. The goal should be to have 10% safety margin to account for process variations when these measurements are made.

On Online Insertion of the SPA, the SPA must limit the inrush current to no greater than the normal operational current. This requires the SPA to implement a softstart circuit to slowly ramp up the +12V rail.

2.7.1 Power Protection Requirement

- SPAs must have current limiting devices on the +12V rail. It is recommended that these are not one time fuses.
- Host should also have current limiting devices on the 12V rails to protect from shorts on the connectors. Protection devices that permanently open should be avoided unless they are safely and conveniently accessible for replacement and a service procedure is included in the system documentation. Devices which reset after removal of the overload condition are preferred for serviceability reasons.

2.8 Misc Control Interface

Several signals in the SPA signal connector are used to provide control of basic SPA functions.

SPA Generic Hardware Specification EDCS-172353 Rev: 1.0

| | |
|---|---|
| RESET_L: | This active low reset is controlled by the host system and serves as a global SPA reset signal. This signal will be asserted by the host until a SPA is inserted and indicates it is ready via the SPA_OK signal. The SPA will provide a 2.2Kohm pull-down resistor on this signal. After this is deasserted, the host may access the SPA register set (normally in an FPGA). Other devices on the SPA will still be in reset pending SW action to bring them out of reset via a reset register. |
| PWR_ENA: | This signal is asserted high by the host and is used to enable power supplies on the SPA. It is required that this signal is SW controllable, this allows SW OIRs of SPAs. The SPA will provide a 2.2Kohm pull-down resistor on this signal. |
| PWR_OK: | This signal is asserted high by the SPA to indicate all the power rails are within operational limits. The host will provide a 2.2Kohm pull-down resistor on this signal. |
| SPA_OK: | This signal is asserted high by the SPA to indicate that the SPA is ready for the host to access the SPA via the SPA Bus. After the host receives SPA_OK, the host must deassert RESET_L before trying to access the SPA via the SPA bus. The host will provide a 2.2Kohm pull-down resistor on this signal. It is suggested that adding a green SMT LED (not faceplate visible) onto the SPA, connected to this signal so that it lights when SPA_OK goes active would be a good standard practice. |
| AUX_PWR: | This is a voltage (3.3V) sourced from the host and is used to power the eeprom and a power monitoring device. In order to power the eeprom and the power monitor, this supply must provide up to 20 mAs. This rail must be 3.3V +/- 10% on the SPA side of the connector. In addition, all protection of this rail must be supplied on the host side of the connector. This would include some form of short circuit protection as well as soft start circuitry (the soft start could be provided by a 10 ohm resistor on the host side). The capacitance on the rail on the SPA side must be limited to <= 1uF. |
| SPA_DET_A: | This is ground sourced from the host and is used for signalling presence detect. |
| SPA_DET_B | This signal loops back the SPA_DET_A signal to the host to complete the SPA detection loop. |

2.8.1 Misc Control Signals

The following are the signals that make up the Misc Control interface.

| Name | # of bits | SPA Direction | Type[a] | Description |
|---|---|---|---|---|
| RESET_L | 1 | Input | 2.5V LVCMOS | Reset |
| PWR_ENA | 1 | Input | 3.3V LVTTL | Power Enable |
| PWR_OK | 1 | Output | 3.3V LVTTL | Power OK |
| SPA_OK | 1 | Output | 3.3V LVTTL | SPA Ready |
| AUX_PWR | 1 | Input | +3.3V DC | Auxiliary Power |
| SPA_DET_A | 1 | Input | ground, DC | To SPA Detect |
| SPA_DET_B | 1 | Output | ground, DC | From SPA Detect |

Table 41: Misc Control Signals a. The applicable I/O standards are covered in Appendix E.

SPA Generic Hardware Specification EDCS-172353 Rev: 1.0

3.0 SPA Mechanical Interface

The SPA signal connector is a Molex 168 conductor (144 signals + 24 grounds) low-profile connector. This connector provides the SPI4.2 10Gbps interface, SPA bus interface, and other control signals to/from the SPA. The connector has 72 signal pairs and 26 ground contacts.

| Manf p/n | Cisco P/N | Notes |
|---|---|---|
| 75019-0001 | 29-4394-01 | FH SPA side connector |
| 75019-0002 | 29-4559-01 | HH SPA side connector |
| 75018-0001 | 29-4432-01 | Normal host connector |
| 75018-0003 | 29-4431-01 | Offset host connector |
| 75140-0001 | 29-4596-01 | Vertical host connector |

The following is a picture of the host side fixed connector.

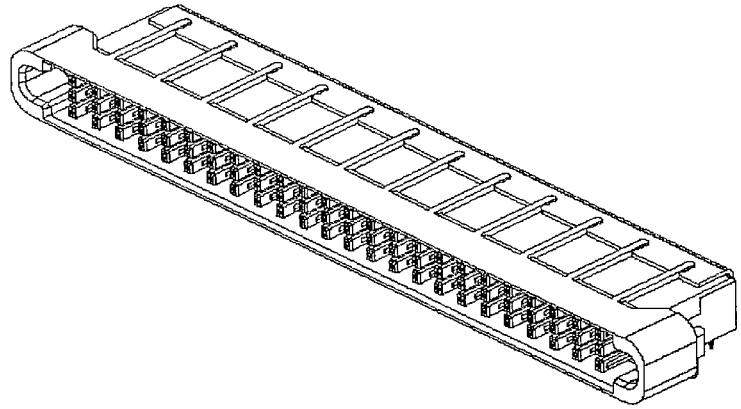

Figure 25: Host Side Fixed Connector

The following is a picture of the SPA side floating connector.

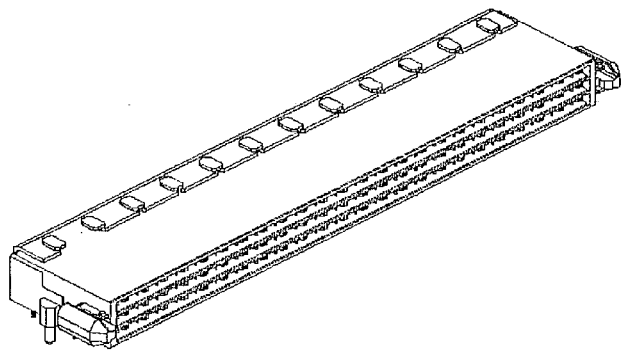

Figure 26: SPA Side Floating Connector

3.1 Connector Description

The SPA connector is made up of 72 differential pairs. Figure 27 below shows a detailed view of the conductor arrangement in the host's signal connector. In this diagram you can see that the conductors are arranged in three rows of differential pairs. Note that the fixed connector is the least likely to be damaged and is therefore located on the host to promote high availability.

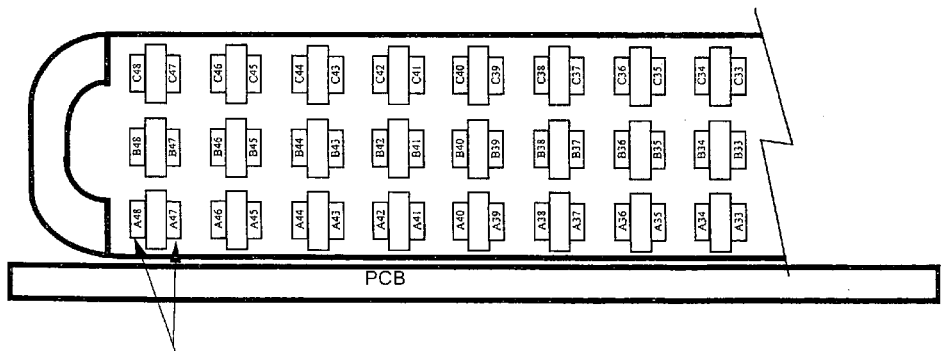

View is looking into the connector

Figure 27: Molex Host Fixed Connector Conductor Arrangement

SPA Generic Hardware Specification EDCS-172353 Rev: 1.0

Figure 28 below shows a detailed view of the conductor arrangement in the SPA's signal connector. In this diagram you can see that the conductors are arranged in three rows of differential pairs. Please note that when the SPA is plugged into the host, C48 from the host mates with C48 from the SPA, B48 with B48 etc.

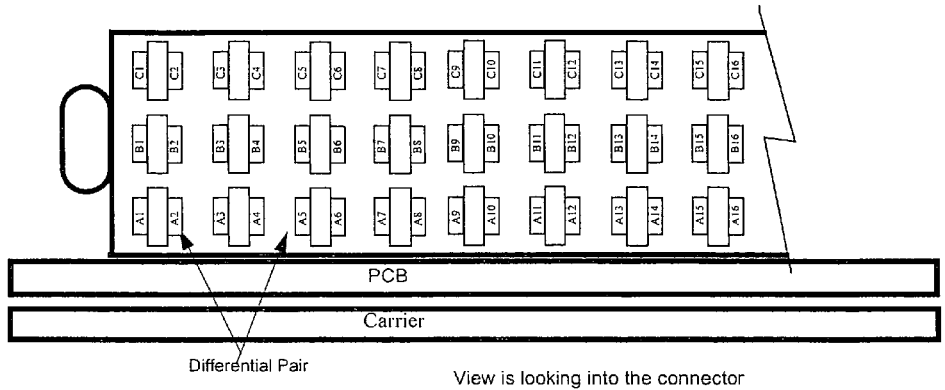

Figure 28: Molex SPA Floating Connector Conductor Arrangement

For differential pairs, the connector impedance is 100 ohms. Each side of a differential pair can be used for single-ended connections. In single-ended configurations, the connector impedance is 50 ohms.

Simulation models for the connector can be found on EDCS, document number EDCS-206987.

The connector system has several pin lengths to accommodate OIR requirements (the contact lengths are controlled by the host connector):

1st Mate: the connector guide pins and connector shell which are signal ground

2nd Mate: A1 and C1. This provides +12V return path. In addition A48 and C48 are the same length for ease of connector manufacturing, but these contacts could be used for ordinary signals.

3rd Mate: A2-A47, B2-B47, C2-C47. These are ordinary signal contacts.

4th Mate: B1 and B48. These provide the SPA insertion detection.

A printed version of this document is an uncontrolled copy.

© 2002 Cisco Systems, Inc.                                      Company Confidential

3.2 Pin Definitions

The following table has the pin assignments for the SPA connector. The table is formatted so that if you rotate it 90 degrees to the left it is a view looking into the SPA side floating connector for a SPA with the carrier down. Signals labeled as reserved are for future expansion and must be left unconnected.

| Pin | Signal Name | Pin | Signal Name | Pin | Signal Name |
|---|---|---|---|---|---|
| A1 | RTRN (12V)[a] | B1 | SPA_DET_B | C1 | RTRN (12V) |
| A2 | +12V | B2 | PWR_ENA | C2 | +12V |
| A3 | RTRN (12V) | B3 | PWR_OK | C3 | TRST_L |
| A4 | +12V | B4 | SPA_OK | C4 | TDO |
| A5 | AUX_PWR | B5 | TDI | C5 | TMS |
| A6 | ISPSEL | B6 | TCLK | C6 | INT_L |
| A7 | FCCLK | B7 | FCSTAT | C7 | ERR_L |
| A8 | FCFRM_L | B8 | FCPAR | C8 | RESET_L |
| A9 | AD7 | B9 | AD6 | C9 | AD5 |
| A10 | AD4 | B10 | AD3 | C10 | AD2 |
| A11 | PAR | B11 | AD1 | C11 | AD0 |
| A12 | BLCK | B12 | VALID_L | C12 | SRDY_L |
| A13 | SDATA | B13 | SONREF_P | C13 | RXREF |
| A14 | SCLK | B14 | SONREF_N | C14 | Reserved |
| A15 | Reserved | B15 | Reserved | C15 | Reserved |
| A16 | Reserved | B16 | Reserved | C16 | Reserved |
| A17 | SPI4REF_P | B17 | Reserved | C17 | Reserved |
| A18 | SPI4REF_N | B18 | Reserved | C18 | Reserved |
| A19 | RDCLK_P | B19 | RCTL_P | C19 | RDAT15_P |
| A20 | RDCLK_N | B20 | RCTL_N | C20 | RDAT15_N |
| A21 | RDAT14_P | B21 | RDAT13_P | C21 | RDAT12_P |
| A22 | RDAT14_N | B22 | RDAT13_N | C22 | RDAT12_N |
| A23 | RDAT11_P | B23 | RDAT10_P | C23 | RDAT9_P |
| A24 | RDAT11_N | B24 | RDAT10_N | C24 | RDAT9_N |
| A25 | RDAT8_P | B25 | RDAT7_P | C25 | RDAT6_P |
| A26 | RDAT8_N | B26 | RDAT7_N | C26 | RDAT6_N |
| A27 | RDAT5_P | B27 | RDAT4_P | C27 | RDAT3_P |
| A28 | RDAT5_N | B28 | RDAT4_N | C28 | RDAT3_N |
| A29 | RDAT2_P | B29 | RDAT1_P | C29 | RDAT0_P |
| A30 | RDAT2_N | B30 | RDAT1_N | C30 | RDAT0_N |
| A31 | RSCLK_P | B31 | RSTAT1_P | C31 | RSTAT0_P |
| A32 | RSCLK_N | B32 | RSTAT1_N | C32 | RSTAT0_N |
| A33 | TDCLK_P | B33 | TCTL_P | C33 | TDAT15_P |
| A34 | TDCLK_N | B34 | TCTL_N | C34 | TDAT15_N |
| A35 | TDAT14_P | B35 | TDAT13_P | C35 | TDAT12_P |
| A36 | TDAT14_N | B36 | TDAT13_N | C36 | TDAT12_N |
| A37 | TDAT11_P | B37 | TDAT10_P | C37 | TDAT9_P |
| A38 | TDAT11_N | B38 | TDAT10_N | C38 | TDAT9_N |
| A39 | TDAT8_P | B39 | TDAT7_P | C39 | TDAT6_P |
| A40 | TDAT8_N | B40 | TDAT7_N | C40 | TDAT6_N |
| A41 | TDAT5_P | B41 | TDAT4_P | C41 | TDAT3_P |
| A42 | TDAT5_N | B42 | TDAT4_N | C42 | TDAT3_N |
| A43 | TDAT2_P | B43 | TDAT1_P | C43 | TDAT0_P |
| A44 | TDAT2_N | B44 | TDAT1_N | C44 | TDAT0_N |
| A45 | TSCLK_P | B45 | TSTAT1_P | C45 | TSTAT0_P |
| A46 | TSCLK_N | B46 | TSTAT1_N | C46 | TSTAT0_N |
| A47 | Reserved | B47 | Reserved | C47 | Reserved |
| A48 | Reserved | B48 | SPA_DET_A | C48 | Reserved |

Table 42: SPA Connector Pinout a. Normally RTRN is directly connected to GND

3.2.1 Propagation Delay

Signals incur different amounts of propagation delay as they pass through the SPA signal connector depending on which row they are on. Table 43 below gives the propagation delays for each connector row for the case of the standard host connector mated with the SPA connector. *What about offset host configurations? Also need to add the offset SPA connector.*

| Connector Row | Propagation Time |
|---|---|
| A | 100psec |
| B | 170psec |
| C | 240psec |

Table 43: Conductor Propagation Time

3.3 Connector Use on Double-wide SPAs

Double-wide SPAs will have access to both host connectors and must populate both connectors. A double-wide SPA can use both SPI4.2 interfaces but the connector on the right (when viewing the board from the faceplate with the component side up) is the primary connector. This connector should be used for the SPI-4 interface and should be the one that has the ID EEPROM populated on the C2W bus. In addition this is the connector where detect will be signalled to the host (see Section 9.4 for details of the OIR implementation for a double-wide SPA). If in a rare case that a SPA requires > 10Gbps x 2, then the SPI-4.2 interface on the second connector can be utilized for data transfers, but this may limit the application of this particular SPA in some hosts. In addition a double-wide SPA has double the power available to the SPA, power should be drawn from both connectors.

The following figure designates the primary SPA connector for a double-wide SPA.

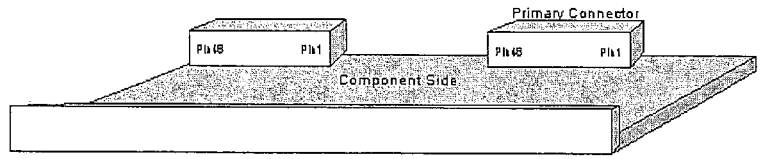

Figure 29: Double-wide Primary Connector

4.0 SPA Packet Formats

It is impractical to have one generic packet format used between each type of SPA and the host system. There turns out to be four basic formats which are defined below. A SPA must support one or more of these formats to be compliant.

Since SPAs are targeted at many different host systems, the motivations for the formats given are to hide the detail (i.e. burden) of a specific media type as much as possible within the SPA itself, and also to hide the specific detail (i.e. burden) of a given host system from the SPA as much as possible.

In short, the four formats are as follows:

Format A: Ethernet SPA 8 byte shim format.

Format B: ATM SPA 4 byte shim format.

Format C: Highly Channelized SPA 4 byte shim format.

Format D: POS/RPR/Ethernet etc SPA - no shim format

4.1 Format A: Ethernet SPA 8 byte Shim Format

In short, this format allows the SPA to strip the L2 encapsulation entirely, and replace it with an 8 byte shim header which includes all the relevant information from the original packet for the forwarding engine to make an efficient forwarding decision.

The lower 4 bytes are approximately formatted in the same way as a Frame Relay header, allowing possible simplification of design of the host's forwarding engine.

Stripping the L2 header is optional on a per-packet basis, allowing support for tunnels such as EoMPLS.

If the L2 header is left on the packet, then it can also optionally be padded with 2 or 3 bytes in order to bring the L3 header to 4 byte alignment. The first byte of the padding indicates the number of padding bytes present.

4.1.1 Rx Direction

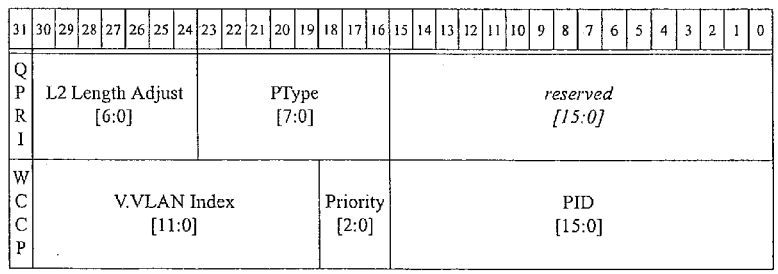

- QPRI: This indicates the Priority of the packet (0=low, 1=high) based on a classification done on the packet by the SPA [e.g. for Ethernet it considers 802.1p priority bits & VLANID, or IP TOS/MPLS EXP]. The purpose of this bit is allow intelligence to be applied to congestion control before the packet has had a chance to be processed into the system's main classification engine/queueing system. (This will be very common in oversubscribed applications). Note that in one mode of operation, the QPRI bit is appended to the SPI4 channel number.

- L2 Length Adjust[6:0]: Since the format of the packet leaving the SPA can include optional stripping of the variable-length L2 encapsulation, and the addition of a shim header, this field indicates the number of bytes which the packet is now shorter than what is was when first received from the wire. Note that this field is in 2's complement format (can take range of -64 to +63 bytes). The L3 engine can determine the original L2 length by adding this field to the total number of bytes received from the SPA.
- PType[7:0]: This Packet Type field indicates what the ethertype of the L3 packet is. The format and values assigned are software configurable. It's main use would be when the PID[15:0] field is overwritten with another value indicating the packet needs to be tunneled because it allows software to identify the underlying packet type without re-analyzing the packet.
- Reserved: no assumption should be made as to the value of this field.
- WCCP: This flag indicates the SA for the packet matched one of the configured WCCP MAC addresses (and thus the forwarding of this packet needs to be different). 0=no match, 1=match (i.e. disable WCCP redirect)
- V.VLAN Index[11:0]: For 802.1q packets, this is an indicator for which VLANID/port the packet arrived on. The SPA maps (via CAM) the incoming port/VLANID into this value. It is not required to have any mapping configured at all - the original VLANID[11:0] can be passed instead. The value 0 is used when the packet was not 802.1q format.
- Priority[2:0]: This is derived (via a mapping) from the 802.1q VLAN header (if present). The value of 0 is used when the packet is not 802.1q format.
- PID[15:0]: This is the Protocol ID of the L2 header of the packet. It may have been translated by the SPA. There are certain 'special' values of the PID field used to indicate special treatment of the particular packet. The special values themselves are software configurable. The following special PIDs are expected to be used (nothing precludes adding more in the future):
    - Tunneled packet - when the VLANID/port# of the arriving packet are configured to enter an L2 tunnel, then the entire packet with L2 encapsulation are brought into the L3 engine (e.g. EoMPLS, L2TPv3)
    - Exception packet - when the SPA has detected something about the packet which causes it to want to bypass any fastpath forwarding and have it sent directly to the local CPU. It is expected there may be more than one exception packet special PID defined, which allows classification of the packets into different priority CPU queues for instance.

The FCS is stripped from the end of the packet by the SPA.

4.1.2 Tx Direction

In the Tx direction, packets are sent into the SPA with no additional headers/shims.

The complete L2 header is assumed to be attached to the packet (no padding).

The SPA will generate and append the appropriate FCS.

The SPA will pad the packet to the minimum ethernet size if required.

4.2 Format B: ATM SPA 4 Byte Shim Format

In short, this format is simply a 4 byte shim prepended to the received and transmitted packet. No other manipulation/stripping/padding of the packet is performed.

The additional shim header allows indication of the ATM VP/VC the packet was received on (plus some other miscellaneous bits).

The format given here is specific to the particular SAR vendor [Azanda[1]] being used for the ATM SPAs, and thus might have to change if a different vendor was used in the future (although the same basic information would have to be carried).

4.2.1 Rx Direction

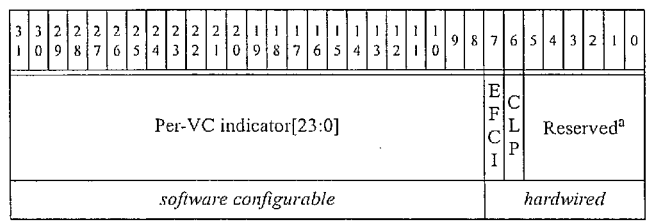

a. This field's contents are undefined and should be ignored by the receiver.

- EFCI: Flag from received ATM cell
- CLP: Flag from received ATM cell
- Per-VC indicator[23:0]: This is an entirely software configurable field. The SAR copies this entire field in from a per-VC table, so it is free to change between host systems.

For example: the contents of this field could be as follows:

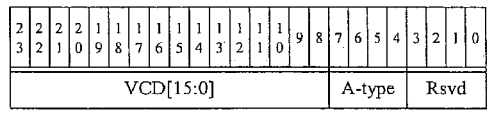

- A-Type[3:0]: indicates the encapsulation type for this packet (used by the forwarding engine to determine the length of the following L2 header & location of the PID)
- VCD[15:0]: indicates the VP/VC/interface which the packet was received on.

Packets received by the host will have the original L2 encapsulation included untouched at the start.

Packets received by the host will not include the AAL5 PDU trailer (e.g. CRC)

---

1. Azanda "Katana", *Does their spec have a number?*

4.2.2 Tx Direction

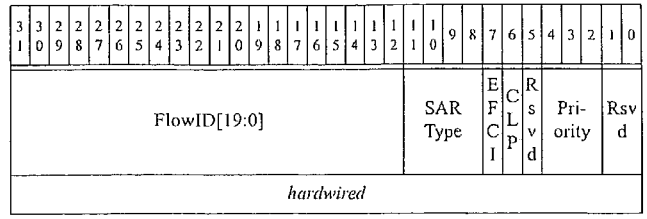

- EFCI: Copied into the segmented cells
- CLP: Copied into the segmented cells
- Priority[2:0]: Used for WRED parameter selection in the SAR.
- SAR Type[3:0]: SAR specific value which indicates whether to perform AAL5 segmentation, direct (raw) cell transmission, or OAM cell transmission
- FlowID[19:0]: indicates the appropriate SAR queue to place the packet on (there can be many FlowIDs mapped to the same VP/VC).

None of these fields are reconfigurable for other functions.

Packets sent by the host must include all appropriate L2 headers.

Packets sent by the host have no AAL5 PDU trailer information attached - this is appended by the SAR.

4.3 Format C: Highly Channelized SPA 4 byte shim format

This format includes a four byte shim prepended to each transmitted and received packet. This shim indicates the channel number to send/receive the packet from. It can be used in situations where there are more than 256 channels used in the system [SPI4.2 only supports up to 256 channels].

Note that the value provided in this shim header is a global (in reference to the SPA) channel number

4.3.1 Rx Direction

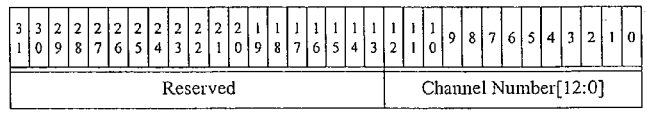

- Channel Number[12:0]: This is the channel number that the packet was received on
- Reserved: The SPA will drive these to 0.

The L2 header (PPP/HDLC/FR) is left intact on each received packet sent to the host.

The trailing CRC for each packet is stripped by the SPA before being passed to the host system.

4.3.2 Tx Direction

| 31 30 29 28 27 26 25 24 23 22 21 20 19 18 17 16 15 14 13 | 12 11 10 9 8 7 6 5 4 3 2 1 0 |
|---|---|
| Reserved | Channel Number[12:0] |

- Channel Number[12:0]: This is the channel number that the packet was received on
- Reserved: The SPA ignores these bits.

Packets from the host must include the appropriate L2 encapsulation (PPP/HDLC/FR).

The packet passed from the host system to the SPA does not include the trailing CRC - this is generated by the SPA itself.

4.4 Format D: POS/RPR SPA/Ethernet/etc. - no shim format

This is the trivial case. The exact contents of the received packet are transferred across to the host system without any manipulation or shims.

This is used for the following cases:
- Packet Over SONET SPAs
- Channelized SPA cases where the number of channels is less than 256
- RPR SPAs
- Ethernet if the system wants the complete packet including the L2 header.
- Possible other SPAs.

In each case (except RPR) the L2 encapsulation (i.e. HDLC/PPP/FR) is left untouched on received packets, and is expected to be already present on outgoing packets.

For RPR, the SPA strips the incoming SRP MAC and replaces it with a PPP header, and the opposite function in the transmit direction.

The trailing CRC is stripped from receive packets by the SPA, and is not provided to the SPA for transmit packets.

5.0 Miscellaneous SPA requirements

This section contains some requirements for different types of SPAs. This is to ensure that a certain minimum set of requirements are imposed on common SPA types.

5.1 Ethernet SPAs

In order to allow cost effective support for oversubscribing Ethernet SPAs, it is a requirement that Ethernet SPAs must support a store and forward architecture for the egress direction. This will allow host/engine cards to be cost effective (without high bandwidth buffer memories) without the risk of having underruns on the line.

5.2 Optical SPAs

- In general pluggable modular optics are required when available, specifically there will be a set of Cisco specified pluggable optics (with digital diagnostics) which should be supported to assure compliance to standards.
- The preferred connector types are SC and LC.

5.3 Counter Requirements

In general the following statistics should be kept on a per SPI-4 channel basis on the SPA:
- Received and Transmitted Packets
- Received and Transmitted Bytes
- Received Aborts
- Received DIP-4 errors (per interface is also acceptable, DIP-4 stats could be kept in SW triggered by an interrupt since the rate of errors is normally very low)

In general the following statistics should be kept on a per SPI-4 channel basis on the host:
- Received Aborts
- Received DIP-4 errors (per interface is also acceptable)

In general the following statistics should be kept on a per channel basis on the SPA. This would be on a per VLAN basis for Ethernet, per VC basis in the case of ATM or per channel for a ChOC card:
- Received and Transmitted Packets
- Received and Transmitted Bytes
- Other L1 and L2 protocol specific counters which are needed for rmon (CRC/FCS errors, runts, giants, drops etc.).

5.4 Margining Capabilities

It is recommended that all SPAs function at +/- 5% of their nominal frequencies. There will be some exceptions to this such as optical modules and some other components that just won't work beyond their specified frequency. This will be tested in an EDVT environment. Frequency margining may be accomplished by component substitution.

All SPAs are required to function at +/- 8% of the +12V rail, in addition all SPAs are required to function at +/- 5% on any voltage rail that is generated locally on the SPA. This will be tested in an EDVT environment and in a manufacturing environment. Voltage margining must be accomplished via SW commands. All voltage rails must be independently marginable. If a SPA can not be margined at +/- 5%, then +/- 3% is acceptable. SPA designers are encouraged to use a flexible margining circuit (with a digital pots and voltage readback) to enable simple margining control in a EDVT, STRIFE and manufacturing environment.

SPA Generic Hardware Specification EDCS-172353 Rev: 1.0

All SPAs will be tested in thermal chambers at -5°C to 55°C, but depending on the host that the SPA sits in, the air temperature at the SPA may be significantly higher due to pre-heating of the air. Details of how SPAs will be tested in an EDVT environment can be found in EDCS-183148.

5.5 Programmable Logic

It is likely that an SPA design will have some form of programmable logic devices such as FPGAs or CPLDs. All programmable devices must be field upgradeable by host SW. JTAG programmable devices should be first in the SPA JTAG chain and there should be provisions to isolate the programmable devices in the JTAG chain. SRAM based devices such as FPGAs that are programmed via Flash or configuration EEPROMs must be loaded independently by the SPA without host intervention on SPA power up. In addition the host must have the capability to update the configuration EEPROM or Flash memory. This may be accomplished by using the JTAG bus or the SPA bus. The SPA must be capable of surviving a power loss during a programmable logic device upgrade. After the host SW updates a configuration EEPROM or Flash, the SPA power will be cycled by SW to initiate a FPGA reload. This requires the SW to have the capability to control either the PWR_ENA pin or to directly control the +12V that is fed to the SPA.

5.6 High Availability Requirements

SPAs in general should support the following goals
- Prevention of failures (through component selection and protection such as ECC algorithms)
- Fast detection of errors/failures
- Fast repair of failures (through fast reset, partial resets, fast loading etc)

SPAs must support a FIT rate (Failures In Time) of 2000? *(tbd)*. One FIT = 1 failure in $10^9$ device hours. 2000 FITs = $10^9/24/365/2000$ years = 1 failure in 57 years.

SPAs must assert PWR_OK within 1 second of +12V being applied and PWR_EN being asserted to the SPA.

SPAs must assert SPA_OK within 1 second of asserting PWR_OK. This implies all FPGA loading etc. is completed within this time. An exception is made for the case when power was previously lost during an FPGA upgrade attempt. In this exception case, the duration of the FPGA upgrade will dictate when SPA_OK is asserted.

SPAs must be capable of having their programmable images updated quickly. The original goal was to specify a fixed limit, but it was found that as FPGA size increases so does the download time and that the download time is mainly dependent on the erase and burn in time of the devices. The goal should be to minimize this time and keep it to < 5 minutes. This is important if a system is booted and the SW determines that the FPGA must be updated prior to bringing the SPA online. If a SPA is already online and passing traffic and then SW determines that the FPGA should be updated, SPAs must be capable of having their FPGA image downloaded (to the flash or EEPROM where the image is stored) without interrupting traffic. The act of actually reconfiguring the FPGA can interrupt traffic. Traffic would only be interrupted for the 2 seconds when the SPA power is cycled and the SPA HW is brought back up + any time that it takes SW to reconfigure the SPA.

5.7 Auxiliary C2W Interface

The Auxiliary C2W interface would sit off of some programmable logic on the SPA and provide a means of accessing other C2W devices.

5.7.1 Using the Auxiliary C2W to Access SFP Devices

SFP transceivers contain serial EEPROM devices that in turn contain information about the transceiver's capabilities, standard interfaces, manufacturer, etc.[1] This serial EEPROM has a fixed serial address of 1010000b. When you have multiple SFP devices attached to the serial A printed version of this document is an uncontrolled copy.

© 2002 Cisco Systems, Inc.

Company Confidential interface, each will have the same serial address therefore it is necessary to provide a means of targeting specific SFP serial interfaces. This can be accomplished by using some type of bus switch device to connect the main SPA serial interface to the desired SFP serial interface. All other SFP devices will have to have their serial interface deselected in order to prevent multiple SFPs from attempting to respond to the serial interface access.

5.7.2 Temperature Sensors

SPAs must support a minimum of two and can support a maximum of five temperature sensors. There are two recommended temperature sensors to use on SPAs, the MAX1668 (Cisco p/n 15-7481-01) or the DS1621 (16-2932-01). These devices have C2W interfaces.

The ALERT output of the temperature sensor should be connected as an SPA interrupt source to facilitate interrupt driven temperature alerts. The alert interrupt source must be maskable.

Upper and lower temperature thresholds are set via values in the SPA serial EEPROM.

5.7.3 Power Supply Margining Controller

The Standard SPA power supply reference design uses a C2W bus compatible digital potentiometer to control margining. This allows SW to flexibly margin any rail to a wide range of power supply offsets for EDVT testing. The currently specified component is a Maxim DS1844 (Cisco p/n 15-6497-01).

---

1. Refer to the SFP Transceiver Multi source Agreement (MSA) for more information.

SPA Generic Hardware Specification EDCS-172353 Rev: 1.0

6.0 SPA Mechanical Assembly

The SPA mechanical design is detailed in ENG-207303. Below is a quick overview and some diagrams that show the major dimensions of the SPA types.

6.1 Mechanical Design Requirements the SPA mechanical design must address requirements of related technical concerns:
- Mechanical fit and function
- Thermal management
- Front-panel I/O, power, and host system connectors
- Safety and compliance
- Appearance to conform to Cisco Corporate Identity standards, including coloration, logos, port labeling, and product identification
- Design management and revision control

6.1.1 Half Height Major Dimensions

Figure 30 and Figure 31 below show the Half Height SPA's top, front and side views with the associated major dimensions (shown in inches).

Figure 30: Half Height Major Dimensions

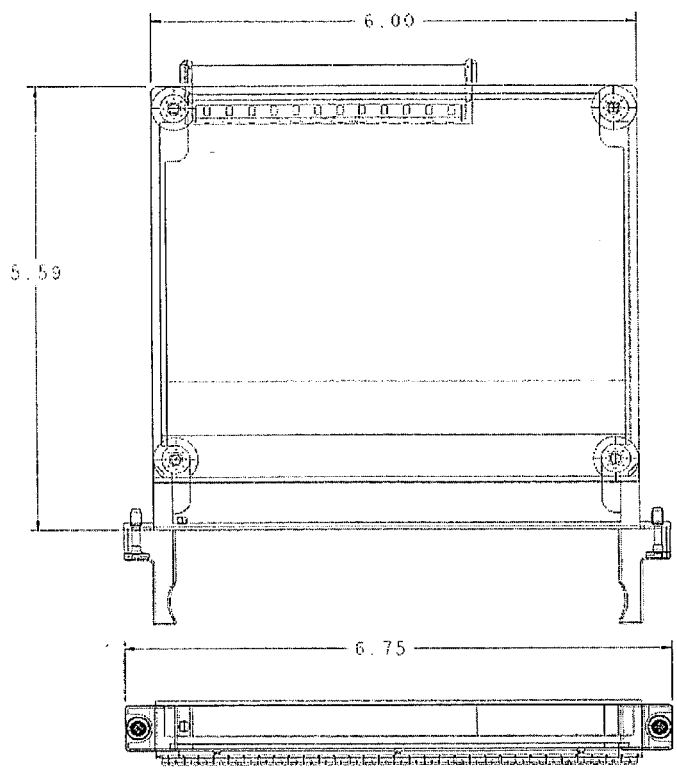
Figure 31: Half Height Major Dimensions
6.2 Full Height Major Dimensions
Figure 32 and Figure 33 below show the Full Height SPA's top, front and side views with the associated major dimensions (shown in inches).
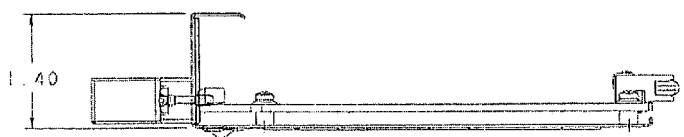
Figure 32: Full Height Major Dimensions SPA Generic Hardware Specification EDCS-172353 Rev: 1.0
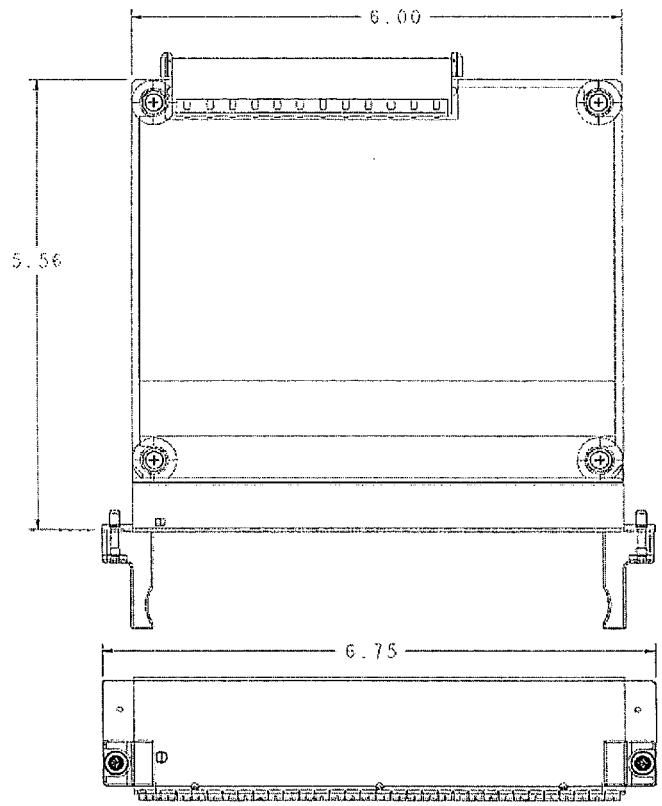
Figure 33: Full Height Major Dimensions

7.0 SPA Register Set

The purpose of this section is to provide a foundation for the common address map and register set for all SPAs. The registers documented in the following pages are the registers common to most SPAs, only those registers that are applicable to a given SPA must be implemented for that SPA. All SPAs uses 24 bit addresses. All SPA common registers are 32 bits wide (unused bits are reserved). The register map provides for common configuration, status and interrupt registers. The map also provides for SPA specific address locations. The "SPA Common Register Map" will assist the software development team in creating a code base reusable across all SPAs. Although byte addressing is used, all 32 bit transfers must be addressed at 4 byte boundaries (i.e. the least significant 2 address bits must be 0).The SFP related registers are to be used for SPAs with SFPs and can also be used for any type of optical SPA.

7.1 Register Nomenclature

The address map and register bit definitions are defined in the following sections.

The term "SPALLADD" refers to an address location that must be followed by all SPA designers. The term "SPALLBIT" refers to a register bit allocation that must be followed by all SPA designers. It is essential that the "SPALLADD" address locations and "SPALLBIT" bit allocations be followed by all SPA designers in order to leverage the "common" software drivers. Some 32-bit data registers have a mixture of "SPALLBIT" bits and "SPASPBIT" bits. All SPASPADD addresses and SPASPBIT bits can be used for SPA-SPECIFIC purposes.

This document is meant as a guide for all SPAs. It is possible that some of the registers defined in the following sections may not pertain to certain SPAs (i.e. a SPA without any SFPs). If this is true any unused "SPALLADD" addresses or "SPALLBIT" bits should be left as reserved.

Below is an explanation of the abbreviated acronyms used in the "Type" field of the register definitions.
- SPASPADD = SPA-SPECIFIC Address Location
- SPALLADD = SPA-ALL Address Location
- SPASPBIT = SPA-SPECIFIC Individual Bit
- SPALLBIT = SPA-ALL Individual Bit
- RW = Read/Write
- RO = Read Only
- COR = Clear on Read
- COW = Clear on Write (writing a '1' to a bit clears it)

7.2 SPA Register Definitions

Table 44 Provides a summary of all SPA bus accessible Registers.

| Addr Range | Name | Type | Description |
|---|---|---|---|
| General Registers | | | |
| 0x00_0000 - 0x00_0003 | SW_FPGA_REV_ID | RO<br>SPALLADD | FPGA Revision Register for Software |
| 0x00_0004 - 0x00_0007 | HW_FPGA_REV_ID | RO<br>SPALLADD | Reserved (for Spa-Specific revision information) |

Table 44: SPA Register Map

| Addr Range | Name | Type | Description |
|---|---|---|---|
| 0x00_0008 - 0x00_000F | RESET_CNTL_REG_0:1 | RW SPALLADD | Reset Output Control Registers |
| 0x00_0010 - 0x00_0013 | LED_CNTL_REG_0 | RW SPALLADD | LED Control Register 0 - Bd Stat LED |
| 0x00_0014 - 0x00_002F | LED_CNTL_REG_1:7 | RW SPALLADD | LED Control Register 1 - Port Link LEDs |
| 0x00_0030 - 0x00_0033 | GP_CONFIG_REG_0 | RW SPALLADD | General Purpose Config Register 0 - Force Error |
| 0x00_0034 - 0x00_006F | GP_CONFIG_REG_1:15 | RW SPALLADD | General Purpose Config Registers |
| 0x00_0070 - 0x00_00AF | GP_STATUS_REG_0:15 | RO SPALLADD | General Purpose Status Registers |
| 0x00_00B0 - 0x00_00B3 | TEST_REG | RW SPALLADD | Test Register |
| 0x00_00B4 - 0x00_00B7 | ADR_TRAP_REG | RO SPALLADD | Address Trap Register |
| 0x00_00B8 - 0x00_00BB | SPA_TIMEOUT_REG | RO SPALLADD | SPA bus Timeout Register |
| 0x00_00BC - 0x00_00BF | SPA_ERROR_REG | RO SPALLADD | SPA bus Error Register |
| 0x00_00C0 - 0x00_00FF | Reserved | SPASPADD | Reserved |
| Interrupt Registers | | | |
| 0x00_0100 - 0x00_0103 | BM_INT_STAT_REG | RO SPALLADD | Bit-Mapped Interrupt Status Register |
| 0x00_0104 - 0x00_0107 | SFP_ALL_INT_STAT_REG | RO SPALLADD | SFP ALL Interrupt Status Register |
| 0x00_0108 - 0x00_010B | SPA_BRD_INT_STAT_REG | RO/COW SPALLADD | SPA Board Interrupt Status Register - C2W buses, Temp Sensor |
| 0x00_010C - 0x00_0113 | GP_INT_STAT_REG_0:1 | RO SPALLADD | General Purpose Interrupt Status Registers |
| 0x00_0114 - 0x00_011F | Reserved | SPASPADD | Reserved |
| 0x00_0120 - 0x00_0123 | SPA_BRD_INT_ENB_REG | RW SPALLADD | SPA Board Interrupt Enable Register - SPA bus, C2W buses, Temp Sensor |

Table 44: SPA Register Map

SPA Generic Hardware Specification EDCS-172353 Rev: 1.0

| Addr Range | Name | Type | Description |
|---|---|---|---|
| 0x00_0124 - 0x00_012B | GP_INT_ENB_REG_0:1 | RW SPALLADD | General Purpose Interrupt Enable Registers |
| 0x00_012C - 0x00_012F | Reserved | SPASPADD | Reserved |
| 0x00_0130 - 0x00_0133 | SPA_BRD_INT_OVRD_REG | RW SPALLADD | SPA Board Interrupt Override Register - SPA bus, C2W buses, Temp Sensor |
| 0x00_0134 - 0x00_013B | GP_INT_OVRD_REG_0:1 | RW SPALLADD | General Purpose Interrupt Override Registers |
| 0x00_013C - 0x00_01FF | Reserved | SPASPADD | Reserved |
| 0x00_0200 - 0x00_0203 | SFP_INT_STAT_REG_0 | COR SPALLADD | SFP Port 0 Interrupt Status Register. Not all SPA will have SFPs, unused registers are reserved. |
| 0x00_0204 - 0x00_0207 | SFP_CFG_STAT_REG_0 | RW RO SPALLADD | SFP Port 0 Configuration and Status Register. Not all SPAs will have SFPs, unused registers are reserved. |
| 0x00_0208 - 0x00_02AF | SFP_INT_STAT_REG_1:31 & SFP_CFG_STAT_REG_1:31 | COR RW RO SPALLADD | Reserved for SFP Port 1 - Port 31 SFP Ports 1 through 31 Interrupt Status Registers and Configuration and Status Registers. Not all SPAs will have SFPs, unused registers are reserved. |
| 0x00_02B0 - 0x00_03FF | Reserved | SPASPADD | Reserved |
| Mastered Cisco 2 Wire (C2W) Registers | | | |
| 0x00_0400 - 0x00_0403 | C2W_CONTROL_REG | RW SPALLADD | C2W Control Register |
| 0x00_0404 - 0x00_0407 | C2W_COMMAND_REG | RW COR RO SPALLADD | C2W Command Register |
| 0x00_0408 - 0x00_040B | C2W_DATA_L_REG | RW SPALLADD | C2W Data Low Register |
| 0x00_040C - 0x00_040F | C2W_DATA_H_REG | RW SPALLADD | C2W Data High Register |
| 0x00_0410 - 0x00_0413 | C2W_BIT_REG | RW SPALLADD | C2W Bit-Controlled Register |
| 0x00_0414 - 0x01_FFFF | Reserved | SPASPADD | Reserved |
| SPA Board Specific Address Space | | | |
| 0x02_0000 - 0xFF_FFFF | Reserved | SPASPADD | Reserved - SPA Board Specific Address Space |

Table 44: SPA Register Map

A printed version of this document is an uncontrolled copy.
© 2002 Cisco Systems, Inc.                     Company Confidential SPA Generic Hardware Specification EDCS-172353 Rev: 1.0

7.3 SPA FPGA CSR Region: SPA General Registers

7.3.1 Software FPGA Revision ID: SW_FPGA_REV_ID

ADDR = 0x00_0000 - 0x00_0003

TYPE = RO

This register indicates the SPA FPGA revision level used by Software.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | fpga_major_revision_level |||||||||||||||||
| Reset Value | fpga_major_revision_level |||||||||||||||||

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | fpga_minor_revision_level |||||||||||||||||
| Reset Value | fpga_minor_revision_level |||||||||||||||||

| Bits | Name | Type | Description |
|---|---|---|---|
| 31:16 | fpga_major_revision_level | RO SPALLBIT | 16-bit binary number that shows the major revision level associated with the Host Interface Controller FPGA. A change in the FPGA major revision level indicates that changes to software are required. |
| 15:0 | fpga_minor_revision_level | RO SPALLBIT | 16-bit binary number that shows the minor revision level associated with the Host Interface Controller FPGA. Changes in the minor revision level require no changes to software. |

7.3.2 Hardware FPGA Revision ID: HW_FPGA_REV_ID

ADDR = 0x00_0004 - 0x00_0007

TYPE = RO

This register indicates the SPA FPGA revision level used by Hardware.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Reserved |||||||||||||||||
| Reset Value | Reserved |||||||||||||||||

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Reserved |||||||||||||||||
| Reset Value | Reserved |||||||||||||||||

| Bits | Name | Type | Description |
|---|---|---|---|
| 31:0 | Reserved | RO SPASPBIT | Reserved for SPA-SPECIFIC functions |

7.3.3 Reset Output Control Register 0: RESET_CNTL_REG_0:1 (Two 32-bit Regs)

ADDR = 0x00_0008 - 0x00_000F

SPA Generic Hardware Specification EDCS-172353 Rev: 1.0

TYPE = RW

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Reset_31:16 | | | | | | | | | | | | | | | |
| Reset Value | 1 | 1 | 1 | 1 | 1 | 1 | 1 | 1 | 1 | 1 | 1 | 1 | 1 | 1 | 1 | 1 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Reset_15:0 | | | | | | | | | | | | | | | |
| Reset Value | 1 | 1 | 1 | 1 | 1 | 1 | 1 | 1 | 1 | 1 | 1 | 1 | 1 | 1 | 1 | 1 |

| Bits | Name | Type | Description |
|---|---|---|---|
| | | | These two 32-bit registers control the various RESETs to devices on the SPA. All reset control bits are treated as active high. The register bits used must be initialized to "1" which places the device in RESET. Software may release the reset as it sees fit by writing a 0 to the appropriate register bits. |
| | | | Any bits not used are to made reserved bits. |
| | | | If a device on the SPA requires an active low reset, it is up to the hardware to invert the output of the RESET_CNTL_REG_0:1 registers before sending the reset to the device. |
| 31:0 | Reset_31:0 | RW SPASPBIT | 0 = Device N is NOT in reset<br>1 = Device N is held in reset |

7.3.4 LED Control Registers: LED_CNTL_REG_0 (Board Status LED)

ADDR = 0x00_0010 - 0x00_0013

TYPE = RW

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Reserved | | | | | | | | | | | | | | | |
| Reset Value | x | x | x | x | x | x | x | x | x | x | x | x | x | x | x | x |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Reserved | | | | | | | | | | | | | | bs_led_yel | bs_led_grn |
| Reset Value | x | x | x | x | x | x | x | x | x | x | x | x | x | x | 1 | 0 |

| Bits | Name | Type | Description |
|---|---|---|---|
| 31:2 | Reserved | SPASPBIT | Reserved for Spa Specific functions. |
| 1 | bs_led_yel | RW SPALLBIT | Bit 1 is initialized to a ONE, which turns on the yellow/amber element within the bicolor board status LED (the vendor calls the color of this LED element yellow, but we believe it to be closer to amber).<br><br>0 = yellow/amber element of bicolor LED is off<br>1 = yellow/amber element of bicolor LED is on |
| 0 | bs_led_grn | RW SPALLBIT | Bit 0 is initialized to a ZERO, which turns off the green element within the bicolor board status LED.<br><br>0 = green element of bicolor LED is off<br>1 = green element of bicolor LED is on |

7.3.5 LED Control Registers: LED_CNTL_REG_1:7 (Port Link LEDs) (Seven 32-bit Regs)

ADDR = 0x00_0014 - 0x00_002F

A printed version of this document is an uncontrolled copy.

© 2002 Cisco Systems, Inc. Company Confidential

SPA Generic Hardware Specification EDCS-172353 Rev: 1.0

TYPE = RW

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Reserved | | | | | | | | | | | | | | | |
| Reset Value | x | x | x | x | x | x | x | x | x | x | x | x | x | x | x | x |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Reserved | | | | | | | | | | | | | | | |
| Reset Value | x | x | x | x | x | x | x | x | x | x | x | x | x | x | x | x |

| Bits | Name | Type | Description |
|---|---|---|---|
| | | | Reserved for Spa-Specific functions. Each SPA has different Port Link led needs. |
| 31:0 | Reserved | RW SPASPBIT | Reserved for Spa SPA Port Link LEDs. |

7.3.6 General Purpose Configuration Register 0: GP_CONFIG_REG_0

ADDR = 0x00_0030 - 0x00_0033

TYPE = RW

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | see prom_wp | Reserved | | | | | | | | | | | | | | |
| Reset Value | 1 | x | x | x | x | x | x | x | x | x | x | x | x | x | x | x |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Reserved | | | | | | | | | | | | | | spa_bus_force_par_err | force_err |
| Reset Value | x | x | x | x | x | x | x | x | x | x | x | x | x | x | 0 | 0 |

| Bits | Name | Type | Description |
|---|---|---|---|
| 31 | seeprom_wp | RW SPALLBIT | Write Protect bit for Serial EEPROM<br>0 = Host can read, erase, and write Serial EEPOM.<br>1 = Host can only read Serial EEPROM. |
| 30:2 | Reserved | SPASPBIT | Reserved for Spa Specific functions. |
| 1 | spa_bus_force_par_err | RW SPALLBIT | This bit forces the SPA bus parity bit to an incorrect value (i.e. odd parity) and is only effective during a read data transfers. It is used by Host software to test the SPA bus parity checking circuitry on the Host.<br>0 = Normal operation, the SPA bus Par line driven from the SPA reflects even parity.<br>1 = Incorrect parity, the SPA bus Par line driven from the SPA reflects odd parity causing the parity checking logic on the Host Baseboard to flag an error on data returning from the SPA card. |
| 0 | force_err | RW SPALLBIT | This bit forces the Err_L signal to "0". It is used by software to test the SPA Error checking circuitry on the Host Baseboard.<br>0 = Normal operation. The SPA Bus Err_L is live and reporting only real errors.<br>1 = The SPA bus Err_L signal is forced to a "0" state to test the reaction of the Host Baseboard. |

A printed version of this document is an uncontrolled copy.

© 2002 Cisco Systems, Inc.  Company Confidential 7.3.7 General Purpose Configuration Register 1: GP_CONFIG_REG_1:15 (Fifteen 32-bit Regs)

ADDR = 0x00_0034 - 0x00_006F

TYPE = RW

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Reserved | | | | | | | | | | | | | | | |
| Reset Value | x | x | x | x | x | x | x | x | x | x | x | x | x | x | x | x |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Reserved | | | | | | | | | | | | | | | |
| Reset Value | x | x | x | x | x | x | x | x | x | x | x | x | x | x | x | x |

| Bits | Name | Type | Description |
|---|---|---|---|
| [31:0] | Reserved | SPASPBIT | Reserved for Spa Specific functions. |

7.3.8 General Purpose Status Register 0: GP_STATUS_REG_0:15 (Sixteen 32-bit Regs)

ADDR = 0x00_0070 - 0x00_00AF

TYPE = RO

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Reserved | | | | | | | | | | | | | | | |
| Reset Value | x | x | x | x | x | x | x | x | x | x | x | x | x | x | x | x |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Reserved | | | | | | | | | | | | | | | |
| Reset Value | x | x | x | x | x | x | x | x | x | x | x | x | x | x | x | x |

| Bits | Name | Type | Description |
|---|---|---|---|
| [31:0] | Reserved | SPASPBIT | Reserved for Spa Specific functions. |

7.3.9 Test Register: TEST_REG

ADDR = 0x00_00B0 - 0x00_00B3

TYPE = RW

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | tst_31 | tst_30 | tst_29 | tst_28 | tst_27 | tst_26 | tst_25 | tst_24 | tst_23 | tst_22 | tst_21 | tst_20 | tst_19 | tst_18 | tst_17 | tst_16 |
| Reset Value | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | tst_15 | tst_14 | tst_13 | tst_12 | tst_11 | tst_10 | tst_9 | tst_8 | tst_7 | tst_6 | tst_5 | tst_4 | tst_3 | tst_2 | tst_1 | tst_0 |
| Reset Value | 0 | 0 | 0 | 0 | 0 | 0 | 0 | 0 | 0 | 0 | 0 | 0 | 0 | 0 | 0 | 0 |

| Bits | Name | Type | Description |
|---|---|---|---|
| 31:0 | tst_[31:0] | RW SPALLBIT | These bits are for testing. Anything written to them will be read back. Note: this register is for test purposes only. |

7.3.10 Address Trap Register: ADR_TRAP_REG

ADDR = 0x00_00B4 - 0x00_00B7

TYPE = RW

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Reserved | | | | | | | | adr_23 | adr_22 | adr_21 | adr_20 | adr_19 | adr_18 | adr_17 | adr_16 |
| Reset Value | x | x | x | x | x | x | x | x | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | adr_15 | adr_14 | adr_13 | adr_12 | adr_11 | adr_10 | adr_9 | adr_8 | adr_7 | adr_6 | adr_5 | adr_4 | adr_3 | adr_2 | adr_1 | adr_0 |
| Reset Value | 0 | 0 | 0 | 0 | 0 | 0 | 0 | 0 | 0 | 0 | 0 | 0 | 0 | 0 | 0 | 0 |

| Bits | Name | Type | Description |
|---|---|---|---|
| [31:24] | Reserved | SPA5PBIT | Reserved for Spa Specific functions. |
| 23:0 | adr_[23:0] | RO SPALLBIT | This register gives increased visibility to SPA bus exceptions. It is written with the pertinent 24 bit SPA bus address when any of the following events occur.<br><br>1) A Host initiates a SPA bus transaction on a non supported address boundary. For example if the host performs an 8 bit access to a 32 bit register. The Host can be notified of this exception by enabling Invalid SPA Address Interrupts (see Section 7.4.3).<br><br>2) The target of a SPA bus transaction does not respond (e.g. because there is no defined register on the SPA at that particular address). The Host can be notified of this exception by enabling SPA Target Not Responding Interrupts (see Section 7.4.3).<br><br>This register is also written when a C2W slave device does not respond, or responds with a "not acknowledge" (NAK), to the SPA FPGA - which is bus master. In this scenario, the least significant 16 bits of the C2W Command Register write cycle that initiated the failed C2W transfer is written into the Address Trap Register along with the least significant 8 bits of the C2W Control Register (see Section 7.5.4 and Section 7.5.3). More specifically:<br>adr_[23:16] is written with C2W port select (bits 7:0 of C2W Control Register)<br>adr_[15:8] is written with the C2W sub-address (bits 15:8 of C2W Command Reg)<br>adr_[7:1] is written with the C2W device address (bits 7:1 of C2W Command Reg)<br>adr_[0] is written with the C2W R/W control bit (bit 0 of C2W Command Reg)<br>The Host can be notified of this exception by enabling C2W Target Not Responding Interrupts (see Section 7.4.3). |

7.3.11 SPA Timeout Register: SPA_TIMEOUT_REG

ADDR = 0x00_00B8 - 0x00_00BB

TYPE = RW

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Reserved | | | | | | | | | | | | tmout_19 | tmout_18 | tmout_17 | tmout_16 |
| Reset Value | x | x | x | x | x | x | x | x | x | x | x | x | 1 | 1 | 1 | 1 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | tmout_15 | tmout_14 | tmout_13 | tmout_12 | tmout_11 | tmout_10 | tmout_9 | tmout_8 | tmout_7 | tmout_6 | tmout_5 | tmout_4 | tmout_3 | tmout_2 | tmout_1 | tmout_0 |
| Reset Value | 1 | 1 | 1 | 1 | 1 | 1 | 1 | 1 | 1 | 1 | 1 | 1 | 1 | 1 | 1 | 1 |

| Bits | Name | Type | Description |
|---|---|---|---|
| [31:20] | Reserved | SPASPBIT | Reserved for Spa Specific functions. |
| 19:0 | tmout_[19:0] | RW SPALLBIT | The SPA Timeout Register is used to detect a Host error condition where the SPA bus signal Valid_L has been asserted for too long (i.e. Valid_L is stuck low). If Valid_L is asserted for longer than 20 ns * tmout[19:0], the SPA will assert Err_L. The maximum timeout interval is approximately 21 ms, which is the default reset value.<br>Also used as the Timeout register for the SPA bus target devices (e.g. MAC chips, etc.) |

7.3.12 SPA Error Register: SPA_ERROR_REG

ADDR = 0x00_00BC - 0x00_00BF

TYPE = COR

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Reserved | | | | | | | | | | | | | | | |
| Reset Value | x | x | x | x | x | x | x | x | x | x | x | x | x | x | x | x |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | | | | | | | | | | | | | | invl d_cy cle | invl d_ad d | par_ err |
| Reset Value | x | x | x | x | x | x | x | x | x | x | x | x | x | 0 | 0 | 0 |

| Bits | Name | Type | Description |
|---|---|---|---|
| [31:3] | Reserved | SPASPBIT | Reserved for Spa Specific functions. |
| 2 | invld_cycle | COR SPALLBIT | Invalid SPA Cycle<br><br>A SPA expects valid_l to be asserted appropriately, if it is either deasserted early or late then this bit will be set and error will be signaled.<br>0 = valid_l of a previous transfer was asserted correctly.<br>1 = valid_l of a previous transfer was not asserted correctly. |
| 1 | invld_add | COR SPALLBIT | Invalid SPA bus Address<br><br>A SPA expects certain types of bus transactions for particular addresses. For example all accesses to the SPA register set are required to be 32 bits wide and aligned on a 32 bit boundary. If a host tries to make an access to an address using an incorrect address or command, then this bit is set and error is asserted. In addition if an unsupported address is accessed this bit and error are asserted.<br>0 = SPA bus Addresses of previous transfers are valid.<br>1 = SPA bus Address of a previous transfer was not valid causing this address to be written into the Address Trap Register (see Section 7.3.10). |
| 0 | par_err | COR SPALLBIT | SPA Parity Error<br><br>0 = No parity error has been detected on the SPA bus.<br>1 = A parity error has been detected on the SPA bus. |

7.4 SPA FPGA CSR Region: SPA Interrupt Registers

There are three different types of interrupts on the SPA, they are "SPA Board", "General Purpose (GP)" and "SFP" interrupts. The SFP will cause an interrupt when the present, los or tx fault signals go from 0-to-1 or 1-to-0 (i.e. posedge and negedge detection and hold). The Spa Board and GP interrupts can be level-sensitive or edge sensitive, it is up to the SPA designer to choose the type and implement the appropriate logic. In general SPA Board interrupts are used for conditions generated in the SPA FPGA and GP interrupts are for devices external to the FPGA.

Each defined bit in the SPA Board Interrupt Status Register (SPA_BRD_INT_STAT_REG) has a corresponding defined bit in the SPA Board Interrupt Enable Register (SPA_BRD_INT_ENB_REG) and SPA Board Interrupt Override Register (SPA_BRD_INT_OVRD_REG). Similarly, each defined bit in General Purpose Interrupt Status Registers ((GP_INT_STAT_REG) has a corresponding defined bit in General Purpose Interrupt Enable Registers (GP_INT_ENB_REG) and General Purpose Interrupt Override Registers (GP_INT_OVRD_REG). Setting bits to a logic 1 in Interrupt Override Registers forces bits in the corresponding Interrupt Status Register to a logic 1. The Interrupt Override Registers are used for diagnostics and debug and are not used under normal operation of the SPA.

The register structure for SFP Transceiver interrupts are somewhat different. Each defined interrupt bit in the SFP All Interrupt Status Register (SFP_ALL_INT_STAT_REG) has three corresponding interrupt bits (SFP present interrupt, SFP loss of signal interrupt, and SFP transmit fault interrupt) in a per port SFP Interrupt Status Register (address map allows for 32 per-port registers). Adjacent to these per port SFP Interrupt Status Registers are per port Configuration and Status Registers containing a live status bit, an interrupt enable bit, and an interrupt override bit for each defined bit in the corresponding per port SFP Interrupt Status Register. Setting an interrupt override bit to a logic 1 forces the corresponding bit in the Interrupt Status Register to a logic 1:

Under normal operation a bit in an Interrupt Status Register is set to a logic 1 (causing SPA Int_L to be asserted) when a specific on-board signal is:
- at a positive level (i.e. a logic 1),
- or at a negative level (i.e. a logic 0),
- or creating a positive edge (i.e. transitioning from 0 to 1),
- or creating a negative edge (i.e. transitioning from 1 to 0),
- or creating either a positive edge or negative edge (i.e. transitioning).
- and the corresponding Interrupt Enable bit is enabled The Bit-Mapped Interrupt Status Register is at the top of the interrupt register hierarchy. When an interrupt is being serviced by the Host software, this is the first register read. Each defined bit in the Bit-Mapped Interrupt Status Register represents a logic ORing of all defined bits in an Interrupt Status Register (i.e. the number of defined bits in the Bit-Mapped Interrupt Status Register = the number of Interrupt Status Registers = 3 for the SPALLBIT implementation, see Section 7.4.1). Therefore bits that =1 in the Bit-Mapped Interrupt Status Register effectively point to their associated Interrupt Status Register (Spa Board, General Purpose or SFP).

The determination of which of these possible on-board signal events sets an interrupt status bit is determined by the hardware design (i.e. it is not software selectable). The logic associated with creating interrupts from a positive or negative level is combinatorial. As a result, the on-board signal causing the interrupt does not change state until an interrupt service routine can clear the underlying cause. The logic associated with creating interrupts from "positive and/or negative edges" is sequential (i.e. registered). This means the on-board signal causing the interrupt can change state because the interrupt event is latched. However, an interrupt service routine still needs a method of clearing edge detected interrupts. For the SPA the method is reading the associated bit in an Interrupt Status Register.

Figure 34 shows how a single on-board signal can activate the Int_L line driven to the Host Baseboard.

Note, for the Spa Board and GP interrupts that the actual circuitry would contain a subset of the positive edge detection logic, negative edge detection logic, positive level detection logic, and negative level detection logic. As previously stated, a specific interrupt is based on a positive level, or a negative level, or a positive edge, or a negative edge, or any edge (i.e. positive or negative). And once again as a reminder the SFP interrupts are posedge and negedge sensitive

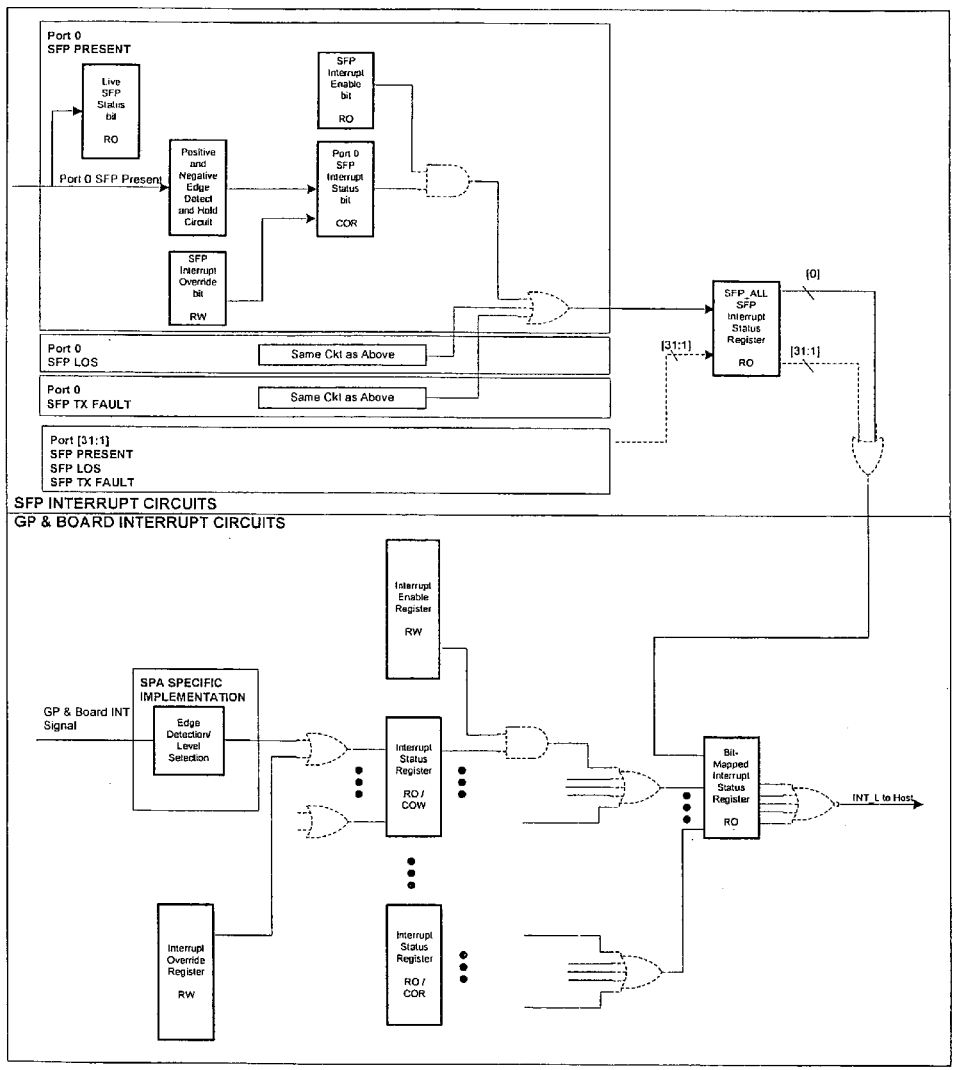
Figure 34: Interrupt Registers
7.4.1 Bit-Mapped Interrupt Status Register: BM_INT_STAT_REG
ADDR = 0x00_0100 - 0x00_0103

SPA Generic Hardware Specification EDCS-172353 Rev: 1.0

TYPE = RO

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Reserved | | | | | | | | | | | | | | | |
| Reset Value | x | x | x | x | x | x | x | x | x | x | x | x | x | x | x | x |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Reserved | | | | | | | | | | | | | bm_gp_int | bm_spa_brd_int | bm_sfp_int |
| Reset Value | x | x | x | x | x | x | x | x | x | x | x | x | x | 0 | 0 | 0 |

| Bits | Name | Type | Description |
|---|---|---|---|
| [31:3] | Reserved | SPASPBIT | Reserved for Spa Specific functions. |
| 2 | bm_gp_int | RO SPALLBIT | Bit-Mapped Interrupt Status Register bit for the General Purpose Interrupt Status Register 0<br><br>0 = All of the defined bits in General Purpose Interrupt Status Register 0 and 1 are "Not" active.<br>1 = One or more of the defined bits in General Purpose Interrupt Status Register 0 or 1 are active (i.e. =1).<br>Read GP_INT_STAT_REG_0:1 (Section 7.4.4) to find which SPA specific device(s) are causing the interrupt. |
| 1 | bm_spa_brd_int | RO SPALLBIT | Bit-Mapped Interrupt Status Register bit for the SPA Board Interrupt Status Register<br><br>0 = All of the defined bits in the SPA Board Interrupt Status Register are "Not" active.<br>1 = One or more of the defined bits in the SPA Board Fault Interrupt Status Register bits are active.<br>Read SPA_BRD_INT_STAT_REG (Section 7.4.3) to find which SPA Board device(s) are causing the interrupt. |
| 0 | bm_sfp_int | RO SPALLBIT | Bit-Mapped Interrupt Status Register bit for the SFP All Interrupt Status Register<br><br>0 = All of the defined bits in the SFP All Interrupt Status Register are "Not" active.<br>1 = One or more of the defined bits in the SFP All Interrupt Status Register are active.<br>Read SFP_ALL_INT_STAT_REG (Section 7.4.2) to find which SFP port(s) are causing the interrupt. |

7.4.2 SFP All Interrupt Status Register: SFP_ALL_INT_STAT_REG

ADDR = 0x00_0104 - 0x00_0107

TYPE = RO

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | sfp_int_31 | sfp_int_30 | sfp_int_29 | sfp_int_28 | sfp_int_27 | sfp_int_26 | sfp_int_25 | sfp_int_24 | sfp_int_23 | sfp_int_22 | sfp_int_21 | sfp_int_20 | sfp_int_19 | sfp_int_18 | sfp_int_17 | sfp_int_16 |
| Reset Value | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | sfp_int_15 | sfp_int_14 | sfp_int_13 | sfp_int_12 | sfp_int_11 | sfp_int_10 | sfp_int_9 | sfp_int_8 | sfp_int_7 | sfp_int_6 | sfp_int_5 | sfp_int_4 | sfp_int_3 | sfp_int_2 | sfp_int_1 | sfp_int_0 |
| Reset Value | 0 | 0 | 0 | 0 | 0 | 0 | 0 | 0 | 0 | 0 | 0 | 0 | 0 | 0 | 0 | 0 |

A printed version of this document is an uncontrolled copy.

© 2002 Cisco Systems, Inc.  Company Confidential

| Bits | Name | Type | Description |
|---|---|---|---|
| colspan="4" | The SFP_ALL_INT_STAT_REG register is only for 32 SFPs on the SPA. Use only the bits needed for the amount of SFPs on the particular SPA. Fill the bit allocation from the LSB-to-MSB. Any unused bits are reserved. |
| [31:1] | Same format as below | SPALLBIT | Note<br>Bits[31:1] follow the same format as below. |
| 0 | sfp_int_0 | RO SPALLBIT | SFP Interrupt Status bit for the transceiver at Port 0<br><br>0 = no SFP Interrupts from Port 0 are active.<br>1 = one or more SFP Interrupts from Port 0 are active, read SFP_INT_STAT_REG_0 (Section 7.4.9) to see exactly which interrupt(s) are active. This bit will also =1 when any "interrupt override" bit =1 in SFP_CFG_STAT_REG_0 (see Section 7.4.10). |

7.4.3 SPA Board Interrupt Status Register: SPA_BRD_INT_STAT_REG

ADDR = 0x00_0108 - 0x00_010B

TYPE = COW except bit 0 which is RO

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | colspan="16" | Reserved |
| Reset Value | x | x | x | x | x | x | x | x | x | x | x | x | x | x | x | x |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | colspan="10" | Reserved | | | | | c2w_b us_do ne_int | c2w_b us_bsy _int | c2w_tr gt_not _rspd_ int | | | temp_i nt |
| Reset Value | x | x | x | x | x | x | x | x | x | x | 0 | 0 | 0 | x | x | 0 |

All defined SPA Board Interrupt Status Register bits have corresponding SPA Board Interrupt Enable Register bits which must be asserted for interrupts to flow through to the Host. A bit in this register can, however, be set even if the corresponding bit in the SPA Board Interrupt Enable Register =0. This allows SW to poll for activity even if an interrupt is disabled.

Bits 5, 4, and 3 are cleared when a '1' is written to this register. A SPA Board Interrupt caused by writing a "1" to bits 5, 4, or 3 of the SPA Board Interrupt Override Register can only be cleared by writing "0" to that bit in the SPA Board Interrupt Override Register (see Section 7.4.7).

| Bits | Name | Type | Description |
|---|---|---|---|
| [31:6] | Reserved | SPASPBIT | Reserved for Spa Specific functions. |
| 5 | c2w_bus_done_int | COW SPALLBIT | SPA FPGA C2W bus cycle Done Interrupt<br><br>0 = C2W bus cycle has not been initiated and completed since this register was previously read.<br>1 = C2W bus cycle has been initiated and completed since this register was previously read, bit 31 of the C2W Command Register has transitioned from 0 to 1. This c2w_bus_done_int bit will also =1 when bit 5 of the SPA_BRD_INT_OVRD_REG =1. |
| 4 | c2w_bus_bsy_int | COW SPALLBIT | SPA FPGA C2W bus Busy Interrupt<br><br>This bit flags an error if the C2W Command Register is written before a previous write to that register has completed (as indicated by the c2w_bus_done bit).<br>0 = the C2W Command Register was never written when bit 31 of that register (c2w_bus_done) =0.<br>1 = C2W bus busy error, the C2W Command Register was written when bit 31 of that register (c2w_bus_done) =0. This c2w_bus_bsy_int bit will also =1 when bit 4 of the SPA_BRD_INT_OVRD_REG =1. |
| 3 | c2w_trgt_not_resp_int | COW SPALLBIT | SPA FPGA C2W bus Target device Not Responding Interrupt<br><br>0 = C2W bus cycles have completed normally.<br>1 = C2W target/slave device has not responded or has responded with a "Not Acknowledge" (NAK). When this occurs, the Address Trap Register is written with the least significant 16 bits of data from the SPA Command Register write cycle that initiated the failed C2W transfer along with the least significant 8 bits of the C2W Control Register (see Section 7.3.10). This c2w_trgt_not_resp_int bit will also =1 when bit 3 of the SPA_BRD_INT_OVRD_REG =1. |
| 2 | Reserved | SPASPBIT | Reserved for Spa Specific functions. |
| 1 | Reserved | SPASPBIT | Reserved for Spa Specific functions. |
| 0 | temp_int | RO SPALLBIT | Temperature Sensor chip (MAX1668) Interrupt<br><br>0 = Temperature Sensor chip interrupt is "NOT" active<br>1 = Temperature Sensor chip interrupt is active. This temp_int bit will also =1 when bit 0 of the SPA_BRD_INT_OVRD_REG =1. Note that this interrupt can only be cleared by accessing the MAX1668 Temperature Sensor chip or by clearing bit 0 of the SPA Board Interrupt Override Register (assuming it is set). |

7.4.4 General Purpose Interrupt Status Register 0, 1: GP_INT_STAT_REG_0:1 (Two 32-bit Regs)

ADDR = 0x00_010C - 0x00_0113

TYPE = RO

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | int_sta t_31 | int_sta t_30 | int_sta t_29 | int_sta t_28 | int_sta t_27 | int_sta t_26 | int_sta t_25 | int_sta t_24 | int_sta t_23 | int_sta t_22 | int_sta t_21 | int_sta t_20 | int_sta t_19 | int_sta t_18 | int_sta t_17 | int_sta t_16 |
| Reset Value | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | int_sta t_15 | int_sta t_14 | int_sta t_13 | int_sta t_12 | int_sta t_11 | int_sta t_10 | int_sta t_9 | int_sta t_8 | int_sta t_7 | int_sta t_6 | int_sta t_5 | int_sta t_4 | int_sta t_3 | int_sta t_2 | int_sta t_1 | int_sta t_0 |
| Reset Value | 0 | 0 | 0 | 0 | 0 | 0 | 0 | 0 | 0 | 0 | 0 | 0 | 0 | 0 | 0 | 0 |

All defined General Purpose Interrupt Status Register[1:0] bits have corresponding General Purpose Interrupt Enable Register[1:0] bits which must be asserted for interrupts to flow through to the Host (even if the source of the interrupt is the General Purpose Interrupt Override Register[1:0]).A bit in this register can be set even if the corresponding bit in the General Purpose Interrupt Enable Register =0. This allows SW to poll for activity even if an interrupt is disabled.

| Bits | Name | Type | Description |
|---|---|---|---|
| | | | Use only the bits needed for the amount of GP interrupts on the particular SPA. Fill the bit allocation from the LSB-to-MSB. Any unused bits are reserved. |
| [31:0] | int_stat_n | SPASPBIT | GP Interrupt Status bits (Spa Specific)<br>0 = The Device interrupt is "NOT" active.<br>1 = The Device interrupt is active. |

7.4.5 SPA Board Interrupt Enable Register: SPA_BRD_INT_ENB_REG

ADDR = 0x00_0120 - 0x00_0123

TYPE = RW

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Reserved | | | | | | | | | | | | | | | |
| Reset Value | x | x | x | x | x | x | x | x | x | x | x | x | x | x | x | x |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Reserved | | | | | | | | | | c2w_bus_done_int_enb | c2w_bus_bsy_int_enb | c2w_trgt_not_resp_int_en b | Reserved | | temp_i nt_enb |
| Reset Value | x | x | x | x | x | x | x | x | x | x | 0 | 0 | 0 | x | x | 0 |

| Bits | Name | Type | Description |
|---|---|---|---|
| [31:6] | Reserved | SPASPBIT | Reserved for Spa Specific functions. |
| 5 | c2w_bus_done_int_en b | RW SPALLBIT | SPA FPGA C2W bus Done Interrupt Enable<br><br>0 = SPA Board Interrupt Status Register bit 5 cannot go active (i.e. cannot = 1).<br>1 = SPA Board Interrupt Status Register bit 5 will go active (i.e. will = 1) when a SPA FPGA C2W bus cycle is done and bit 31 of the C2W Command Register transitions from 0 to 1 or bit 5 of the SPA_BRD_INT_OVRD_REG = 1. |
| 4 | c2w_bus_bsy_int_enb | RW SPALLBIT | SPA FPGA C2W Bus Busy Interrupt Enable<br><br>0 = SPA Board Interrupt Status Register bit 4 cannot go active (i.e. cannot = 1).<br>1 = SPA Board Interrupt Status Register bit 4 will go active (i.e. will = 1) if a write to the C2W Command Register occurs when bit 31 of that register (c2w_bus_done) =0 (see Section 7.5.4) or bit 4 of the SPA_BRD_INT_OVRD_REG = 1. |
| 3 | c2w_trgt_not_resp_int _enb | RW SPALLBIT | SPA FPGA C2W bus Target device Not Responding Interrupt Enable<br><br>0 = SPA Board Interrupt Status Register bit 3 cannot go active (i.e. cannot = 1).<br>1 = SPA Board Interrupt Status Register bit 3 will go active (i.e. will = 1) when a SPA FPGA C2W bus target device does not respond to a transfer or responds to a transfer with a Not Acknowledge (NAK) or bit 3 of the SPA_BRD_INT_OVRD_REG = 1. |

SPA Generic Hardware Specification EDCS-172353 Rev: 1.0

| Bits | Name | Type | Description |
|---|---|---|---|
| 2 | Reserved | SPASPBIT | Reserved for Spa Specific functions. |
| 1 | Reserved | SPASPBIT | Reserved for Spa Specific functions. |
| 0 | temp_int_enb | RW SPALLBIT | Temperature Sensor chip (MAX1688) Interrupt Enable<br><br>0 = SPA Board Interrupt Status Register bit 0 cannot go active (i.e. cannot = 1).<br>1 = SPA Board Interrupt Status Register bit 1 will go active (i.e. will = 1) when the MAX1668 Temperature Sensor asserts it's interrupt output or bit 0 of the SPA_BRD_INT_OVRD_REG = 1. |

7.4.6 General Purpose Interrupt Enable Register 0, 1: GP_INT_ENB_REG_0:1 (Two 32-bit Regs)

ADDR = 0x00_0124 - 0x00_012B

TYPE = RW

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | int_en b_31 | int_en b_30 | int_en b_29 | int_en b_28 | int_en b_27 | int_en b_26 | int_en b_25 | int_en b_24 | int_en b_23 | int_en b_22 | int_en b_21 | int_en b_20 | int_en b_19 | int_en b_18 | int_en b_17 | int_en b_16 |
| Reset Value | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | int_en b_15 | int_en b_14 | int_en b_13 | int_en b_12 | int_en b_11 | int_en b_10 | int_en b_9 | int_en b_8 | int_en b_7 | int_en b_6 | int_en b_5 | int_en b_4 | int_en b_3 | int_en b_2 | int_en b_1 | int_en b_0 |
| Reset Value | 0 | 0 | 0 | 0 | 0 | 0 | 0 | 0 | 0 | 0 | 0 | 0 | 0 | 0 | 0 | 0 |

| Bits | Name | Type | Description |
|---|---|---|---|
| \multicolumn{4}{} Use only the bits needed for the amount of GP interrupt enables on the particular SPA. Fill the bit allocation from the LSB-to-MSB. Any unused bits are reserved. | | | |
| 31:0 | int_enb_n | SPASPBIT | GP Interrupt Enable bits (Spa Specific)<br><br>0 = Interrupt NOT enabled. General Purpose Interrupt Status Register 0 bit 0 cannot go active (i.e. cannot = 1).<br>1 = Interrupt enabled. |

7.4.7 SPA Board Interrupt Override Register: SPA_BRD_INT_OVRD_REG

ADDR = 0x00_0130 - 0x00_0133

TYPE = RW

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Reserved | | | | | | | | | | | | | | | |
| Reset Value | x | x | x | x | x | x | x | x | x | x | x | x | x | x | x | x |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Reserved | | | | | | | | | | c2w_b us_do ne_int _ovrd | c2w_b us_bsy _int_o vrd | c2w_tr gt_not _resp_ int_ov rd | Reserved | | temp_i nt_ovr d |
| Reset Value | x | x | x | x | x | x | x | x | x | x | 0 | 0 | 0 | x | x | 0 |

A printed version of this document is an uncontrolled copy.

© 2002 Cisco Systems, Inc.                                                                                        Company Confidential The defined bits in this register are used to force bits in the SPA Board Interrupt Status Register =1, causing Host interrupts.

| Bits | Name | Type | Description |
|---|---|---|---|
| [31:6] | Reserved | SPASPBIT | Reserved for Spa Specific functions. |
| 5 | c2w_bus_done_int_ovrd | RW SPALLBIT | SPA FPGA C2W bus cycle Done Interrupt Override<br>0 = C2W bus Done Interrupt is NOT forced.<br>1 = Force SPA Board Interrupt Status Register bit 5 =1. |
| 4 | c2w_bus_bsy_int_ovrd | RW SPALLBIT | SPA FPGA C2W bus Busy Interrupt Override<br>0 = C2W bus Busy Interrupt is NOT forced.<br>1 = Force SPA Board Interrupt Status Register bit 4 =1. |
| 3 | c2w_trgt_not_resp_int_ovrd | RW SPALLBIT | SPA FPGA C2W bus Target device Not Responding Interrupt Override<br>0 = C2W bus Target Not Responding Interrupt is NOT forced.<br>1 = Force SPA Board Interrupt Status Register bit 3 =1. |
| 2 | Reserved | SPASPBIT | Reserved for Spa Specific functions. |
| 1 | Reserved | SPASPBIT | Reserved for Spa Specific functions. |
| 0 | temp_int_ovrd | RW SPALLBIT | Temperature Sensor chip (MAX1668) Interrupt Override<br>0 = Temperature Sensor Interrupt is NOT forced.<br>1 = Force SPA Board Interrupt Status Register bit 0 =1. |

7.4.8 General Purpose Interrupt Override Register 0, 1: GP_INT_OVRD_REG_0:1 (Two 32-bit Regs)

ADDR = 0x00_0134 - 0x00_013B

TYPE = RW

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | int_ovrd_31 | int_ovrd_30 | int_ovrd_29 | int_ovrd_28 | int_ovrd_27 | int_ovrd_26 | int_ovrd_25 | int_ovrd_24 | int_ovrd_23 | int_ovrd_22 | int_ovrd_21 | int_ovrd_20 | int_ovrd_19 | int_ovrd_18 | int_ovrd_17 | int_ovrd_16 |
| Reset Value | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | int_ovrd_15 | int_ovrd_14 | int_ovrd_13 | int_ovrd_12 | int_ovrd_11 | int_ovrd_10 | int_ovrd_9 | int_ovrd_8 | int_ovrd_7 | int_ovrd_6 | int_ovrd_5 | int_ovrd_4 | int_ovrd_3 | int_ovrd_2 | int_ovrd_1 | int_ovrd_0 |
| Reset Value | 0 | 0 | 0 | 0 | 0 | 0 | 0 | 0 | 0 | 0 | 0 | 0 | 0 | 0 | 0 | 0 |

The defined bits in this register are used to force bits in General Purpose Interrupt Status Register 0 =1, causing Host interrupts. These interrupts only occur if the corresponding General Purpose Interrupt Enable Register bit is set to enable the interrupt.

| Bits | Name | Type | Description |
|---|---|---|---|
|  |  |  | Use only the bits needed for the amount of GP interrupt override bits on the particular SPA. Fill the bit allocation from the LSB-to-MSB. Any unused bits are reserved. |
| 31:0 | int_ovrd_n | SPASPBIT | GP Interrupt Overide bits (Spa Specific)<br>0 = Interrupt is NOT forced.<br>1 = Force Interrupt of associated bit in GP_INT_STAT_REG_0:1 registers |

7.4.9 SFP Interrupt Status Register 0: SFP_INT_STAT_REG_0

ADDR = 0x00_0200 - 0x00_0203

SPA Generic Hardware Specification EDCS-172353 Rev: 1.0

TYPE = COR

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Reserved | | | | | | | | | | | | | | | |
| Reset Value | x | x | x | x | x | x | x | x | x | x | x | x | x | x | x | x |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Reserved | | | | | | | | | | | | | sfp_txf_int | sfp_los_int | sfp_pres_int |
| Reset Value | x | x | x | x | x | x | x | x | x | x | x | x | x | 0 | 0 | 0 |

All defined SFP Interrupt Status Register bits have corresponding SFP Interrupt Enable bits which must be asserted for interrupts to flow through to the Host (unless the source of the interrupt is one of the SFP Interrupt Override bits). Interrupt bits in this register can, however, be set even if the interrupt is not enabled, this allows SW to poll this register instead of using interrupts if so desired.

| Bits | Name | Type | Description |
|---|---|---|---|
| [31:3] | Reserved | SPASPBIT | Reserved for Spa Specific functions. |

A printed version of this document is an uncontrolled copy.

© 2002 Cisco Systems, Inc.

Company Confidential

| Bits | Name | Type | Description |
|---|---|---|---|
| 2 | sfp_txf_int | COR SPALLBIT | SFP Transmitter Fault Interrupt Status bit<br><br>The sfp_txf_int status bit is set to "1" whenever the sfp_tx_fault bit (bit 18) of SFP_CFG_STAT_REG_0 changes state (i.e. "0 to 1" or "1 to 0"). This means an SFP Transmit Fault Interrupt occurs when a transmitter's status degrades from "normal" to "Tx Fault" or when "Tx Fault" status improves to "normal".<br><br>0 = SFP Transmitter Fault Interrupt Status for Port 0 has "NOT" changed since this register was last read.<br>1 = SFP Transmitter Fault Interrupt Status for Port 0 has changed since this register was last read. Read SFP_CFG_STAT_REG_0 for the current state of the sfp_tx_fault bit. This sfp_txf_int bit will also =1 when bit 5 (sfp_txf_int_ovrd) of SFP_CFG_STAT_REG_0 =1. An SFP Transmit Fault Interrupt caused by writing a "1" to bit 5 of SFP_CFG_STAT_REG_0 can only be cleared by writing "0" to bit 5 of SFP_CFG_STAT_REG_0. |
| 1 | sfp_los_int | COR SPALLBIT | SFP Loss Of Signal Interrupt Status bit<br><br>The sfp_los status bit is set to "1" whenever an sfp_los bit (bit 17) of SFP_CFG_STAT_REG_0 changes state (i.e. "0 to 1" or "1 to 0"). This means an SFP Loss Of Signal Interrupt occurs when a received signal degrades to "Loss Of Signal" status or when "Loss Of Signal" receiver status improves to "normal".<br><br>0 = SFP Loss Of Signal Interrupt Status for Port 0 has "NOT" changed since it was last read.<br>1 = SFP Loss Of Signal Interrupt Status for Port 0 has changed since it was last read. Read SFP_CFG_STAT_REG_0 for the current state of the sfp_los bit. This sfp_los_int bit will also =1 when bit 4 (sfp_los_int_ovrd) of SFP_CFG_STAT_REG_0 =1. An SFP Loss Of Signal Interrupt caused by writing a "1" to bit 4 of SFP_CFG_STAT_REG_0 can only be cleared by writing "0" to bit 4 of SFP_CFG_STAT_REG_0. |
| 0 | sfp_pres_int | COR SPALLBIT | SFP Present Interrupt Status bit<br><br>The sfp_pres_int status bit is set to "1" whenever the sfp_pres bit (bit 16) of SFP_CFG_STAT_REG_0 changes state (i.e. "0 to 1" or "1 to 0"). This means an SFP Present Interrupt occurs whenever an SFP transceiver is inserted or extracted.<br><br>0 = SFP Present status for Port 0 has "NOT" changed since this register was last read.<br>1 = SFP Present status for Port 0 has changed since this register was last read. Read SFP_CFG_STAT_REG_0 for current state of sfp_pres bit. This sfp_pres_int bit will also =1 when bit 3 (sfp_pres_int_ovrd) of SFP_CFG_STAT_REG_0 =1. An SFP Present Interrupt caused by writing a "1" to bit 3 of SFP_CFG_STAT_REG_0 can only be cleared by writing "0" to bit 3 of SFP_CFG_STAT_REG_0. |

7.4.10 SFP Configuration & Status Register 0: SFP_CFG_STAT_REG_0

ADDR = 0x00_0204 - 0x00_0207

TYPE = bits[18:16] are RO, bits[9:8] and bits[5:0] are RW

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | \multicolumn{13}{c}{Reserved} | | | | | | | | | | | | | sfp_tx_fault | sfp_los | sfp_pres |
| Reset Value | x | x | x | x | x | x | x | x | x | x | x | x | x | - | - | - |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Reserved | | | | | | sfp_rate_sel | sfp_tx_disable | Reserved | | sfp_txf_int_ovrd | sfp_los_int_ovrd | sfp_pres_int_ovrd | sfp_txf_int_e_nb | sfp_los_int_enb | sfp_pres_int_enb |
| Reset Value | x | x | x | x | x | x | 0 | 1 | x | x | 0 | 0 | 0 | 0 | 0 | 0 |

| Bits | Name | Type | Description |
|---|---|---|---|
| 31:19 | Reserved | SPASPBIT | Reserved for Spa Specific functions. |
| 18 | sfp_tx_fault | RO SPALLBIT | SFP Transmit Fault Status bit is a direct/live copy of the SFP Transmit Fault signal from the Port 0 SFP Transceiver.<br>0 = Normal operation<br>1 = Transmitter output has a laser fault of some kind |
| 17 | sfp_los | RO SPALLBIT | SFP Loss Of Signal Status bit is a direct/live copy of the SFP Loss Of Signal line from the Port 0 SFP Transceiver.<br>0 = Normal operation<br>1 = SFP received signal is below the worst case receiver sensitivity |
| 16 | sfp_pres | RO SPALLBIT | SFP Present Status bit is an inverted/live copy of the MOD_DEF0 signal from the Port 0 SFP Transceiver.<br>0 = SFP Transceiver is not present<br>1 = SFP Transceiver is present |
| 15:10 | Reserved | SPASPBIT | Reserved for Spa Specific functions. |
| 9 | sfp_rate_sel | RW SPALLBIT | SFP Rate Select configuration bit<br><br>0 = Reduced bandwidth<br>1 = Full bandwidth<br>This bit is currently unused by Gigabit Ethernet SFP Transceivers, so the state of this bit doesn't matter. |
| 8 | sfp_tx_disable | RW SPALLBIT | SFP Transmitter Disable configuration bit for Port 0 Transceiver<br><br>0 = Transmitter Enabled<br>1 = Transmitter Disabled |
| 7:6 | Reserved | SPASPBIT | Reserved for Spa Specific functions. |
| 5 | sfp_txf_int_ovrd | RW SPALLBIT | SFP Transmitter Fault Interrupt Override for Port 0<br><br>0 = SFP Transmitter Fault Interrupt bit from Port 0 is NOT forced.<br>1 = Force the SFP Transmitter Fault Interrupt bit from Port 0 (bit 2 of SFP_INT_STAT_REG_0) =1. Note that the Port 0 SFP Transmitter Fault Interrupt Enable bit (bit 2 of this register) need not be set to 1 for this interrupt to be forced. |
| 4 | sfp_los_int_ovrd | RW SPALLBIT | SFP Loss Of Signal Interrupt Override for Port 0<br><br>0 = SFP Loss Of Signal Interrupt from Port 0 is NOT forced.<br>1 = Force the SFP Loss Of Signal Interrupt bit from Port 0 (bit 1 of SFP_INT_STAT_REG_0) =1. Note that the Port 0 SFP Loss of Signal Interrupt Enable bit (bit 1 of this register) need not be set to 1 for this interrupt to be forced. |
| 3 | sfp_pres_int_ovrd | RW SPALLBIT | SFP Present Interrupt Override for Port 0<br><br>0 = SFP Present Interrupt from Port 0 is NOT forced.<br>1 = Force SFP Present Interrupt bit from Port 0 (bit 0 of SFP_INT_STAT_REG_0) =1. Note that the Port 0 SFP Present Interrupt Enable bit (bit 0 of this register) need not be set to 1 for this interrupt to be forced. |
| 2 | sfp_txf_int_enb | RW SPALLBIT | SFP Transmitter Fault Interrupt Enable for Port 0<br><br>0 = SFP Transmitter Fault Interrupt is not enabled.<br>1 = SFP Transmitter Fault Interrupt is enabled and can flow to the host. |
| 1 | sfp_los_int_enb | RW SPALLBIT | SFP Loss Of Signal Interrupt Enable for Port 0<br><br>0 = SFP Loss Of Signal Interrupt is not enabled.<br>1 = SFP Loss Of Signal Interrupt is enabled and can flow to the host. |
| 0 | sfp_pres_int_enb | RW SPALLBIT | SFP Present Interrupt Enable for Port 0<br><br>0 = SFP Present Interrupt is not enabled.<br>1 = SFP Present Interrupt is enabled and can flow to the host. |

7.4.11 SFP Interrupt Status Register 0: SFP_INT_STAT_REG_1:31

SFP_INT_STAT_REG_1 - SFP_INT_STAT_REG_31 is the same format as SFP_INT_STAT_REG_0. See address map for address location of Ports 1-31. For the remaining SFPs the SFP_INT_STAT_REG_X will go first then the associated SFP_CFG_STAT_REG_X will follow. Follow this format for up to the maximum of 32 Ports. Not all SPAs will have SFPs, unused registers are reserved

7.4.12 SFP Configuration & Status Register 0: SFP_CFG_STAT_REG_1:31

SFP_CFG_STAT_REG_1 - SFP_CFG_STAT_REG_31 is the same format as SFP_CFG_STAT_REG_0. See address map for address location of Ports 1-31. For the remaining SFPs the SFP_INT_STAT_REG_X will go first then the associated SFP_CFG_STAT_REG_X will follow. Follow this format for up to the maximum of 32 Ports. Not all SPAs will have SFPs, unused registers are reserved

7.5 FPGA CSR REGION: SPA Cisco 2 Wire (C2W) Registers

In addition to the Host C2W bus (dedicated back plane C2W bus), the SPA FPGA has the capability of communicating with 256 C2W slave devices per the "portsel" bits (see Section 7.4.3). The SFPs take up the lower 32 port_sel locations (unused port_sel bits are reserved). The Temperature Sensor chip is given the port_sel location = 0xFF (SPALLBIT), and the Digital Potentiometer within the DC/DC Power Converter Circuitry is given the port_sel location 0xFE (SPALLBIT).

The Host C2W bus (dedicated back plane C2W bus) on all of the SPAS is a 100 KHz (maximum frequency) serial "I$^2$C like" bus. Unlike the Host C2W bus which is mastered by the Host, the slave device C2W buses are all mastered by the SPA FPGA. This FPGA bridges SPA bus read and write cycles from the Host into SPA C2W read and write cycles.

The SPA's C2W registers allow two mechanisms for accessing a SPA C2W serial interface from the SPA bus.
- The first, and preferred method, is via a C2W State Machine, which translates posted SPA bus requests into SPA C2W read/write accesses. As a SPA C2W bus master, the FPGA allows transfers of up to 8 bytes of data.
- The second method for accessing a SPA C2W serial interface is to directly control the clock (SCL) and data (SDA) via CSR register bits. This capability is provided for compatibility with legacy software. This method, sometimes referred to as "bit-banging" or "bit-controlled", gives software total control of the serial bus data and clock lines so that it may create SPA C2W bus cycles as desired.

Figure 35 is an example block diagram showing the logic in the SPA FPGA that can be used to implement the SPA C2W buses.

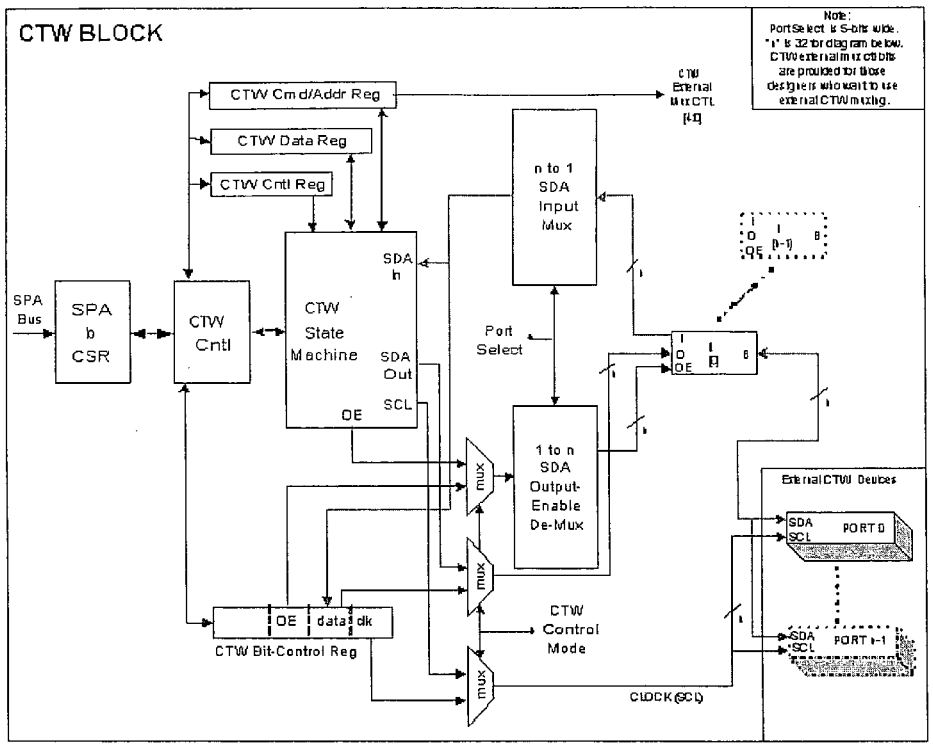

Figure 35: SPA FPGA's SPA C2W Block Diagram

7.5.1 C2W State Machine Interface

C2W state machine access to the devices on a SPA C2W bus is achieved through three SPA registers: a C2W Command Register and two C2W Data Registers. A write to the C2W Command Register initiates a C2W read or write transfer. The two C2W Data Registers, the C2W Data High Register and C2W Data Low Register, combine to form up to an 8-byte data register loaded with write data before a transfer or read data after a transfer.

The C2W state machine can only handle a single posted SPA bus write to the C2W Command Register. When the C2W bus read or write cycle (initiated by a write to the C2W Command Register) completes, a "C2W bus done" bit (bit 31 of the C2W Command Register) transitions from 0 to 1. To determine when the C2W state machine has finished a C2W transfer and another C2W Command Register write can be executed, the Host software can poll this done bit, or a 0 to 1 transition of the done bit can be programmed to interrupt the Host. Note that if the Host software executes a second SPA Bus write to the C2W Command Register while the C2W state machine is still executing a C2W transfer associated with an initial write to the C2W Command Register, it will be ignored and the event can be programmed to interrupt the Host (see Section 7.5.3). If the Host software does not want to poll the "C2W bus done bit" or service a C2W bus done interrupt, there is another alternative. Assuming there is no bandwidth or latency concerns with the SPA bus, the Host software can simply read one of the C2W Data Registers. A SPA bus read cycle of a C2W Data Register will not be completed (i.e. the SPA FPGA will not assert SRdy_L) until the "C2W bus done" bit = 1.

There are two access modes defined for the C2W bus, current-address and random-address. In current-address accesses the register or memory address within the target device is not explicitly specified in the C2W transaction. It is implied to be the address specified by a "current address register" within the device (some devices refer to this as the address pointer register, while in others it is the last address accessed incremented by one). In random-address accesses the register or memory address within the slave device is specified in a sub-address field of the C2W transaction.

When in current_address mode, the SPA FPGA ignores the sub-address field of the C2W command register, and sends out the command (read or write) along with the data using the transfers shown in Table 45 and Table 46. When in random_address mode, the sub-address field is used to tell the C2W device the register or memory address of interest. Random_address mode transfers are shown in Table 47 and Table 48.

In the four figures below, SL_ACK refers to the C2W slave device acknowledging the address or data transfer initiated by the master, MAS_ACK refers to the master acknowledging read data provided by the slave, and no_ack refers to the master not acknowledging the read data from the slave - which is done after the last byte of data is read from the slave to notify the slave that it was the last transfer.

| START | Device Address[6:0] | Write | SL_ACK | DATA[7:0] | SL_ACK | DATA[7:0] | SL_ACK | DATA[7:0] | SL_ACK | DATA[7:0] etc.... | SL_ACK | STOP |

Table 45: Current Address Write Cycle

| START | Device Address[6:0] | Read | SL_ACK | DATA[7:0] | MAS_ACK | DATA[7:0] | MAS_ACK | DATA[7:0] | MAS_ACK | DATA[7:0] etc.... | no_ack | STOP |

Table 46: Current Address Read Cycle

| START | Device Address[6:0] | Write | SL_ACK | Sub-Address[7:0] | SL_ACK | DATA[7:0] | SL_ACK | DATA[7:0] | SL_ACK | DATA[7:0] etc.... | SL_ACK | STOP |

Table 47: Random Address Write Cycle

| START | Device Address[6:0] | Write | SL_ACK | Sub-Address[7:0] | SL_ACK | START | Address[6:0] | Read | SL_ACK | DATA[7:0] | MAS_ACK | DATA[7:0] etc.... | no_ack | STOP |

Table 48: Random Address Read Cycle

The SPA FPGA provides both current_address and random_address modes of C2W accesses.

7.5.2 C2W Bit-Controlled Interface

The SPA FPGA Bit-Controlled C2W interface has a simple hardware implementation, as it places all the responsibility for the C2W protocol onto the Host software. The Bit-Controlled interface can be used in cases where Host software prefers to directly control the C2W interface. Table 49 defines the three bits in the C2W Bit-Controlled Register used to drive and monitor the serial clock (SCL) and serial data (SDA) lines on the C2W buses. Note that the Bit-Controlled Mode bit (bit 16) of the C2W Control Register must be set to "1" before any Bit-Controlled Register writes or reads are executed.

| Bit | Bit-Controlled Interface Definition |
|---|---|
| SCL | Serial CLock line driven thru external buffers to all the C2W devices |
| SDA | Serial DAta line used to send and receive serial data from the C2W interface. If the SDA_OE bit = 1, the data stored in this bit is driven out to the selected C2W bus' SDA line. If the SDA_OE bit = 0, this bit reflects the current state of the external Serial DAta line. |
| SDA_OE | Serial DAta Output Enable controls the C2W tri-state driver output enable. If high, the SPA FPGA drives the selected bus' C2W SDA line. If low, the SPA FPGA tri-states the selected bus' C2W SDA line and stores the value in the SDA bit of this register. Note that this bit ONLY controls the SDA line, not the SCL line (which is always driven by the SPA FPGA if the Bit-Controlled C2W mode is enabled). |

Table 49: C2W Bit-Controlled Interface Bit Definitions

7.5.3 C2W Control Register: C2W_CONTROL_REG

ADDR = 0x00_0400 - 0x00_0403

TYPE = RW

The C2W Control register is used to select the C2W bus used on the SPA as well as the control mode (state machine or bit-controlled). Note that the contents of this register should never be changed while a C2W transfer is taking place, as the results are unpredictable.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Reserved | | | | | | | | | | | | | | | bit_ctl_mode |
| Reset Value | x | x | x | x | x | x | x | x | x | x | x | x | x | x | x | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Reserved | | | | | | | | port_sel | | | | | | | |
| Reset Value | x | x | x | x | x | x | x | x | 0 | 0 | 0 | 0 | 0 | 0 | 0 | 0 |

| Bits | Name | Type | Description |
|---|---|---|---|
| 31:17 | Reserved | SPASPBIT | Reserved for Spa Specific functions. |

| Bits | Name | Type | Description |
|---|---|---|---|
| 16 | bit_ctl_mode | RW SPALLBIT | Mode for accessing the C2W interface, State Machine OR Bit-Controlled<br>0 = State Machine interface<br>1 = Bit-Controlled interface |
| 15:8 | Reserved | SPASPBIT | Reserved for Spa Specific functions. |
| 7:0 | port_sel | RW SPALLBIT | The SPA C2W port select<br><br>0x00 = SFP Port 0<br>0x01 - 0x1F = Reserved for SFP Ports [31:1]<br>0x20 - 0xFD = Reserved for Spa-Specific functions.<br>0xFE = DS1844 Quad Potentiometer<br>0xFF = MAX1668 Temperature Sensor<br><br>Note: Any SFP "port_sel" locations between 0x00-0x1F not needed by the particular SPA are reserved. Any port_sel locations between 0x0A-0xFD are SPASPBIT bits to be used for Spa-Specific functions. |

7.5.4 C2W Command Register: C2W_COMMAND_REG

ADDR = 0x00_0404 - 0x00_0407

TYPE = RW, except bit 31 which is RO

The C2W Command Register is used to initiate a state machine generated C2W read or write transfer on a device specified in the C2W Control Register. When the C2W transfer is completed, the "C2W bus done" bit (bit 31 of this register) is set to "1". If this done bit = 0, indicating that the C2W bus is busy, any additional writes to this register are ignored by the C2W logic and can generate C2W bus busy interrupts to the Host (see Section 7.4.3).

Since the C2W bus does not provide for error reporting or recovery, invalid transfers may produce unpredictable results. If a C2W bus slave does not respond or responds with a "not acknowledge" to an invalid transaction, the SPA FPGA aborts the transaction and can be programmed to generate a C2W Target device Not Responding Interrupt to the Host (see Section 7.4.3).

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | c2w_bus_done | Reserved | oe_dly | | | | | freq_sel_ctr | | | | | | byte_len | | acc_mode |
| Reset Value | - | x | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | sub_adr | | | | | | | | dev_adr | | | | | | | r_w |
| Reset Value | 0 | 0 | 0 | 0 | 0 | 0 | 0 | 0 | 0 | 0 | 0 | 0 | 0 | 0 | 0 | 0 |

| Bits | Name | Type | Description |
|---|---|---|---|
| 31 | c2w_bus_done | RO SPALLBIT | C2W bus transaction Done<br><br>0 = C2W State Machine is busy<br>1 = C2W State Machine is done (0 to 1 transition can be programmed to generate interrupt, see Section 7.4.3). |
| 30 | Reserved | SPASPBIT | Reserved for Spa Specific functions. |
| 29:28 | oe_dly | RW SPALLBIT | Output Enable Delay<br><br>Delays the C2W output enable for the specified number of 20 ns SPA (system) clock cycles after a high to low transition of the C2W serial clock line. |
| 27:20 | freq_sel_ctr | RW SPALLBIT | Frequency Select Counter (FSC)<br><br>Controls a frequency divider circuit which generates the C2W clock from the SPA 50MHz clock.<br>The selected frequency is determined by the following equation:<br><br>$C2W\_Clk_{freq} = SPA\_Clk_{freq} / 2 * (FSC + 1)$<br><br>Sample frequencies assuming a 50 MHz SPA clock:<br>0x03 = 6.25 MHz<br>0x0F = 1.5625 MHz<br>0x40 = 390 KHz<br>0x7F = 195 KHz<br>0xF9 = 100 KHz |
| 19:17 | byte_len | RW SPALLBIT | Byte Length<br><br>Number of Data bytes to transfer (1-8 bytes). Starts at 000 (1 byte) ends at 111(8 bytes)<br>000 = 1 byte transfer<br>001 = 2 byte transfer<br>010 = 3 byte transfer<br>.<br>.<br>.<br>111 = 8 byte transfer<br><br>Data is transferred, one byte at a time, on the C2W bus. The data is written from and read into the C2W_DATA_L and C2W_DATA_H registers. Data serialization starts with the MSB of the appropriate C2W_DATA_x register. For example, for an 8 byte transfer, bits 31:24 of the C2W_DATA_H register is shifted out first, and continues up to bits 7:0 of the C2W_DATA_L register. For a single byte write data is transferred from bits 7:0 of the C2W_DATA_L register.<br>This order is maintained for both reads and writes. |
| 16 | acc_mode | RW SPALLBIT | C2W Access Mode<br>0 = Current Address mode<br>1 = Random Address mode |

| Bits | Name | Type | Description |
|---|---|---|---|
| 15:8 | sub_adr | RW SPALLBIT | C2W Sub-Address<br><br>The C2W sub-address is the internal address of register or memory within the C2W target device. |
| 7:1 | dev_adr | RW SPALLBIT | C2W Device Address<br><br>1010_000 = SFP Transceiver Serial EEPROM<br>1010_001 = SFP Transceiver Digital Diagnostic Monitoring Interface<br>0101_000 = DS1844 Quad Digital Potentiometer<br>0011_000 = MAX1668 Temperature Sensor |
| 0 | r_w | RW SPALLBIT | Read / Write<br>1 = Execute a C2W Read Cycle<br>0 = Execute a C2W Write Cycle |

7.5.5 C2W Data High Register: C2W_DATA_H_REG

ADDR = 0x00_0408 - 0x00_040B

TYPE = RW

The C2W state machine interface supports data transfers of one to eight bytes in length. State Machine data transfers to and from a SPA FPGA mastered C2W bus are done via the C2W Data registers. Write data is serialized out to a C2W bus starting with the most significant data bit of the most significant data byte for a given transfer. The following table summarizes where the data originates for a given transfer size.

| Access Size | Bytes Used |
|---|---|
| 8 | c2w_data[7:0] |
| 16 | c2w_data[15:0] |
| 24 | c2w_data[23:0] |
| 32 | c2w_data[31:0] |
| 40 | c2w_data[39:0] |
| 48 | c2w_data[47:0] |
| 56 | c2w_data[55:0] |
| 64 | c2w_data[63:0] |

Read data is similarly stored in the above registers depending on the transfer size. A SPA bus read of the C2W Data Low Register will not complete (i.e. the SPA FPGA will not assert SRdy_L) until this register contains valid data (i.e. when the "C2W bus done" bit in the C2W Command Register =1). The following register is the high data register and is only used for transfers of 5 bytes or greater.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | c2w_data[63:56] | | | | | | | | c2w_data[55:48] | | | | | | | |
| Reset Value | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | c2w_data[47:40] | | | | | | | | c2w_data[39:32] | | | | | | | |
| Reset Value | 0 | 0 | 0 | 0 | 0 | 0 | 0 | 0 | 0 | 0 | 0 | 0 | 0 | 0 | 0 | 0 |

| Bits | Name | Type | Description |
|------|------|------|-------------|
| 31:0 | c2w_data[63:32] | RW SPALLBIT | Most Significant four bytes of C2W data |

7.5.6 C2W Data Low Register: C2W_DATA_L_REG

ADDR = 0x00_040C - 0x00_040F

TYPE = RW

This is the data low register for C2W transfers.

| Bit | 31 | 30 | 29 | 28 | 27 | 26 | 25 | 24 | 23 | 22 | 21 | 20 | 19 | 18 | 17 | 16 |
|-----|----|----|----|----|----|----|----|----|----|----|----|----|----|----|----|----|
| Name | c2w_data[31:24] | | | | | | | | c2w_data[23:16] | | | | | | | |
| Reset Value | 0 | 0 | 0 | 0 | 0 | 0 | 0 | 0 | 0 | 0 | 0 | 0 | 0 | 0 | 0 | 0 |

| Bit | 15 | 14 | 13 | 12 | 11 | 10 | 9 | 8 | 7 | 6 | 5 | 4 | 3 | 2 | 1 | 0 |
|-----|----|----|----|----|----|----|---|---|---|---|---|---|---|---|---|---|
| Name | c2w_data[15:8] | | | | | | | | c2w_data[7:0] | | | | | | | |
| Reset Value | 0 | 0 | 0 | 0 | 0 | 0 | 0 | 0 | 0 | 0 | 0 | 0 | 0 | 0 | 0 | 0 |

| Bits | Name | Type | Description |
|------|------|------|-------------|
| 31:0 | c2w_data[31:0] | RW SPALLBIT | Least Significant four bytes of the C2W data |

7.5.7 C2W Bit-Controlled Register: C2W_BIT_REG

ADDR = 0x00_0410 - 0x00_0413

TYPE = RW

The C2W Bit-Controlled Register provides the mechanism for software to control a C2W bus directly when in "Bit-Controlled Mode" (i.e. bit 16 of the C2W Control Register =1, see Section 7.5.3). Three bits control the operation of these two wire interfaces: scl (serial clock), sda (serial data), and sda_oe (serial data output enable). If the sda_oe bit is high, the SPA FPGA drives the selected C2W bus' sda line to the state specified by the sda bit. If the sda_oe bit is low, the contents of the sda bit reflects the current state of the selected C2W bus' sda line.

| Bit | 31 | 30 | 29 | 28 | 27 | 26 | 25 | 24 | 23 | 22 | 21 | 20 | 19 | 18 | 17 | 16 |
|-----|----|----|----|----|----|----|----|----|----|----|----|----|----|----|----|----|
| Name | Reserved | | | | | | | | | | | | | | | |
| Reset Value | x | x | x | x | x | x | x | x | x | x | x | x | x | x | x | x |

| Bit | 15 | 14 | 13 | 12 | 11 | 10 | 9 | 8 | 7 | 6 | 5 | 4 | 3 | 2 | 1 | 0 |
|-----|----|----|----|----|----|----|---|---|---|---|---|---|---|---|---|---|
| Name | Reserved | | | | | | | | | | | | | sda_oe | sda | scl |
| Reset Value | x | x | x | x | x | x | x | x | x | x | x | x | x | 0 | 1 | 1 |

| Bits | Name | Type | Description |
|---|---|---|---|
| 31:3 | Reserved | SPASPBIT | Reserved for Spa Specific functions. |
| 2 | sda_oe | RW SPALLBIT | Serial Data Output Enable<br><br>0 = Do not enable the selected C2W bus' sda output driver.<br>1 = Drive the selected C2W bus' serial data line to the state specified by the sda bit (bit 1 of this register). |
| 1 | sda | RW SPALLBIT | Serial Data<br><br>The definition of the sda bit depends on the logic state of sda_oe (bit 2 of this register) and whether this C2W Bit Register is written or read. If sda_oe =1 and this register is written, the selected C2W bus' serial data line is driven by the SPA FPGA to the logic state specified by this sda bit. If sda_oe =0 and this register is written, the logic state of this sda bit doesn't matter because the SPA FPGA does not drive the selected C2W bus' serial data line. If this register is read, this sda bit represents the current logic state of the selected C2W bus' serial data line. |
| 0 | scl | RW SPALLBIT | Serial Clock<br><br>This bit represents the logic state of the selected C2W bus' serial clock line. Note that the SPA FPGA always controls the state of the selected C2W bus' serial clock line, regardless of sda_oe (bit 2 of this register). |

8.0 SPA LEDs

8.1 SPA Status LED

All SPAs must have a common status LED. The status LED will provide visual indication of an SPA being powered on, configured, and ready for access. The standard SPA status LED is a dual yellow/green LED, Dialight 591-3101-0xx, Cisco P/N 25-1029-01. Although Dialight calls this LED Yellow, it is closer to an Amber color that we really want. The color amber is centered near 585 nm.

The states of the status LED are:

OFF: SPA power is off.

AMBER: SPA power is on and good, and SPA is being configured.

GREEN: SPA is ready and operational.

The OFF and AMBER states are controlled via hardware logic on the SPA, while the GREEN state is set via the SPA Status LED control register. See the SPA Standard Registers section for more information. The status LED should be able to revert to earlier states. So if the SPA is in the GREEN state (ready and operational) and it reenters the configuration state, the status LED should return to AMBER.

In order to promote a common look and feel (from a consistent LED drive strength and therefore a consistent LED illumination) the following drive circuit should be used to light the LED. This circuit limits the current to 20mA max when Vf = 1.9V. The Cisco P/N for the 74CBTLV1G125 is 15-5610-01.

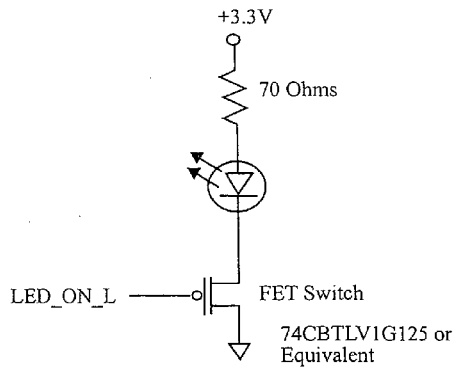

Figure 36: LED Drive Circuit

8.2 SPA Port Status LEDs

To promote commonality among SPAs, port status LEDs must adhere to the following guidelines.

8.2.1 SONET SPA Port LED Requirements

The following are the LED requirements for the POS, ATM (for OCx versions), and ChOC SPAs.

| Function | State | Description | Driven By? | Applicability | Color(s) | Label |
|---|---|---|---|---|---|---|
| Active/ Loopback | Off | Port is not enabled by SW. | SW | Required | Green/ Amber | ? |
| | Solid Green | Port is enabled by SW, loopback is off. | | | | |
| | Solid Amber | Port is enabled by SW, loopback is on. | | | | |
| Carrier/ Alarm | Off | Port is not enabled by SW. | SW | Required | Green/ Amber | ? |
| | Solid Green | Port is enabled by SW, and there is a valid SONET signal without any alarms. | | | | |
| | Solid Amber | Port is enabled by SW, and there is at least one alarm (could be LOS, LOF, RDI etc). | | | | |

Table 50: POS Port LEDs

8.2.2 RPR SPA Port LED Requirements

The following are the LED requirements for the RPR SPAs.

| Function | State | Description | Driven By? | Applicability | Color(s) |
|---|---|---|---|---|---|
| Active/ Loopback | Off | Port is not enabled by SW. | SW | Required | Green/ Amber |
| | Solid Green | Port is enabled by SW, loopback is off. | | | |
| | Solid Amber | Port is enabled by SW, loopback is on. | | | |
| Carrier/ Alarm | Off | Port is not enabled by SW. | SW | Required | Green/ Amber |
| | Solid Green | Port is enabled by SW, and there is a valid SONET signal without any alarms. | | | |
| | Solid Amber | Port is enabled by SW, and there is at least one alarm (could be LOS, LOF, RDI etc). | | | |
| Wrap | Off | Port is not in wrap. | SW | Required | Green/ Amber |
| | Solid Green | Port is in wrap somewhere on the ring. | | | |
| | Solid Amber | Port is in wrap locally. | | | |
| PassThru | Off | Port is not in passthru. | SW | Required | Amber |
| | Solid Amber | Port is in passthru. | | | |
| MateSync | Off | Mate Port has is not synchronized. | HW/ SW over-ride | Optional[a] | Green |
| | Solid Green | Mate Port is synchronized. | | | |

Table 51: RPR Port LEDs a. Only needed if the ring is implemented on two SPAs

8.2.3 Serial SPA Port LED Requirements

The following are the LED requirements for the T1/E1, T3/E3 serial SPAs (including ATM).

| Function | State | Description | Driven By? | Applicability | Color(s) |
|---|---|---|---|---|---|
| Active/ Loopback | Off | Port is not enabled by SW. | SW | Required | Green/ Amber |
| | Solid Green | Port is enabled by SW, loopback is off. | | | |
| | Solid Amber | Port is enabled by SW, loopback is on. | | | |
| Carrier/ Alarm | Off | Port is not enabled by SW. | SW | Required | Green/ Amber |
| | Solid Green | Port is enabled by SW, and there is a valid signal without any alarms. | | | |
| | Solid Amber | Port is enabled by SW, and there is at least one alarm (could be LOS, LOF etc). | | | |

Table 52: Serial Port LEDs

8.2.4 Ethernet SPA Port LED Requirements

The following are the port LED requirements for the all Ethernet SPAs.

| Function | State | Description | Driven By? | Applicability | Color(s) |
|---|---|---|---|---|---|
| Active/Link | Off | Port is not enabled by SW. | SW | Required | Green/ Amber |
| | Solid Green | Port is enabled by SW, and there is a valid ethernet link. | | | |
| | Solid Amber | Port is enabled by SW, and there is problem with the ethernet link. | | | |

Table 53: Ethernet Port LEDs

SPA Generic Hardware Specification EDCS-172353 Rev: 1.0

9.0 Card Detect Logic and Online Insertion/Removal (OIR)

9.1 Overview

SPA implementations support online insertion and removal (OIR), also know as hot-swapping. Support for OIR allows SPA insertion or extraction with power enabled on the host platform. There are no mechanical mechanisms which prevent users from inserting or removing a card, so the electrical systems must be able to contend with these events. Online extraction requires hardware to terminate bus transactions and power the SPA interface down without disruption to an operational system. Online insertion requires SPA hardware to achieve operational status and identify itself to the host system.

SW support for OIR control is required to allow updates to programmable logic (FPGAs etc).

9.2 OIR Level of Isolation

Basically, three levels of hot-swap isolation are described in component data sheets. For each level of OIR isolation, ground must be provided prior to applying voltage to power or SPA signal I/Os. This requirement establishes a common reference between host and SPA modules. Level-1 isolation requires powered off devices to exhibit a high output impedance and block current paths from signal pins to supply rails. ALS, AVC, FAST, and LVC family devices meet level-1 isolation requirements for hot swap. Level-2 hot swap isolation requires device I/Os to maintain a high-impedance state on logic outputs while the supplies ramp either up or down. Level-2 isolated logic families include ABT, ALVT, LCX, LVT, GTL, and GTLP. The third and highest level of hot-swap-logic isolation includes the second-level features and adds pre-bias circuits to charge the I/O pins' stray capacitances, which reduces contact glitching. Logic families supporting level-3 isolation include BTL, ETL, GTLP with precharge, and LVDS.

There are no OIR isolation requirements specific to I/Os on the SPA. It is incumbent on the host to implement SPA OIR functionality. The host must tri-state or drive low all (via hardware) signals which it originates including differential signals. The table below indicates required states during SPA insertion or when PWR_OK is deasserted. Status signals originating from the SPA should be qualified on the host with SPA_DET_B to assure validity of signals.

| Signal Name(s) | Signal Group Group | Driver | Signal Type | SPA OIR Requirements SPA_PWR_OK= 1'b0 |
|---|---|---|---|---|
| TDCLK_P/N | SPI4.2 | HOST | LVDS | OIR Level not required. Host Drives Hi-Z or Low |
| TDAT[15:0]_P/N | SPI4.2 | HOST | LVDS | OIR Level not required. Host Drives Hi-Z or Low |
| TCTL_P/N | SPI4.2 | HOST | LVDS | OIR Level not required. Host Drives Hi-Z or Low |
| TSCLK_P/N | SPI4.2 | SPA | LVDS | OIR Level not required |
| TSTAT[1:0]_P/N | SPI4.2 | SPA | LVDS | OIR Level not required. |
| RDCLK_P/N | SPI4.2 | SPA | LVDS | OIR Level not required. |
| RDAT[15:0]_P/N | SPI4.2 | SPA | LVDS | OIR Level not required. |
| RCTL_P/N | SPI4.2 | SPA | LVDS | OIR Level not required. |
| RSCLK_P/N | SPI4.2 | HOST | LVDS | OIR Level not required. Host Drives Hi-Z or Low |
| RSTAT[1:0]_P/N | SPI4.2 | HOST | LVDS | OIR Level not required. Host Drives Hi-Z or Low |
| SCLK | C2W | HOST | OD 3.3V Pulled to AUX_PWR | OIR Level not required Host drives Hi-Z or Low |
| SDATA | C2W | HOST/ SPA | OD 3.3V Pulled to AUX_PWR | OIR Level not required Host drives Hi-Z or Low |

Table 54: OIR Requirements

A printed version of this document is an uncontrolled copy.

| Signal Name(s) | Signal Group Group | Driver | Signal Type | SPA OIR Requirements SPA_PWR_OK= 1'b0 |
|---|---|---|---|---|
| BCLK | SPA-BUS | HOST | 2.5V LVCMOS | OIR Level not required. Host Drives Hi-Z or Low |
| VALID_L | SPA-BUS | HOST | 2.5V LVCMOS | OIR Level not required. Host Drives Hi-Z or Low |
| SRDY_L | SPA-BUS | SPA | 2.5V LVCMOS | OIR Level not required. Pulled High on host |
| AD[7:0] | SPA-BUS | HOST/ SPA | 2.5V LVCMOS | OIR Level not required. Host drives Hi-Z or Low |
| PAR | SPA-BUS | HOST/ SPA | 2.5V LVCMOS | OIR Level not required. Host drives Hi-Z or Low |
| ERR_L | SPA-BUS | HOST/ SPA | 2.5V LVCMOS | OIR Level not required. Pulled high on host |
| INT_L | SPA-BUS | SPA | 2.5V LVCMOS | OIR Level not required. Pulled High on host |
| RESET_L | SPA-BUS/OIR | HOST | 2.5V LVCMOS | OIR Level not required. Host drives Low |
| SPA_DET_A | OIR | HOST | GND | NA |
| SPA_DET_B | OIR | HOST | 3.3V | NA |
| PWR_OK | OIR | SPA | 3.3V LVTTL | SPA drives low Pulled low on host |
| PWR_ENA | OIR | HOST | 3.3V LVTTL | OIR Level not Required. Host drives Low |
| SPA_OK | OIR | SPA | 3.3V LVTTL | OIR Level not Required. Pulled Low on host |
| SPI4REF_P/N | SPI4.2 | HOST | PECL | AC coupled on Host. Host must drive to a DC level or tristate this signal. |
| FCCLK | EFC | SPA | 2.5 LVCMOS | OIR Level not Required. |
| FCSTAT | EFC | SPA | 2.5 LVCMOS | OIR Level not Required. Pulled Low on host |
| FCFRM_L | EFC | SPA | 2.5 LVCMOS | OIR Level not Required. Pulled High on host |
| FCPAR | EFC | SPA | 2.5 LVCMOS | OIR Level not Required. |
| TRST_L | JTAG | HOST | 3.3V LVTTL | OIR Level not Required. Host drives Hi-Z or Low |
| TDI | JTAG | HOST | 3.3V LVTTL | OIR Level not Required. Host drives Hi-Z or Low |
| TDO | JTAG | SPA | 3.3V LVTTL | OIR Level not Required. |
| TMS | JTAG | HOST | 3.3V LVTTL | OIR Level not Required. Host drives Hi-Z or Low |
| TCLK | JTAG | HOST | 3.3V LVTTL | OIR Level not Required. Host drives Hi-Z or Low |
| SONREF_P/N | SONREF | HOST | PECL | AC coupled on Host. Host must drive to a DC level or tristate this signal. |
| RXREF | SONREF | SPA | 3.3V LVTTL | OIR Level not Required. |

Table 54: OIR Requirements

9.3 Connector Contact Sequence

Ground, power, signal and presence detect sequencing are integral to providing OIR capability. When the host and SPA establish contact through their respective edge connectors, staggered lengths of the contact pins control the contact sequence. There are four levels of contact sequencing built into the SPA connector. The 1st mate is also the 4th break, the 2nd mate is the 3rd break etc.

1st Mate: the connector guide pins and connector shell which are signal ground

2nd Mate: this provides +12V return path

3rd Mate: these are ordinary signal contacts and provide the +12V power contacts 4th Mate: these provide the SPA presence detection.

9.4 OIR Logical Block Diagrams and Signal Description

Figure 37 and Figure 38 below outline board interconnects, termination, and functional blocks for single and double wide SPAs. The OIR logic on both types of SPAs are common with the differences being in routing of the OIR signals.

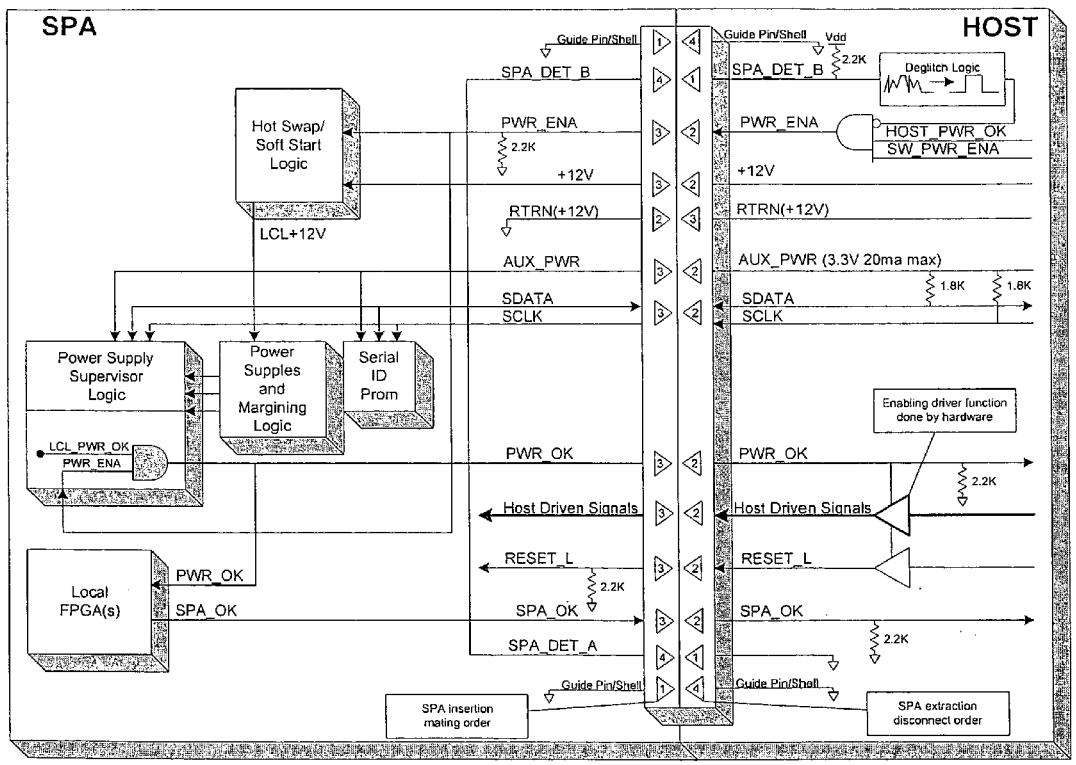

Figure 37: Single Wide SPA OIR Logical Block Diagram

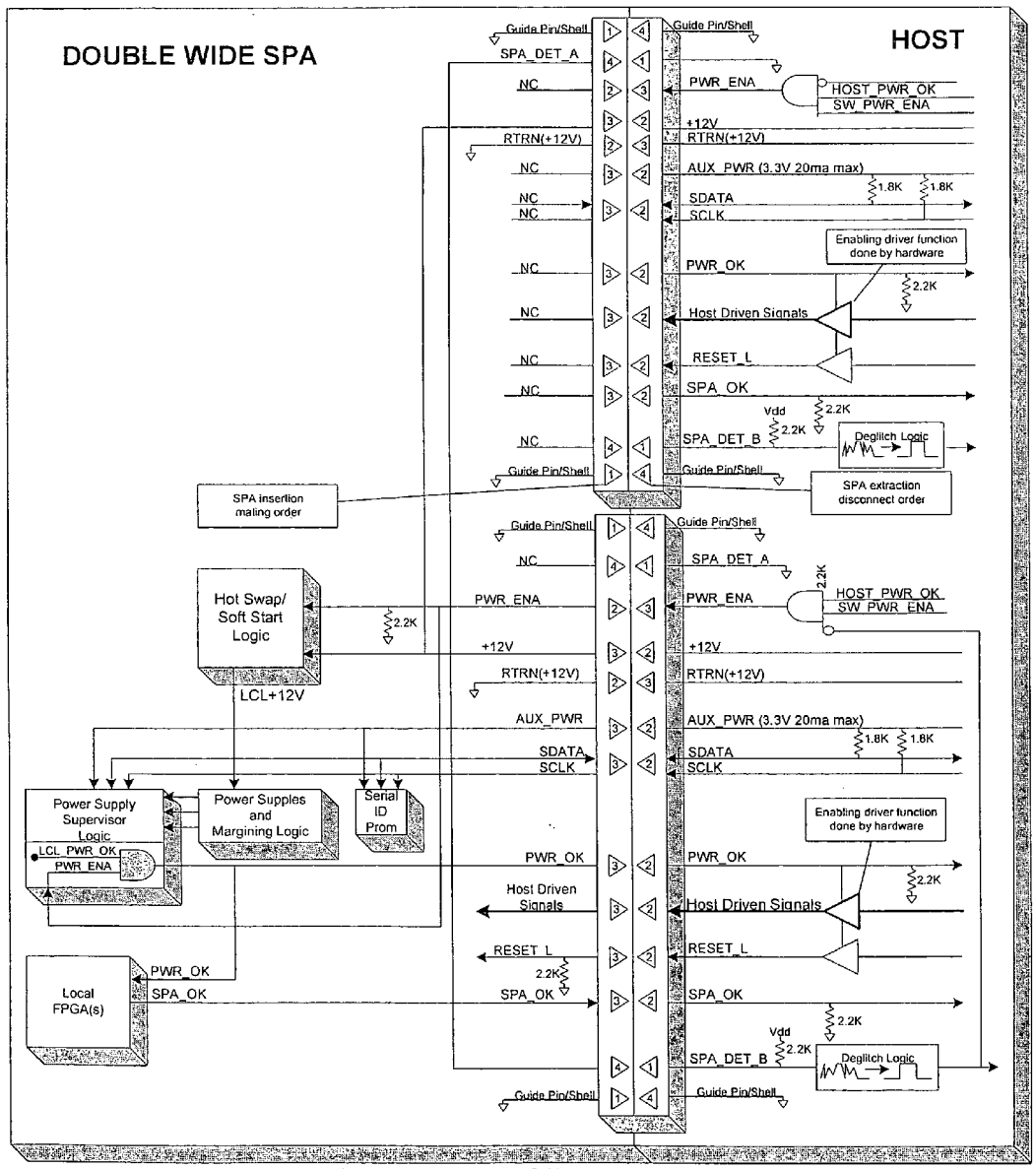
Figure 38: Double Wide SPA OIR Logical Block Diagram

Table 55 below describes the OIR interface signals.

| Name | Pin Length | Description |
| --- | --- | --- |
| GND | 1st Mate | Guide pins located near the ends of the connector and the connector shell are all signal ground and mate first. |
| RTRN(+12v) | 2nd Mate | Return path for +12 volts. (Typically connected to digital ground on SPA) |
| SPA_DET_A | 4th Mate | This Ground from the host module and used for signaling presence detect. |
| RESET_L | 3rd Mate | This signal is provided by the host and is asserted low whenever the host resets the SPA or when PWR_OK is deasserted |
| PWR_OK | 3rd Mate | This signal is the result of "AND"ing the PWR_ENA and LCL_PWR_OK. It can be used to indicate SPA insertion or extraction. |
| SPA_OK | 3rd Mate | SPA_OK is the SPA general purpose interrupt. Upon powerup it is used to signal the host that a SPA has been initialized and is ready for communication. |
| SPA_DET_B | 4th Mate | Ground from Host is looped on the SPA from SPA_DET_A to SPA_DET_B for signaling the host that a SPA has been correctly inserted. |
| PWR_ENA | 3rd Mate | This signal is driven by the host and is used to turn on local supply voltages on the SPA. |
| AUX_PWR | 3rd Mate | The host provides +3.3V for powering the ID EEPROM and power monitor logic. |

Table 55: OIR Related Control Signals

SPA Generic Hardware Specification EDCS-172353 Rev: 1.0

9.5 OIR Insertion Sequence of Events

Figure 39 outlines an on-line insertion event.

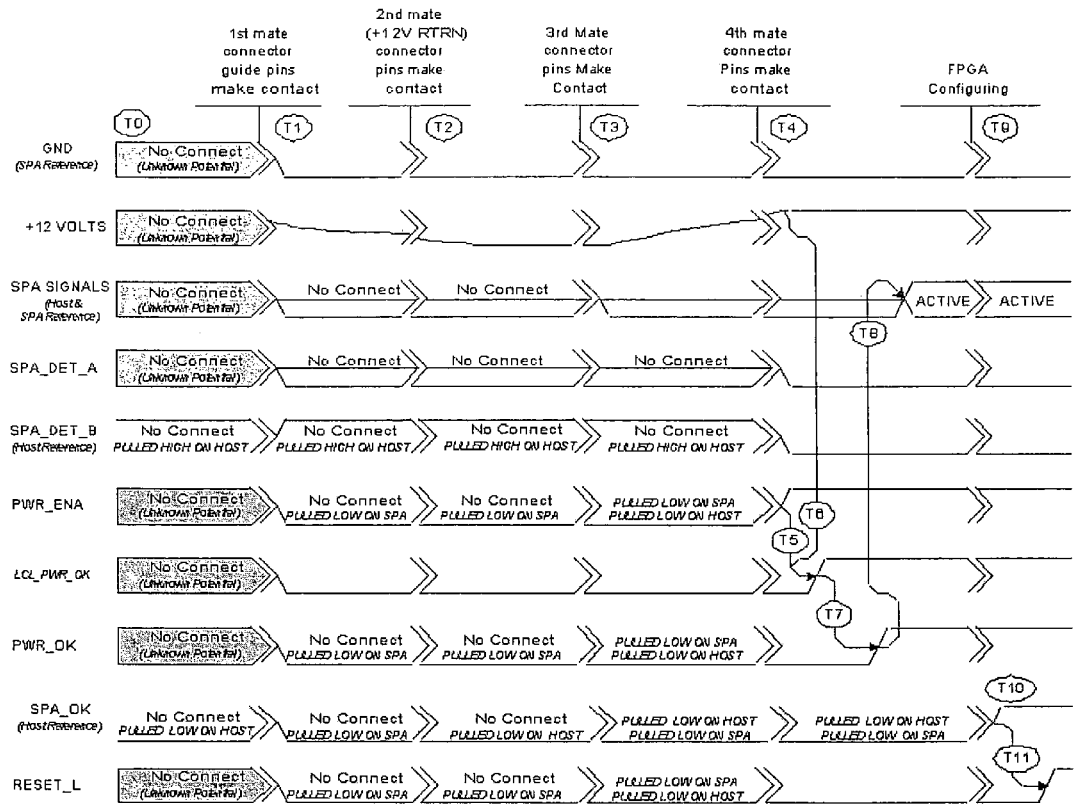

Figure 39: Online Insertion Sequence of Events

At T0: This is the time prior to insertion into a powered (hot) system. It is provided to illustrate initial conditions on the host and SPA. Under No Connect conditions, ground and signal potentials can be at levels other than those of the host. This is illustrated by High/Low shaded areas on the diagram.

At T1: First mate connector pins on the SPA connector connect grounds between the host and SPA. Connecting grounds first dissipates electrostatic charges and establishes a common reference prior to applying power.

At T2: Second mate connector pins on the SPA connector connect +12 volt return (RTRN) reinforcing ground connections with the host.

At T3: Third mate connector pins on the SPA connector connect general signals and +12 Volts between the host and SPA. As the SPA +12 Volts begins to ramp up, both host and SPA general signal drivers must be high-Z or low. SPA_DET_A and SPA_DET_B have not yet made contact therefore, keeping PWR_ENA disabled.

At T4: Fourth mate connector pins on the SPA connector connect to SPA_DET_A and SPA_DET_B signals. SPA_DET_A is ground sourced from the host and is looped back to SPA_DET_B which is pulled high on the host. On the host, SPA_DET_B can be used to determine that a SPA has been inserted into a system. This SPA detection mechanism is operational regardless of whether +12 Volts has been applied to the SPA.

At T5: The SPA_DET_B is deglitched and looped back on the host board to generate PWR_ENA. The host module should qualify SPA_DET_B with HOST_PWR_OK and a software controlled SW_PWR_ENA to generate PWR_ENA.

At T6: If +12 Volts on the SPA is within specifications, PWR_ENA is true, and the local power supplies are within specifications, LOCAL_PWR_OK is asserted true.

At T7: PWR_OK is asserted true when LOCAL_PWR_OK and PWR_ENA are asserted true as well. This function is represented by the "AND" gate on the OIR logical block diagrams and could be built into the voltage supervisor (and therefore LOCAL_PWR_OK may not be a named signal on a SPA). From the time the SPA is inserted, until PWR_OK is asserted must be <= 1 second.

At T8: PWR_OK is the signal used to enable drivers previously in a Hi-Z or Low state on the host or in a Hi-Z state on the SPA.

At T9: Sometime after Local_Power_OK is asserted, FPGA configuration occurs. At this time FPGA signals are in tri-stated condition and the SPA_OK signal is pulled low.

At T10: The FPGA configuration successfully completes and drives the SPA_OK signal high thereby alerting the host that a SPA has been inserted and initialized. From the time that PWR_OK until the time that SPA_OK is asserted must be < 1 second under normal conditions.

At T11: The host removes RESET_L and begins communication with the SPA.

SPA Generic Hardware Specification EDCS-172353 Rev: 1.0

9.6 OIR Extraction Sequence of Events

Figure 40 outlines on-line extraction sequence of events.

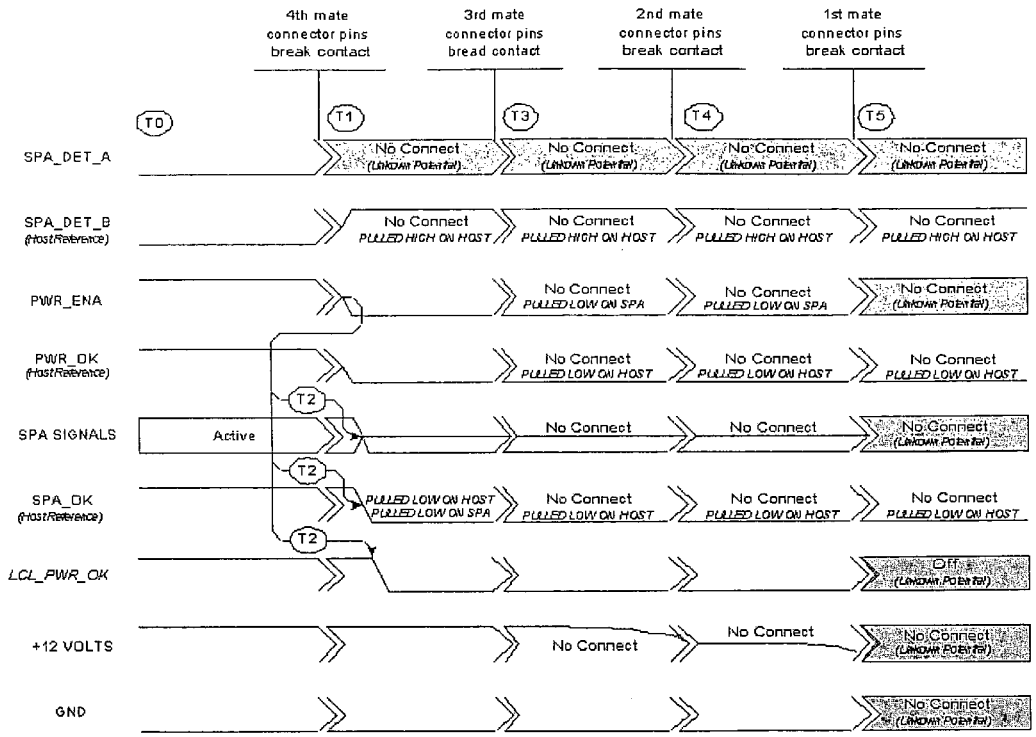

Figure 40: Online Extraction Sequence of Events

At T0: This is the time prior to extraction from a powered (hot) system. It is provided to illustrate initial conditions on the host and SPA.

At T1: Fourth mate pins on the SPA connector break connection between the host and SPA. The short length pins disconnect SPA_DET_A from Ground on the host and SPA_DET_B from the host. Therefore, a high on SPA_DET_B on the host side indicates that a SPA module is incorrectly seated. By looping SPA_DET_B back to PWR_ENA via deglitching logic, PWR_ENA goes low on SPA and host, thereby, disabling the local power supplies.

At T2: PWR_ENA brings PWR_OK low. PWR OK is used to drive SPA_SIGNALS into a low or Hi-Z condition on the host and Hi-Z condition on the PWR_ENA also drives the SPA_OK into a Hi-Z state which is pulled down on the host. Local power supplies are turned off and LOCAL_PWR_OK deasserts to a logic low.

SPA Generic Hardware Specification EDCS-172353 Rev: 1.0

At T3: Third mate connector pins break contact. +12 Volts and signal pins are disconnected from the HOST. At this time, OIR signals on the host are being pulled to their respective levels by resistors and drivers on the host.

At T4: Second Mate length pins break contact and +12V RTRN is disconnected from the HOST.

At T5: First Mate connector guide pins break contact and ground is disconnected from the HOST. All voltages migrate to unknown levels due to lack of reference.

10.0 SPA Regulatory Compliance

The SPA's Regulatory requirements are detailed in the SPA generic PRD, EDCS-157122.

11.0 References

1. System Packet Interface Level 4 (SPI-4) Phase 2: OC-192 System Interface for Physical and Link Layer Devices. Physical Link Layer working group of the OIF, January 2001.

2. ANSI/TIA/EIA-644-A-2001, Electrical Characteristics of Low Voltage Differential Signalling (LVDS) Circuits, February 2001.

3. Generic Shared Port Adapter Product Requirements Document, Andrew Vaz, 4/12/2002, EDCS-157122.

4. EIA/JEDEC Standard JESD8-5, October 1995.

5. EIA/JEDEC Standard JESD8-B, September 1999.

6. SPA ID EEPROM Format, Breene Yuen, EDCS-177029.

7. SPA Mechanical Specification, EDCS-207303.

SPA Generic Hardware Specification EDCS-172353 Rev: 1.0

APPENDIX A  SPI4.2 FIFO Requirements and Notes

A.1  Calendar Entries

This section is designed to give guidelines to SPA and Host designers in the area of the SPI4.2 calendar configurations. The trivial case is a SPA that has n number of channels and all channels have identical bandwidths (a 10x1GE SPA is an example). In this case the SPA and host should have SPI4.2 calendar lengths (CALENDAR_LEN) = n. So from power up time on, even if only one channel is enabled and operational at first, the calendar has n entries. Entries in the table would be marked valid or invalid depending on the state of the interface/channel that is associated with the SPI-4.2 channel.

The following case depicts a more complicated example, an OC12 POS card that can also be channelized to OC3s. The tables gives recommended calendar configurations for this card. This will enable a host to schedule traffic based on the calendar table entries (as Bluenose is doing) and it allows dynamic reconfigurations without affecting already active channels. In this example CALENDAR_LEN = 16 always. Note that the OC12 channels have multiple entries in the table and that multiple entries for the same channel are spaced out in the table.

| Calendar Entry | 4xOC12 Mode | 4xOC3 + 3xOC12 Mode | 16xOC3 Mode |
|---|---|---|---|
| 1 | OC12#1 | OC3#1.1 | OC3#1.1 |
| 2 | OC12#2 | OC12#2 | OC3#2.1 |
| 3 | OC12#3 | OC12#3 | OC3#3.1 |
| 4 | OC12#4 | OC12#4 | OC3#4.1 |
| 5 | OC12#1 | OC3#1.2 | OC3#1.2 |
| 6 | OC12#2 | OC12#2 | OC3#2.2 |
| 7 | OC12#3 | OC12#3 | OC3#3.2 |
| 8 | OC12#4 | OC12#4 | OC3#4.2 |
| 9 | OC12#1 | OC3#1.3 | OC3#1.3 |
| 10 | OC12#2 | OC12#2 | OC3#2.3 |
| 11 | OC12#3 | OC12#3 | OC3#3.3 |
| 12 | OC12#4 | OC12#4 | OC3#4.3 |
| 13 | OC12#1 | OC3#1.4 | OC3#1.4 |
| 14 | OC12#2 | OC12#2 | OC3#2.4 |
| 15 | OC12#3 | OC12#3 | OC3#3.4 |
| 16 | OC12#4 | OC12#4 | OC3#4.4 |

The following case depicts a more complicated example, an OC192 channelized card that can be channelized from 1xOC192, 4xOC48, 16xOC12, 64xOC3 or 192xDS3 or any valid combination of these channels. The tables gives recommended calendar configurations for this card. This will enable A printed version of this document is an uncontrolled copy.

© 2002 Cisco Systems, Inc.                                                                                                                  Company Confidential a host to schedule traffic based on the calendar table entries (as Bluenose is doing) and it allow dynamic reconfigurations without affecting already active channels. In this example

| Calendar Entry | 1xOC192 Mode | 3xOC48 + 4xOC12 | 192xDS3 Mode | 1xOC48 + 4xOC12 + 16xOC3 + 48xDS3 |
|---|---|---|---|---|
| 1 | OC192 | OC48#1 | DS3#1 | OC48#1 |
| 2 | OC192 | OC48#2 | DS3#2 | OC12#2.1 |
| 3 | OC192 | OC48#3 | DS3#3 | OC3#3.1.1 |
| 4 | OC192 | OC12#4.1 | DS3#4 | DS3#4.1.1.1 |
| 5 | OC192 | OC48#1 | DS3#5 | OC48#1 |
| 6 | OC192 | OC48#2 | DS3#6 | OC12#2.2 |
| 7 | OC192 | OC48#3 | DS3#7 | OC3#3.1.2 |
| 8 | OC192 | OC12#4.2 | DS3#8 | DS3#4.1.1.2 |
| 9 | OC192 | OC48#1 | DS3#9 | OC48#1 |
| 10 | OC192 | OC48#2 | DS3#10 | OC12#2.3 |
| 11 | OC192 | OC48#3 | DS3#11 | OC3#3.1.3 |
| 12 | OC192 | OC12#4.3 | DS3#12 | DS3#4.1.1.3 |
| 13 | OC192 | OC48#1 | DS3#13 | OC48#1 |
| 14 | OC192 | OC48#2 | DS3#14 | OC12#2.4 |
| 15 | OC192 | OC48#3 | DS3#15 | OC3#3.1.4 |
| 16 | OC192 | OC12#4.4 | DS3#16 | DS3#4.1.2.1 |
| . | . | . | . | . |
| 191 | OC192 | OC48#3 | DS3#191 | OC3#3.4.4 |
| 192 | OC192 | OC12#4.4 | DS3#192 | DS3#4.4.4.3 |

CALENDAR_LEN = 192 always.

Appendix G of the SPI4.2 standard introduces the concept of a shadow and active calender to allow hitless reprovisioning. But if the previous calendar configurations are followed hitless reprovisioning can be done without the need of Appendix G support. This is possible through static sizing of the calendar, the concept that the number of entries in the calendar being proportional to the bandwidth of the channels, and the ability to mark entries as valid or invalid as channels are brought up or down.

A.2 Lmax Contribution Calculations

Lmax is the latency that is inherent in the SPI-4.2 flow control mechanism. In general there are 3 sources of latency that contribute to Lmax.

1) is the sinks latency, this is due to data that may be internal to the sink and on the way to a channel FIFO when the sink signals that it has changed FIFO status.

2) is the latency of the FIFO status bus, this is simply = (# channel status + 1 framing + 1 DIP-2) * 87.5 Mhz cycle. This can be expressed in bytes or time.

3) is the latency of the source. This is the data that is already destined for a particular channel once the source is notified of a FIFO status change. This may vary depending on the # of channels that the source is servicing.

The following picture presents a generic picture of a possible sink and source to illustrate where the Lmax contributions can originate.

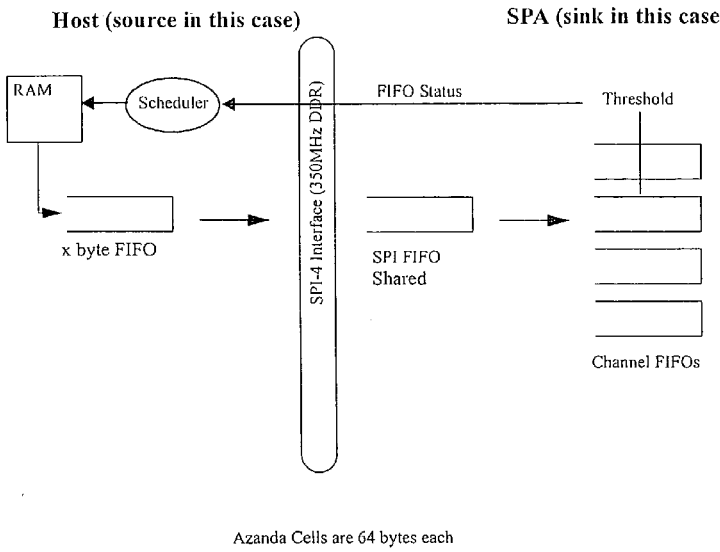

Azanda Cells are 64 bytes each

Figure 41: Lmax Contributions

A.3 Ethernet FIFO Requirements to Support IEEE 802.3x Flow Control

A.3.1 IEEE 802.3x Flow Control Background

An Ethernet node with a full duplex connection to a far end Ethernet node can back pressure that far end node by transmitting IEEE 802.3x Pause Frames. A Pause Frame is a control frame specifying a timeout interval during which no data should be transmitted. The maximum interval that can be specified is 33,553,920 bit times (about 33.5 ms for Gigabit Ethernet). If a longer interval is required, another Pause Frame must be sent before the first timeout interval expires. The minimum timeout interval specified in a Pause Frame is 0 bit times (a.k.a. a Resume Frame). Any remaining timeout interval is canceled when a Resume Frame is processed.

A.3.2 Ingress Buffering Problem

There are two potential problems with IEEE 802.3x flow control if ingress buffering is inadequate.
- Overrun - Following the generation of a Pause Frame, an Ethernet port needs enough ingress buffering to receive all Ethernet frames sent from a far-end stations until that far end station stops transmitting. If ingress buffering is insufficient, frames will be dropped.

- Underrun - Following the generation of a Resume Frame, an Ethernet port will run out of ingress packets unless it has an ingress buffer large enough to keep feeding the SPI-4.2 bus until frames from the far-end station arrive again. If ingress buffering is insufficient, the SPI-4.2 bus and Ethernet link could be under utilized. Note that this problem of under utilization is typically not as serious as dropping frames.

Some of the Ethernet SPAs being developed require support for multiple ports, Jumbo Frames (e.g. Ethernet Frames up to 10K bytes in length), and long reach interconnects as well as IEEE 802.3x flow control. This combination of features results in very large ingress memory buffer requirements on an Ethernet MAC chip.

For example, the Avatar 10 port Gigabit Ethernet SPA (which also supports transmission of contiguous frames over the SPI-4.2 bus) requires about 142,000 bytes of ingress buffering per port to prevent overrun (i.e. dropped frames) on an 80 km flow controlled link. Even more buffering is required to prevent underrun conditions (e.g. having no data to transfer over the SPI-4.2 bus while waiting for a Resume Frame to produce more ingress data).

Unfortunately, it is not currently feasible to build Ethernet MAC devices with this much on-chip memory per port. Adding additional external memory and associated control logic (e.g. in an FPGA) to this roughly 6 inch by 5.5 inch SPA printed circuit board also has questionable feasibility and cost effectiveness.

A.3.3 Host Options

There are several approaches a SPA Host can take to deal with potential ingress data overrun problems when IEEE 802.3x Flow Control is used on an Ethernet SPA.

- Take ingress data at full SPI-4.2 rates. Since none of the Ethernet SPA modules oversubscribe the SPI-4.2 bus interface (running at 350 MHz DDR), having the host receive ingress data at full SPI-4.2 data rates will prevent a back pressure situation causing Pause Frames to be generated. The implication is that the host will have to drop frames when it is congested (e.g. using a RED algorithm) to prevent back pressure on the SPI-4.2 bus.

- Don't support Jumbo Frames on long reach links unless performance degradation (such as frame loss) is acceptable. There is enough MAC chip ingress buffering to support Jumbo Frames on shorter reach links. For example, the Avatar SPA can support Jumbo Frames on links up to 7 km without overrun. Alternatively, MAC chip ingress buffers can support longer reach links when only normal Ethernet frames (with a maximum length of 1518 bytes) are used. For example, the Avatar SPA can support links up to 33 km without overrun using only normal Ethernet frames up to 1518 bytes in length.

- Have the host determine when Pause Frames should be generated. The idea is to use the ingress buffers on the host (in which an Ethernet SPA plugs into) as an extension of the ingress buffers on the SPA. Normally an Ethernet MAC chip generates Pause Frames after it sees SPI-4.2 back pressure that causes it's on-chip ingress buffer to fill beyond a predetermined threshold. This SPI-4.2 back pressure occurs because host buffers fill up when the host itself sees back pressure. So if we can generate a Pause Frame early, i.e. when host ingress buffers fill beyond a predetermined threshold, we can utilize buffers on both the MAC chip and the host to prevent a flow control overrun condition. MAC chips typically provide a sideband connection (an input per port or a serial bus for a large number of ports) to allow external control of Pause Frame generation. Some MAC chips (e.g. Marvell's GT-82119) provide inband control using SPI-4.2 receive status such that receiving HUNGRY status initiates the generation of Pause Frames.

- Have host accept enough SPI-4.2 data from SPA to prevent flow control overrun. In effect, the host slows the fill rate of a MAC chip ingress buffer by simultaneously draining it (via SPI-4.2) at a rate that prevents frame drops. The minimum drain rate for each port would be a function of the link length. Implementing this scheme over a large number of ports could get very complicated.

A.3.4 Avatar 10 Port by 1 Gigabit Ethernet FIFO Sizing Requirements

The following results come from an IEEE 802.3x flow control ingress buffer analysis for the Avatar SPA (10 ports of 1 Gigabit Ethernet). The analysis itself is documented in the Avatar SPA Hardware Functional Specification (EDCS-tbd). This analysis assumes many worst case conditions including long reach fiber optic links of 80 km and the SPA receiving nothing but 10K byte Jumbo Frames on all ports. Note that the Avatar SPA is somewhat unique in that it supports ingress transfers of contiguous (i.e. non interleaved) frames over its SPI-4.2 bus interface. This contiguous frame feature also adds to ingress buffering requirements because we must buffer an entire frame before transferring it over the SPI-4.2 bus (i.e. store and forward architecture) and we never want to generate Pause Frames when there is no SPI-4.2 bus back pressure from the host.

The result of this analysis is that the Avatar SPA needs approximately 142,000 bytes of Ingress FIFO buffering per port (100,000 bytes of which are a function of the 80 km line length) just to avoid overrun. Ignoring potential underrun conditions, the Ingress FIFO requirement per port are shown in Figure 42. The 20,000 byte threshold is a function of all ports receiving Jumbo Frames and contiguous frames being transferred over the SPI-4.2 bus. Note that the threshold above which we generate a Pause Frame is the same threshold below which we generate a Resume Frame (20,000 bytes). In this particular analysis we don't have to worry about adding hysteresis (to prevent the Ethernet port from quickly toggling back and forth between sending Resume Frames and sending Pause Frames) because the delay between sending a Resume Frame and actually receiving more data from the far-end station (80 km away) is fairly long. If the link were short, we would have to add hysteresis by setting the Resume Frame threshold below the Pause Frame threshold.

SPA Generic Hardware Specification EDCS-172353 Rev: 1.0

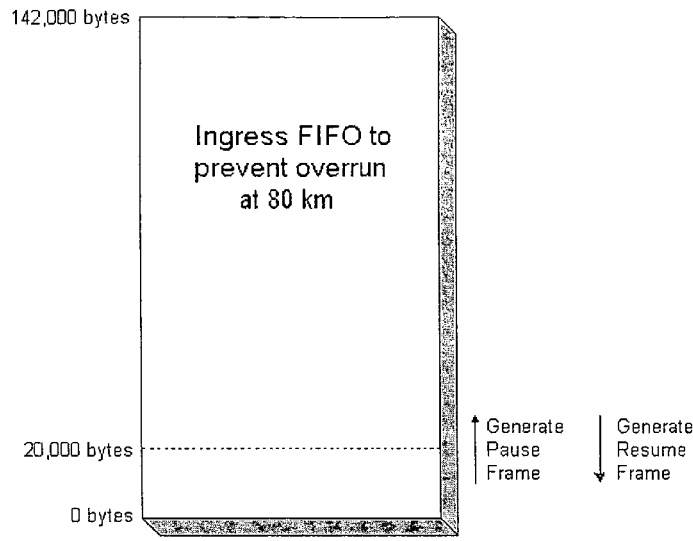

Figure 42: GE per port Ingress FIFO to prevent Overrun on 80 km links

To prevent an underrun condition as previously defined (i.e. keep the SPI-4.2 bus and Ethernet link running at maximum utilization) on this 10 port by 1 Gigabit Ethernet SPA, we need an additional 122,000 bytes of ingress buffering. As with the overrun analysis, 100,000 bytes of this 122,000 byte total are a function of the 80 km link distance. And 20,000 bytes of this 122,000 byte total are a function of Jumbo Frames coming in on all ports as well as support for contiguous frame transfers over the SPI-4.2 bus.

Figure 43 shows a 244,000 byte Ingress FIFO that would be required per port to prevent both overrun and underrun conditions. Like the Ingress FIFO shown in Figure 42, the threshold above which we generate a Pause Frame can be the same threshold below which we generate a Resume Frame (122,000 bytes) because the link is long. For short links the Resume Frame threshold would have to be set below the Pause Frame threshold to add hysteresis.

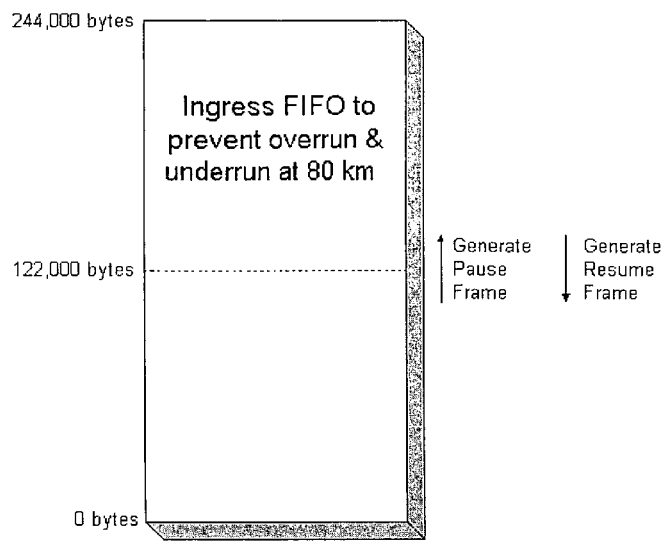

Figure 43: Per port Ingress FIFO to prevent Overrun & Underrun on 80 km link

A.4 ChOC192 FIFO Requirement

It is currently planned to support a SPA that has 192 channels. This SPA would use the Barracuda ASIC. When this device is channelized to 192 DS3 channels, there is a 512 byte FIFO per channel. This is pretty shallow and will require that the host respond quickly to flow control status changes.

The following might be appropriate fifo status levels depending on the host, other configurations are possible:
- Starving-Hungry level    192 bytes
- Hungry-Satisfied level   256 bytes
- Cut-through level        128 bytes
- Burst size               64 bytes
- Maxburst2 and Maxburst1  64 bytes The equation for avoiding a fifo overflow is:

AlmostFull + Maxburst2 + Lmax + $\varepsilon$ < Full so

256 + 64 + Lmax + 64 < 512

Lmax must therefore be < 128 bytes or close to 2 bursts.

To avoid FIFO underflow the equation is:

AlmostEmpty > Lmax + $\varepsilon$ + Empty so

192 > Lmax + 64 + 0

Lmax must therefore be < 128 bytes or close to 2 bursts.

APPENDIX B  SPA Compliance Checklist

This compliance checklist must be part of each SPA's Hardware Functional Specification. This will enable host teams at a glance to determine the capabilities of the SPA.

| Interface | Parameter | Required Support/Value | What does this SPA support? |
|---|---|---|---|
| General | SPA Type | HH, FH, DP or DW | |
| SPI4.2 | SPI-4.2 Bus Speed | 350MHz or 87.5MHz or both | |
| SPI4.2 | Clock jitter at reference point A | For 350MHz operation must be <= 0.1UIpp | |
| SPI4.2 | Data jitter at reference point A | For 350MHz operation must be <= 0.24UIpp | |
| SPI4.2 | Timing budget after reference B | For 350MHz operation must be <= 0.375UIpp | |
| SPI4.2 | Data jitter at reference point A | For 87.5MHz operation must be <=? | |
| SPI4.2 | Timing budget after reference B | For 87.5MHz operation must be <=? | |
| SPI4.2 | FIFO status mode | LVDS but at 1/8 the data rate (LVTTL rate) | |
| SPI4.2 | Maxburst1 for the SPA | Support a setting to at least one value in the range from 16 - 512 bytes. | |
| SPI4.2 | Maxburst2 for the SPA | Support a setting to at least one value in the range from 16 - 512 bytes. | |
| SPI4.2 | What is the ingress burst size, is it programmable? If yes what is the range? | No requirement. | |
| SPI4.2 | $\alpha$ | Programmable from 1 to 16 repetitions | |
| SPI4.2 | DATA_MAX_T | Programmable from 1000 to 10000 cycles | |
| SPI4.2 | Lmax contribution for the source (for ingress) | No requirement. | |
| SPI4.2 | Lmax contribution for the sink (for egress) | No requirement. | |
| SPI4.2 | Per channel fifo size for sink (for egress) | No requirement. | |
| SPI4.2 | # Ingress SPI-4.2 channels used | No requirement. | |
| SPI4.2 | # Egress SPI-4.2 channels used | No requirement. | |
| SPI4.2 | LVDS signalling | As given in Table 56 | |
| SPI4.2 | Packet format | Format A, B, C or D | |
| SPI4.2 | Are egress channels store and forward or cut through | No requirement. | |
| SPI4.2 | Are packets interleaved on ingress (via SPI-4.2 chunks)? | No requirement. | |
| SPA Bus | Data sizes supported | 8, 16, and 32 bits can be used | |
| SPA Bus | Timing | tsu min = 4.0ns, thld min = 0ns, tco min = 1ns, max = 4ns | |
| Ext FC | Is it supported? | This is required for SPA with > 256 channels. | |

| Interface | Parameter | Required Support/Value | What does this SPA support? |
|---|---|---|---|
| Ext FC | How many channels? | <= 8k. | |
| Ext FC | Timing | tsu/hld min = 7ns | |
| Power | Maximum power dissipation | Depends on SPA type (20W for HH, 25W for FH, 40W for HP, 50W for DW) | |
| Power | Margining capability | +/- 5% is desirable, +/- 3% is required. | |
| Power | OIR timing | Insertion to PWR_OK asserted <= 1 second | |
| Power | OIR timing | PWR_OK to SPA_OK asserted <= 1 second | |
| Misc | What is the maximum MTU size handled by this SPA. | No requirement. | |
| Misc | Provide a mapping of any channels/links/ports to SPI4.2 channels. | No requirement | |
| Misc | JTAG clock rate | Must support a minimum clock rate of 1MHz. | |

APPENDIX C  Host Compliance Check List

This compliance checklist must be part of each Host's Hardware Functional Specification. This will enable SPA teams at a glance to determine the capabilities of the Host as they relate to SPAs.

| Interface | Parameter | Required Support/Value | What does this Host support? |
|---|---|---|---|
| General | # of SPAs supported | | |
| SPI4.2 | SPI-4.2 Bus Speed | 350MHz or 87.5MHz or both (full and/or quarter rate) | |
| SPI4.2 | Clock jitter at reference point A | For 350MHz operation must be <= 0.1UIpp | |
| SPI4.2 | Data jitter at reference point A | For 350MHz operation must be <= 0.24UIpp | |
| SPI4.2 | Timing budget after reference B | For 350MHz operation must be <= 0.375UIpp | |
| SPI4.2 | Data jitter at reference point A | For 87.5MHz operation must be <=? | |
| SPI4.2 | Timing budget after reference B | For 87.5MHz operation must be <=? | |
| SPI4.2 | FIFO status mode | LVDS but at 1/8 the data rate (LVTTL rate) | |
| SPI4.2 | Maxburst1 for the Host | Programmable from 64 to 256 bytes in increments of 64 bytes. | |
| SPI4.2 | Maxburst2 for the Host | Programmable from 64 to 256 bytes in increments of 64 bytes. | |
| SPI4.2 | α | Programmable from 1 to 16 repetitions | |
| SPI4.2 | DATA_MAX_T | Programmable from 1000 to 10000 cycles | |
| SPI4.2 | Lmax contribution for the source (for egress) | No requirement. Give for all possible channel configurations. | |
| SPI4.2 | Lmax contribution for the sink (for ingress) | No requirement. Give for all possible channel configurations. | |
| SPI4.2 | Per channel fifo size for sink (for ingress) | No requirement. | |
| SPI4.2 | LVDS signalling | As given in Table 56 | |
| SPI4.2 | Packet formats supported. | Format A, B, C or D | |
| SPA Bus | Data sizes supported | 8, 16, and 32 are possible, at least 32 must be supported. | |
| SPA Bus | Timing | tsu min = 4.0ns, thld min = 0ns, tco min = 1ns, max = 4ns | |
| Ext FC | Is it supported by this host? | | |
| Ext FC | How many channels? | <= 8k. | |
| Ext FC | Timing | tsu/hld min = 7ns | |
| Power | Maximum power dissipation per SPA bay | | |

SPA Generic Hardware Specification EDCS-172353 Rev: 1.0

APPENDIX D  JTAG Details

D.1  JTAG (IEEE1149.1)

All SPA cards must support the JTAG IEEE1149.1 specification. The JTAG chain is utilized to perform Boundary Scan testing as well as ISP device upgrades. Devices identified as "JTAG devices" and "ISP device" are assumed to be compliant to the IEEE1149.1 specification. Devices identified as "ISP devices" are JTAG devices that have the added ability of being "In System Programmable". Device that do not fully comply to the JTAG IEEE1149.1 specification should not be made part of the JTAG chain.

Figure 44 illustrates the function of JTAG within an IEEE 1149.1 compliant IC. In brief, using the TMS and TCK pins, the Test Access Port (TAP) is used to position the Device ID, Bypass or Boundary Scan register between the TDI and TDO pin of the JTAG port. When Boundary Scan testing is required, the TAP controller will position the Instruction register between the TDI and TDO pins. The proper instruction (i.e. SAMPLE/EXTEST) is shifted into the Instruction Register from the TDI input pin. The Boundary Scan Cell (BSC) can be used to take a snapshot (SAMPLE) of the state of the PINs on the IC. This data can then be shifted out to an ATE system through the Transmit Data Out (TDO) pin. The BSC cells can also be made to DRIVE data onto the device's pin using the EXTEST command. Please refer to the IEEE 1149.1 for a full description of JTAG.

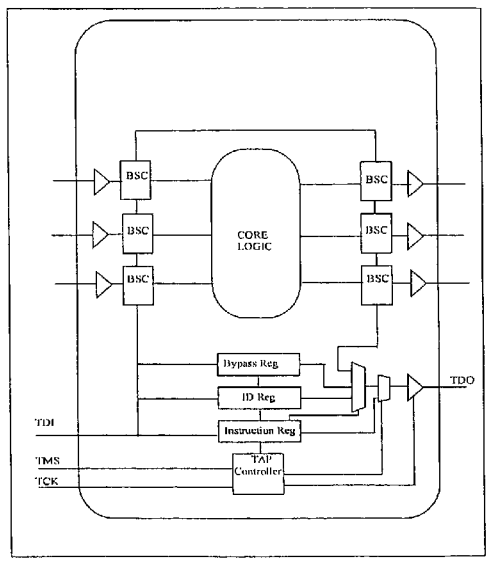

Figure 44: Boundary Scan

D.2  Key Benefits

The following benefits are available by implementing JTAG (IEEE1149.1) on SPA cards.

- Prototype Bringup phase Boundary Scan testing. The Asset ATE Boundary Scan tests are designed by the R&D JTAG team, before the Prototype H/W is available. Once completed, the JTAG tests can be quickly applied to a prototype. The JTAG engineer works closely with the design engineer to speed up the card bring up. The TEST design is applied to the first batch of prototypes. Once fully debugged, the JTAG A printed version of this document is an uncontrolled copy.
© 2001 Cisco Systems, Inc.                                                                                       Company Confidential test are transferred to the Contract Manufacturer (CM). The JTAG design engineer can provide the H/W design engineer an ATE test report that identifies test points that can be removed from the layout (i.e. Fully Boundary Scannable nets that do not need test points).

- Manufacturing Boundary Scan Testing. The JTAG design received from the R&D team is used to test all subsequent prototypes, until the ICT fixture is available.
- ICT Boundary Scan testing. The ICT system uses the JTAG chain to run its own set of Boundary Scan tests. When required, the standard Serial Vector Format (SVF) generated by the "Asset Intertech ATE system" can be used by the ICT system. (e.g. FPGAs, EEPROMs)
- Upgrade path to In System Programmable (ISP) devices. The JTAG chain is used to provide access to In System Programmable devices for device upgrades. From the JTAG interface, a JTAG ATE system, ICT system or a local CPU can upgrade ISP devices on the JTAG chain.

D.3  Physical Interface.

For the SPA cards, all JTAG and ISP devices must be on the same JTAG chain. The SPA card will have a single JTAG (IEEE1149.1) chain. Also a mux controlled by the signal ISPSEL must separate the ISP portion of the chain from the non-ISP portion[1]. An FPGA that is not directly downloaded over the JTAG chain might still be on the ISP side of the chain to enable readback of the device. The chain will be mastered by the HOST. Only JTAG/ISP devices on the SPA and the Host JTAG Master will be present on this JTAG chain, there can be no slave JTAG devices on the Host side of the JTAG chain.

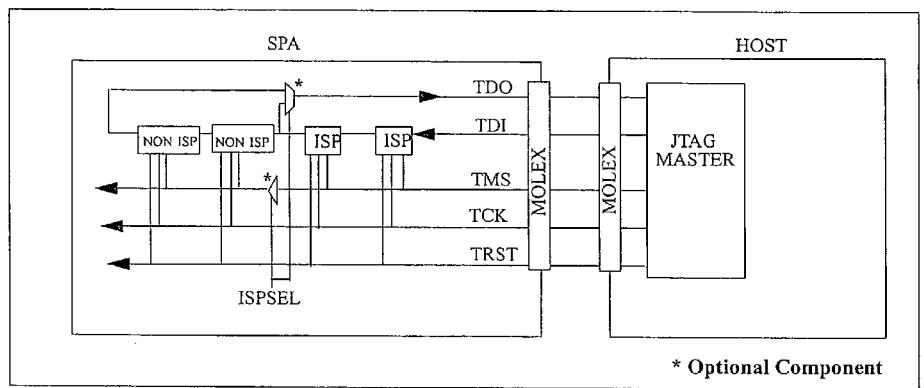

Figure 45: JTAG/ISP chain.

Due to space restriction on most SPA designs, a standard Cisco JTAG header will not be available on most SPAs. A JTAG header will be located on the SPA Extender card that will interface with the SPA JTAG chain, through the SPA connector. The extender card is required for Boundary scan testing of the SPA cards. Please refer to the Extender card H/W functional specification EDCS-182874 document for details.

---

1. If there is not an ISP device present on the SPA, then all JTAG devices on the SPA are always present in the JTAG chain regardless of the state of the signal ISP_SEL.

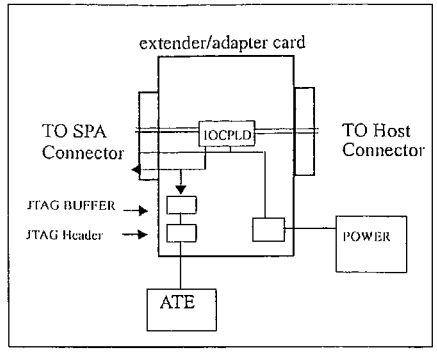

Figure 46: Extender card.

ISP devices must be grouped together at the beginning of the chain (closest to the TDI pin). The "first device" is the device with its TDI pin connected to the SPA connector. Note: Proper buffering must be provided on the JTAG bus, a maximum of five loads per driver must be maintained.

D.4 Boundary scan testing.

Boundary scan testing is used to detect opens and shorts on a fully populated PCB. Boundary scan testing will typically offer a net interconnect test coverage of 60% to 85%. A full Boundary Scan test is typically executed in less then 5 minutes. Test reports generated by the ATE can point to the failing net(s) using device designators and net name, provided through the design netlist. Boundary Scan testing capability is required for the Prototype Bringup phase, Manufacturing phase and the In Circuit Testing phase.

D.4.1 Default Boundary Scan configuration of Xilinx FPGA.

During Boundary scan testing only, it is preferable to maintain Xilinx FPGAs in pre-configure mode. Before configuration, the Xilinx FPGAs operate in the default JTAG mode. This implies that the generic BSDL file provided by Xilinx can be used for designing boundary scan tests. As an example, using boundary scan, a Spartan IIe Xilinx FPGA connected to a Xilinx XC18Vxx serial prom can be forced into pre-configure mode by pulsing the FPGA's Program pin low, using the CF pin of the SERIAL PROM.

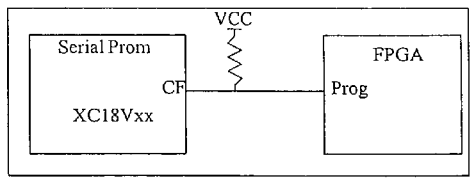

Figure 47: Xilinx Program pin control

Other implementations may be used to achieve the same results, please consult your local JTAG engineer for more details. If there are no means to maintain the FPGA in pre-configuration mode, then the FPGA code designer will be required to provide a BSDL file representative of the now programmed FPGA, for every variant/iteration of the FPGA code design.

D.5 ISP upgrade.

This section describes the upgrade process for Xilinx ISP components. Other manufacturer's ISP devices may be used on the SPA cards. At the moment, this section only covers details for Xilinx components.

D.5.1 Typical Xilinx ISP topology.

The typical Xilinx topology will consist of one or more serial configuration proms interfacing to a Xilinx FPGA device. In most cases, the FPGA will be configured for slave serial configuration mode. Please refer to the Xilinx application note, below, for a complete description.

XAPP058 Xilinx In-System Programming Using an Embedded Microcontroller http://xilinx.com/xapp/xapp058.pdf.

In summary, the document describes the following.

1- The Xilinx PROM fitter program will convert the FPGA design's.bit file into one or more serial proms.MCS file(s).

2- The resulting MCS files are required by the Xilinx "IMPACT" tool for downloading the ISP serial prom through the prom's JTAG port.

The SPA's complete JTAG chain, with exact device order, is entered in the Xilinx IMPACT tool database. Using this information, the IMPACT tool will/can create several Serial Vector Format (SVF) files that are required for the ISP's JTAG download.

The tool will create the following files.
- One "erase" SVF file for each serial prom in the SPA's JTAG chain.
- One "program" SVF file for each serial prom in the SPA's JTAG chain.
- One "verify" SVF file for each serial prom in the SPA's JTAG chain.

Note: The SVF files are in the ASCII SVF format and are compressed into a smaller XSVF format.

Optionally, the S/W designer may wish to produce a SVF device ID verification file for device ID verification prior to proceeding with ISP device (s) upgrade. The risk attached to this additional step is that over time, some of the device ID information of some devices on the chain will change, and multiple SVF device ID verification file would be required for the same SPA card. Device ID value changes in a JTAG chain are typically due to device revision field changes and multi-source manufacturer part number variation.

Using a mux to make only the ISP device accessible on the JTAG chain can reduce the need to track device ID changes of the NON ISP devices.

3- Once available, the XSFV files can be used to upgrade SPA cards serial prom by bundling the XSFV file with the IOS image or through an FTP download session. This implies that the HOST card JTAG MASTER is capable of interpreting XSVF files and that it is capable of downloading configuration data to the SPA serial prom through the JTAG interface.

D.5.2 FPGA post configuration Readback/verification

Once programmed by the serial prom(s), the entire FPGA data can be readback using the FPGA's JTAG port if desired. Furthermore, Xilinx application note XAPP 139 (Configuration and Readback of Virtex FPGAs Using "JTAG" Boundary-Scan) describes how the FPGA configuration register can be read back through the JTAG interface to determine if the FPGA's "DONE" bit is set, to indicate it is fully programmed.

D.5.3 XC18Vxx family Serial PROM programming time

The programming time for one serial prom can be approximated using the following Xilinx formulas.

N_Mbit = size of the PROM in Megabits.

Erase Time ~= 100msec_bulk_erase_pulse.

Program Time ~= (N_Mbit / TCK_frequency) + (1024rows * 14msec_prog_pulse_per_row)

Verify Time ~= N_Mbit / TCK_frequency

Total time = Erase Time + Program Time + Verify Time

Add about 1-2 seconds for overhead for various JTAG setup operations.

Note: It is not possible to program multiple Xilinx proms concurrently.

D.5.4 Isolating ISP devices on the chain.

"JTAG only" i.e. NON ISP devices are only required for Boundary Scan testing and are not required during "mission mode". ISP devices, however, must always be accessible by the HOST card's JTAG MASTER.

"NON ISP" devices are functionally removed from the rest of the chain, using a multiplexer driven by the signal ISPSEL. The main motivation for doing this is to avoid unexpected problem with NON ISP devices and to ease ISP device upgrade. Figure 45 illustrates how a multiplexer is used to shorten the JTAG chain to ISP devices only. Notice that unselected NON ISP devices must have their TMS pin held at a logic HIGH so that they will be prevented from responding to JTAG commands after five TCK cycles.

A typical Cisco example of a problem caused by NON ISP devices is that SRAM devices from different manufacturers will sometimes be available under the same Cisco part number even though, their JTAG implementation differs. Please contact your local JTAG engineer for more details.

For Boundary Scan testing only, the mux can be configured (by grounding the signal ISPSEL), to allow the NON ISP device back into the chain. Pin 8 of the JTAG header should be used for this feature.

Note: The TMS signal of unsolicited device should always be held high for 5 TCK clock cycle in order to disable the JTAG function of the devices.

D.6 "System level" upgrade details.

The HOST systems will retrieve XSVF files to upgrade the ISP device when instructed to by S/W. Using the XSVF files, the HOST will be able to erase, program and verify ISP devices. Once the ISP device is upgraded, S/W must power cycle the SPA card in order for the Xilinx FPGA to download its new configuration data.

D.7 Failure mode recovery.

It is required that the SPA card power up even with an unprogrammed FPGA. If after the SPA_OK time-out period, the SPA_OK signal is not asserted, S/W should verify the FPGA's status register using the JTAG interface. The only Reasons for the DONE bit not getting asserted should be that the card was pulled out or powered down during a serial prom upgrade. At this point, the upgrade procedure should be re-initiated to reprogram the serial prom. If after the S/W prescribed number of attempts, the serial prom is still not programmed the card should be sent for repair.

D.8 Upgrades.

A SPA FPGA upgrade WILL NOT be hitless. Reprogramming the serial prom while the SPA is fully functional shall not cause traffic errors. However, once upgraded, the SPA will require a power cycle for the upgrade to take effect. Please refer to the required Host system specification for details. Note: In System Programmable does not imply that the SPA is "mission mode upgradable". The term "ISP" only applies to the JTAG ISP device, not to the SPA card, unless otherwise noted.

D.9 JTAG References

Texas Instrument Product Bulletin "Boundary Scan Logic"

XAPP058 Xilinx In-System Programming Using an Embedded Microcontroller (http://xilinx.com/xapp/xapp058.pdf)

XAPP 139 Configuration and Readback of Virtex FPGAs Using "JTAG" Boundary-Scan (http://xilinx.com/xapp/xapp139.pdf)

Asset Intertech (http://www.asset-intertech.com/support/)

APPENDIX E   I/O Standards

To ensure that hosts and SPAs will interoperate correctly, the I/O interface standards for the various signalling types that are utilized by SPAs are described in this appendix.

E.1   LVDS for the SPI-4 Interface

The SPI4.2 LVDS interface must be compliant with ANSI/TIA/EIA-644-A-2001. Below is a summary of the critical parameters.

| Parameter[a] | Min | Max | Units |
|---|---|---|---|
| Output voltage high, Voh | | 1575 | mV |
| Output voltage low, Vol | 925 | | mV |
| Output differential voltage, Vod | 250 | 600 | mV |
| Output offset voltage, Vos | 1125 | 1275 | mV |
| Input voltage range, Vi | 825 | 1675 | mV |
| Input differential threshold, Vidth | -100 | 100 | mV |
| Receiver Differential Input Impedance | 80 | 120 | ohms |

Table 56: LVDS Interface Requirements a. For Definitions of these parameters and diagrams please see Reference 2.

E.2   2.5V LVCMOS Standard

EIA/JEDEC Standard JESD8-5 covers the I/O standard for 2.5V LVCMOS. We follow the $V_{IH}$ and $V_{IL}$ standard directly. For $V_{OH}$ and $V_{OL}$ are a little bit different than the standard. The reason for this deviation is to add noise margin (since the 2mA JESD8-5 standard has zero noise margin). The following table gives the SPA standard.

| Symbol | Parameter | Min | Max | Unit |
|---|---|---|---|---|
| $V_{IH}$ | High-level input voltage | 1.7 | VDD+0.3 | V |
| $V_{IL}$ | Low-level input voltage | -0.3 | 0.7 | |
| $V_{OH}$ | High-level output voltage | 1.9 | | V |
| $V_{OL}$ | Low-level output voltage | | 0.4 | V |

Table 57: 2.5V LVCMOS Standard

E.3   3.3V LVTTL Standard

EIA/JEDEC Standard JESD8-B covers the I/O standard for 3.3V LVTTL. We follow the standard directly. For completeness the information is presented in the following table.

SPA Generic Hardware Specification EDCS-172353 Rev: 1.0

| Symbol | Parameter | Min | Max | Unit |
|---|---|---|---|---|
| $V_{IH}$ | High-level input voltage | 2 | VDD+0.3 | V |
| $V_{IL}$ | Low-level input voltage | -0.3 | 0.8 | |
| $V_{OH}$ | High-level output voltage | 2.4 | | V |
| $V_{OL}$ | Low-level output voltage | | 0.4 | V |

Table 58: 3.3V LVTTL Standard

APPENDIX F  Extended Flow Control Notes

The following gives a little bit of the background on how the design (# of bits and speed) of the EFC bus was chosen. The design assumes the following:
- Must support low latency queuing effectively
- It is ok to require the host to perform traffic shaping on a per channel basis
- Should enable the support of small burst sizes on the host's traffic shaping (~40 byte packets)
- Keep the number of pins and the speed of the bus to a minimum
- Must support mixed channel speeds
- A calendar based xon/xoff approach is sufficient (rather than a more complicated credit based approach).

F.1  Useful Data Points

Latency of about 10mSec is a normally used benchmark point for low latency (like voice) applications for 64Kbps channels. This is a general rule of thumb for channels less than 150 Mbps (3 x DS3) bandwidth. 10ms translates to about an 80byte packet for a DS0 (64Kbps) channel.

Some approximate packet intervals (this does not account for framing and stuffing overheads which increase the packet interval value even more) that are useful for the sample cases below.

| Channel Type | Bandwidth | 80B Pkt Interval |
|---|---|---|
| DS0 | 64Kbps | 10msec |
| DS1 | 1.536Mbps | 416usec |
| DS3 | 44.736Mbps | 14.4usec |
| OC3c | 155.52Mbps | 4.1usec |
| OC12c | 622.08Mbps | 1.04usec |
| OC48c | 2.488Gbps | 256nsec |
| OC192c | 9.953Gbps | 64nsec |

F.2  Sample Cases

The sample cases presented below show that the EFC as specified in this document can support low packet latencies in the different extremes in which it can be used.

1. Deep channelization/slow speed:
   - 8K channels on a channelized OC192
   - 16K frame size, frame period = 328 uS
   - channel bandwidth = < 1.536 Mbps That means we get an update every 328uS per channel. This is sufficient for an 80B packet interval of 416uS which will prevent the build-up of a queue beyond 80 bytes[1].

2. Shallow channelization/high speed:
   - 192 channels on a channelized OC192
   - 512 slots frame size, frame period = 10.240uS
   - channel bandwidth = 44.736Mbps

---

[1]. There are other factors to consider that affect the overall latencies, including the latencies of other flow control busses that the information might be transferred on in some hosts, processor latencies and burst sizes of a host.

We get an update every 10.24uS per channel. This is sufficient for an 80byte packet interval of 14.4 usec which will prevent the build up of a queue beyond 80 bytes. This may not be a real case since with 192 channels the SPA should be using the SPI4.2 fifo status.

3. Mixed mode:
   - ChOC12 --> 1xOC3 + 1xDS3 + 14 x DS1 + 1008 x DS0
   - 1024 channels, 2048 frame size, frame period = 40.96uS
   - OC3 gets OC12/4 = 1024/4 = 256 Time slots
   - DS3 gets OC3/3 = 256/3 = ~ 64 T.S
   - DS1 gets DS3/28 = 64/28 = ~ 2 T.S
   - DS0 gets 1 T.S
   - OC3 sample interval = 40.96/256 = 160 ns
   - DS3 sample interval = 40.96/64 = 640 ns
   - DS1 sample interval = 40.96/2 = 20.48uS
   - DS0 sample interval = 40.96/1 = 40.96uS All of these rates are sufficient for an 80B pkt interval at the respective rates which will prevent the build-up of a queue beyond 80 bytes.

4. ATM with only VBR and uniform rates
   - 1 x OC48 ATM
   - 8192 VCs, each with a SCR = 300kbps (just slightly oversubscribed)
   - 8192 channels on the EFC, 16384 frame size, frame period = 328usec
   - Each VC gets 2 TSs
   - Sample interval = 328usec/2 = 164usec This is more than sufficient for an 80byte packet interval of 2.1msec. In fact this would be good enough for rates up to 3.8Mbps. Above this rate extra bits would have to be allocated to reduce the sample interval if 80 byte packet latencies is the goal.

5. ATM with a mix of VBR and UBR VCs
   - 1 x OC48 ATM
   - 4096 VBR VCs, each with a SCR = 600kbps
   - 4096 UBR VCs
   - 8192 channels on the EFC, 16384 frame size, frame period = 328usec
   - Each VBR VC gets 1 TS
   - All UBR VCs are combined for flow control purposes, they get 8192 TSs
   - Sample interval for each VBR VC is 328usec
   - Sample interval for the group of UBR VCs is 100nsec For the VBR VCs, this is more than sufficient for an 80byte packet interval of 1.06msec. In fact this would be good enough for rates up to 1.9Mbps. Above this rate extra bits would have to be allocated to reduce the sample interval if 80 byte packet latencies is the goal. For the collection of UBR VCs which can burst up to line rate (2.4Gbps), this is not sufficient for an 80 byte packet interval of 64nsec; but at these speeds the extra latency in not an issue.

All of the preceding examples will be impacted by the host system and it architecture and these details are beyond the scope of this document. Things to consider:

- The burst size of the host shaping algorithm
- Any additional latencies added by the host and a particular SPAs EFC implementation
- What are the latency goals/requirements of a particular system

What is claimed is:

1. A port adapter for coupling zero or more network interfaces to a host system having a SPI-4 bus, the port adapter comprising:
   zero or more network interfaces;
   a SPI-4 bus coupled to a host system to provide a communication channel between the host and the network interfaces;
   a control bus coupled to the host system for controlling and monitoring the port adapter;
   interface logic that interfaces the SPI-4 bus and the control bus to the network interfaces;
   an identification repository that stores a unique identifier of a type of the port adapter; and
   packet processing logic for pre-processing packets received on the interfaces by performing the steps of:
      receiving a first packet on an ingress interface of the port adapter;
      creating a second packet that conforms to a selected one of internal packet formats;
      transforming data from one or more fields of the first packet to one or more corresponding fields of the second packet;
      providing the second packet to a host system.

2. A port adapter as recited in claim 1, wherein the packet processing logic further performs the steps of moving a remainder of a packet header and packet body from the first packet into the second packet.

3. A port adapter as recited in claim 2, wherein the packet processing logic is configured to perform the step of selecting one of a plurality of internal packet formats.

4. A port adapter as recited in claim 3, wherein the ingress interface is an Ethernet interface, ATM interface, frame relay, serial interface, highly channelized interface, RPR interface, or POS interface.

5. A port adapter as recited in claim 2, wherein the ingress interface is an Ethernet interface, ATM interface, frame relay, serial interface, highly channelized interface, RPR interface, or POS interface.

6. A port adapter as recited in claim 1, wherein the adapter comprises zero interfaces, and wherein the interface logic is configured to receive one or more packets from the host system, transform the packets according to a specified function, and send the transformed packets to the host system.

7. A port adapter as recited in claim 6, wherein the specified function comprises encryption, decryption, compression, or decompression.

8. A port adapter as recited in claim 1, wherein the identification repository further stores one or more configuration parameter values associated with the port adapter.

9. A port adapter as recited in claim 1, wherein the identification repository stores values that allow the host to determine one or more data formats used by the port adaptor to send data on the SPI-4 bus.

10. A port adapter as recited in claim 1, wherein the identification repository comprises a non-volatile memory.

11. A port adapter as recited in claim 1, wherein the identification repository stores values that allow the host to determine whether the port adapter can be supported by the host system.

12. A port adapter as recited in claim 1, further comprising an identity bus coupled to the host system to allow identification of the port adapter by the host system.

13. A port adapter for coupling zero or more network interfaces to a host system having a SPI-4 bus, the port adapter comprising:
   zero or more network interfaces;
   a SPI-4 bus coupled to a host system to provide a communication channel between the host and the network interfaces;
   control bus means coupled to the host system for controlling and monitoring the port adapter;
   means for interfacing the SPI-4 bus and the control bus to the network interfaces; and
   means for storing unique identifier of a type of the port adapter; and
   means for pre-processing packets received on the interfaces, said means for pre-processing comprising:
      means for receiving a first packet on an ingress interface of the port adapter;
      means for creating a second packet that conforms to a selected one of internal packet formats;
      means for transforming data from one or more fields of the first packet to one or more corresponding fields of the second packet;
      means for providing the second packet to a host system.

14. A port adapter as recited in claim 13, wherein the means for pre-processing packets further comprises means for moving a remainder of a packet header and packet body from the first packet into the second packet.

15. A port adapter as recited in claim 14, wherein the means for pre-processing packets further comprises means for selecting one of a plurality of internal packet formats.

16. A port adapter as recited in claim 15, wherein the ingress interface is an Ethernet interface, ATM interface, frame relay, serial interface, highly channelized interface, RPR interface, or POS interface.

17. A port adapter as recited in claim 14, wherein the ingress interface is an Ethernet interface, ATM interface, frame relay, serial interface, highly channelized interface, RPR interface, or POS interface.

18. A port adapter as recited in claim 13, wherein the adapter comprises zero interfaces, and wherein the means for interfacing the SPI-4 bus comprises means for receiving one or more packets from the host system, transforming the packets according to a specified function, and sending the transformed packets to the host system.

19. A port adapter as recited in claim 18, wherein the specified function comprises encryption, decryption, compression, or decompression.

20. A port adapter as recited in claim 13, wherein the means for storing a unique identifier further comprises means for storing one or more configuration parameter values associated with the port adapter.

21. A port adapter as recited in claim 13, wherein the means for storing a unique identifier comprises means for storing values that allow the host to determine one or more data formats used by the port adaptor to send data on the SPI-4 bus.

22. A port adapter as recited in claim 13, wherein the means for storing a unique identifier comprises a non-volatile memory.

23. A port adapter as recited in claim 13, wherein the means for storing a unique identifier comprises means for storing values that allow the host to determine whether the port adapter can be supported by the host system.

24. A port adapter as recited in claim 13, further comprising means, coupled to the host system, for allowing identification of the port adapter by the host system.

25. A method of processing packets received at a port adaptor that comprises zero or more network interfaces, said method comprising:
   receiving packets at the zero or more network interfaces, wherein the network interfaces are coupled to a host system via a SPI-4 bus to provide a communication channel between the host and the network interfaces;

storing a unique identifier of a type of the port adapter; and pre-processing packets received on the interfaces by performing the steps of:
    receiving a first packet on an ingress interface of the port adapter;
    creating a second packet that conforms to a selected one of internal packet formats;
    transforming data from one or more fields of the first packet to one or more corresponding fields of the second packet; and
    providing the second packet to the host system.

26. A method as recited in claim 25, further comprising the step of moving a remainder of a packet header and packet body from the first packet into the second packet.

27. A method as recited in claim 26, further comprising the step of selecting one of a plurality of internal packet formats.

28. A method as recited in claim 27, wherein the ingress interface is an Ethernet interface, ATM interface, frame relay, serial interface, highly channelized interface, RPR interface, or POS interface.

29. A method as recited in claim 26, wherein the ingress interface is an Ethernet interface, ATM interface, frame relay, serial interface, highly channelized interface, RPR interface, or POS interface.

30. A method as recited in claim 25, wherein the adapter comprises zero interfaces, and further comprising the steps of the interface logic:
    receiving one or more packets from the host system;
    transforming the packets according to a specified function, and
    sending the transformed packets to the host system.

31. A method as recited in claim 30, wherein the specified function comprises encryption, decryption, compression, or decompression.

32. A method as recited in claim 25, further comprising the step of storing one or more configuration parameter values associated with the port adapter.

33. A method as recited in claim 25, further comprising the step of storing values that allow the host to determine one or more data formats used by the port adaptor to send data on the SPI-4 bus.

34. A method as recited in claim 25, wherein the identification repository comprises a non-volatile memory.

35. A method as recited in claim 25, further comprising the step of storing values that allow the host to determine whether the port adapter can be supported by the host system.

36. A method as recited in claim 25, further comprising the step of the host system identifying the port adapter.

* * * * *